United States Patent
Demos

(10) Patent No.: US 8,160,149 B2
(45) Date of Patent: Apr. 17, 2012

(54) FLOWFIELD MOTION COMPENSATION FOR VIDEO COMPRESSION

(76) Inventor: Gary Demos, Culver City, CA (US)

( * ) Notice: Subject to any disclaimer, the term of this patent is extended or adjusted under 35 U.S.C. 154(b) by 1059 days.

(21) Appl. No.: 12/079,018

(22) Filed: Mar. 24, 2008

(65) Prior Publication Data

US 2008/0247462 A1 Oct. 9, 2008

Related U.S. Application Data

(60) Provisional application No. 60/921,644, filed on Apr. 3, 2007.

(51) Int. Cl.
*H04N 11/02* (2006.01)

(52) U.S. Cl. .................................. 375/240.16

(58) Field of Classification Search ............. 375/240.16; 382/260–264
See application file for complete search history.

(56) References Cited

U.S. PATENT DOCUMENTS

| | | | | |
|---|---|---|---|---|
| 5,764,805 | A * | 6/1998 | Martucci et al. | 382/238 |
| 5,852,565 | A * | 12/1998 | Demos | 708/203 |
| 6,480,615 | B1 * | 11/2002 | Sun et al. | 382/103 |
| 6,728,317 | B1 * | 4/2004 | Demos | 375/240.21 |
| 6,925,124 | B2 * | 8/2005 | Lunter et al. | 375/240.16 |
| 7,728,909 | B2 * | 6/2010 | Poon | 348/451 |
| 2006/0257042 | A1 | 11/2006 | Ofek et al. | 382/255 |

FOREIGN PATENT DOCUMENTS

| | | |
|---|---|---|
| EP | 1 377 036 A2 | 1/2004 |
| EP | 1 377 036 | 2/2005 |

OTHER PUBLICATIONS

Demos, Layered Motion Compensation for Moving Image Compression, SMPTE/VSF Houston, 15 pages, Feb. 2008.*
Demos, Layered Motion Compensation for Moving Image Compression, SMPTE/VSF Joint Conference Houston, Tx, 27 pages, Feb. 2008.*
PCT International Search Report for PCT Patent Application PCT/US2008/003850, dated Nov. 7, 2008 (4 pages).
PCT Written Opinion of the International Searching Authority for PCT Patent Application PCT/US2008/003850, dated Nov. 7, 2008.
Pierre Moulin et al.: "Multiscale Modeling and Estimation of Motion Fields for Video Coding," IEEE Transactions on Image Processing, IEEE Service Center, vol. 6, No. 12, Dec. 1, 1997, XP011026249.

(Continued)

*Primary Examiner* — Frank Duong
(74) *Attorney, Agent, or Firm* — Pilsbury Winthrop Shaw Pittman LLP

(57) ABSTRACT

Motion compensation for video compression using a "flowfield" comprising a per-pixel field of motion vectors and confidence values. Flowfields can be quantized transform coded for compression motion compensation. Encoding-only flowfields match with one or more previous and subsequent frames to determine both modulation for resolution-enhancing layers, as well as sharp/soft filtering for an original image, a base layer, and for resolution-enhancing layers. Encoding-only flowfields can be used with various codec types by using the flowfield motion vector length and confidence to drive sharp/soft filters to improve efficiency via in-place noise reduction. Pixels may be displaced using encoding-only flowfields to nearby frames, and weighted for efficient noise reduction. Encoding-only flowfields are discarded after their use in encoding, and therefore do not require coded bits. Encoding-only flowfields can be applied to all frame types, including intra, predicted, forward flowfield-predicted "F" frames, and multiply-predicted "M" frame types, and improve intra coding efficiency.

22 Claims, 23 Drawing Sheets

OTHER PUBLICATIONS

Fransens R. et al. : "A Probabilistic Approach to Optical Flow Based Super-Resolution" Jun. 27. 2004, pp. 191-197, XP010762047.

Avrin V. et al.: "Local Motion Estimation and Resolution Enhancement of Video Sequences" Pattern Recognition, 1998. Proceedings. Fourteenth International Conference on Brisbane, QLD, Australia, Aug. 16-20, 1998, Los Alamitos, CA IEEE Comput. Society, U.s. vol. 1, pp. 539-541, XP010297501.

Baker S. et al.: "Super-resolution optical flow" Technical Report CMU-RI-TR-99-36, Oct. 1, 1999, pp. 1-13, XP002223179.

Barron J L et al.: "Performance of Optical Flow Techniques" Proceedings of the Computer Society Conference on Computer Vision and Pattern Recognition. Champaign, IL, Jun. 15-18, 1992. Computer vision and Pattern Recognition, NY IEEE, pp. 236-242, XP010029350.

* cited by examiner

D1 = DECODE TIME 1
D2 = DECODE TIME 2
D3 = DECODE TIME 3
D4 = DECODE TIME 4

FLOWFIELD MOTION COMPENSATION FOR VIDEO COMPRESSION

RELATED APPLICATIONS

This application claims priority to provisional patent application Ser. No. 60/921,644, filed Apr. 3, 2007.

BACKGROUND

This invention relates to flowfield-based motion compensation for video compression of moving images.

Macroblock Motion Compensation

Block-based motion compensation began with MPEG-1, and has continued into MPEG-2, MPEG-4_part2, MPEG-4_AVC_part10, H.264, and SMPTE VC1 (also know as "Windows Media Player", a Microsoft product).

The general principle used by these conventional motion compensation systems is that there is one motion vector for a square or rectangular group of pixels. The group of pixels associated with the motion vector is generally called a "macroblock". It is common in MPEG and other compression systems to use reduced resolution for Red-Y (U) and Blue-Y (V) compared to Y (luminance), where Y usually equals approximately 0.59Green+0.29Red+0.12Blue. Intra-coded frames and the motion-compensated-difference frames use a common quantized Discrete Cosine Transform (DCT). The macroblock structure provides a common boundary for the Y U and V DCT-coded regions. The DCT size is usually 8×8 pixels, but may be anywhere from 4×4 up to 16×16 (e.g., in MPEG-4AVC_part10 and H.264). The nature of the DCT is that it is a self-contained regional transform which does not extend to any pixel outside its block (usually 8×8). In a sense, quantization errors in the DCT wrap from one edge to the other (i.e., left to right, and top to bottom) of the DCT block. Differing quantization errors in adjacent DCT blocks yield block edge discontinuities. Thus, since macroblock boundaries coincide with DCT block boundaries, they share a common edge. When a motion vector differs between adjacent macroblocks, the inherent edge discontinuity does not appear within the DCT block, but rather at its edge. Since the DCT block edge "wraps around" to see its opposite edges, the DCT is quite tolerant of the edges inherent in macroblock-based motion compensation.

However, for non-block-based transforms, such as DWT9/7 bi-orthogonal subband wavelets (e.g., as used by JPEG-2000), any macroblock edges due to motion compensation will appear as sharp edges. Such sharp edges will have significant large coefficients at all spatial frequencies, thus being inefficient for quantized transform compression.

Overlapped Block Motion Compensation

One way that motion-vector-displaced macroblock edge discontinuities have been reduced is to use Overlapped Block Motion Compensation (OBMC) as described in MPEG-4_part2. OBMC overlaps the edges of the macroblocks by a weighted blend, usually using a straight line weighting (linearly varying proportion of the non-linear pixels). It is easily seen that a weighted blend of two adjacent macroblocks will have two displaced copies of the image superimposed, similar to "double vision". At the corners of the macroblock, four adjacent macroblocks are weighted together and superimposed.

While OBMC smoothes the discontinuity due to motion compensation at macroblock edges, the displaced superimposition is clearly not optimal. No sharp image details can be correctly produced at macroblock edges using OBMC when motion vectors are not exactly the same (which they usually are not). Thus, image details are only preserved clearly in the center of macroblocks when using OBMC at their edges.

Restriction to Block Displacement

MPEG-style macroblock motion compensation is a pure block displacement. There is no provision for image zooming, rotation, warping, nor changing shape due to motion (like a person running). Block displacement cannot account for natural visual affects like atmospheric distortion on telephoto moving images which change size and position locally. Not only is block displacement prone to inaccurate reproduction of many types of motion, but the algorithms which are used to determine the displacement, such as the Sum of Absolute Difference (SAD), often fail, resulting in wildly disparate motion vectors which point to parts of the image having no relationship to the intended macroblock.

B Frame Pixel Weighting

In MPEG-2 and MPEG-4 part 2, an equal macroblock pixel weighting of the previous and subsequent reference frames is used in B frames (one of three types of frames in those systems; see further discussion in next section). U.S. Pat. No. 6,816,552, "Interpolation of Video Compression Frames" by the present inventor, introduced the idea of alternative weighted proportional blends, such as weighting by the frame distance (e.g., ⅓ if there are two intervening B frames), or by a blend of equal weight (½) and the frame distance (e.g., ⅓) to yield something in between (e.g., ⅜). This latter blend is beneficial since the equal weight has the benefit of lower noise, but the frame distance is often a better prediction in the absence of noise.

B Frame Direct Mode

In MPEG-4 Part 2 video compression, B frame macroblocks have four motion compensation displacement modes. They may be coded from a previous reference frame (backward), from a subsequent reference frame (forward), from the average of the previous and subsequent reference frames (bi-directional, with two motion vectors), or via "direct" mode. In "direct" mode, the subsequent reference frame is a P frame wherein the macroblock at the same location has either 1 or 4 vectors, with one vector for 16×16 or 8×8 pixels, respectively, within a 16×16 macroblock. A single delta for this B frame's macroblock is added to the 1 or 4 motion vectors from the subsequent P frame macroblock. The vectors are then scaled by the frame distance and applied bi-directionally (with equal weight forward and backward). A confusing issue concerning direct mode is that the motion vector from the subsequent P frame's macroblock points to a motion vector delta, such that this macroblock would be displaced in the current B frame time, and not at the same location as the current macroblock in the B frame to which it is being applied. The combination of the delta in direct mode, plus direct mode being only one of four coding mode choices for B frame macroblock motion compensation, allows this problem to be avoided in cases where this displacement in reference might prove a hindrance. Direct mode has proven statistically beneficial, especially when used with the subsequent 8×8 P frame mode (thus applying a single delta to four 8×8 motion vectors to yield both four forward and four backward motion vectors).

Note that OBMC is not applied to any B frame mode. OBMC is only applied to P frame macroblocks (in 16×16, or 8×8 modes, or 16×8 mode for interlace).

Adaptation to Layering

In U.S. Pat. No. 6,728,317, "Moving Image Compression Quality Enhancement Using Displacement Filters with Negative Lobes" by the present inventor, a base layer using macroblock motion-compensation and DCT is extended in resolution by a spatial resolution enhancement layer. The enhancement layer uses the base layer motion vectors as "guide vectors" for delta vectors for macroblock displacement of a resolution enhancement delta layer. The motion compensated delta layer difference from the current resolution delta layer is coded using either DCT or wavelet transforms. This system provides not only resolution layering but also efficiency improvement, since the lower resolution layer can be given a proportionally higher number of bits per pixel compared to the resolution enhancing layer(s). Every layer's macroblock edges correspond to DCT edges (if all layers use the DCT), which are somewhat tolerant of macroblock discontinuities. A similar use of base and enhancement layers is described in U.S. Pat. No. 6,510,177, "System and Method for Layered Video Coding Enhancement" by Jeremy de Bonet and Gary J. Sullivan Use of macro-block displacement as guide vectors and higher layer motion vector deltas is inefficient for non-DCT transform systems, such as wavelets, since block edge discontinuities are present at all resolution layers.

Hierarchical Search for Motion Vectors

It has long been a common practice to search for motion vectors for macroblock motion compensation using a hierarchy of one or more reduced resolution images. Although the reference software implementations perform an exhaustive search for minimum SAD (Sum of Absolute Difference) at full resolution, many practical hardware and software implementations use a guided search over a restricted region of the image (such as searching within a small range limit from the adjacent motion vectors). Further, many practical hardware and software implementations filter to a reduced resolution prior to searching, reducing the number of required computations. Since a common macroblock size is typically 16×16 in Y (luminance), and 8×8 in U and V (e.g., in MPEG-2), a reduced resolution of half would still have 8×8 in Y (and 4×4 in U and V, although some matching algorithms only match Y and unwisely ignore U and V). Similarly, a reduced resolution for motion block matching of one quarter would have 4×4 in Y (and 2×2 in U and V, if present).

Motion-Compensated Frame Rate Conversion and Noise Reduction

U.S. Pat. No. 6,442,203, "System and Method for Motion Compensation and Frame Rate Conversion" by the present inventor, described the use of per-pixel motion compensation (as opposed to block-based) for the purpose of noise reduction or frame rate conversion.

For noise reduction, one or more frames previous and subsequent to the current frame are examined for displacement and used to reduce per-frame noise. When applied to noise reduction, the motion compensation system was used as a separate preprocessor for compression, or as a moving image improvement system (by reducing noise). The motion compensation was not applied to use within compression coding.

When applied to frame-rate-conversion, one or more previous and subsequent frames are examined by the system and motion vectors are interpolated to the new frame time.

A confidence value may be used to determine how much to rely on the motion-vector-displaced pixels versus using a simple blend of adjacent frames. If there is a low confidence value, then the current pixel of the current frame can be used with no noise reduction. If confidence match for a pixel for one or more frames is reasonably high, then those frames can be used to reduce the noise of that pixel. Similar rules may be applied with frame rate conversion. If the confidence value for a given pixel is low, then a proportional blend of adjacent frames can be used for that pixel. If the confidence value is high with respect to one or more nearby frames (previous and/or subsequent), then the motion vector(s) can be used to create a new pixel in a new location for the new frame time.

The projection of pixels from one or more nearby previous and/or subsequent frames onto a new frame time using motion vectors may not completely cover the image area, in which case the proportional blend of adjacent frames is used to fill in incomplete image areas. Further, even if the projection of pixels does cover a region of the new frame, the confidence may be low, and thus the proportional blend is again selected. Using the motion vectors and confidence, a new frame is created for noise reduction or frame rate conversion. Every processing step using the confidence and motion vectors from adjacent frames, as well as deciding not to use them, is potentially visible in some region of each frame. Thus, for these purpose, the very best motion matching must be performed, down to one or more motion vectors for each pixel, determined independently for each previous and subsequent frame referenced, with independent computation of confidence values. The process is therefore computationally intensive.

Inherent Imperfection of Frame-Based Motion Matching

The lack of a match, and a correspondingly low level of confidence, is a common occurrence in moving images. Each image is a frame with an open-shutter and closed-shutter duration. Such a square-wave temporal sample is theoretically suboptimal and will be prone to aliasing and other artifacts. During the shutter open time, moving objects will smear, known as "motion blur". During the shutter closed time, no image observation occurs, allowing some object motions to be hidden between frames (such as a light which flashes on only when the shutter is closed).

Objects which obscure each other (such as a person walking behind a post, or entering or exiting a door) will not have a corresponding match between adjacent frames. There will be aspects of the object observable in one frame that were not present in a previous and/or subsequent frame. The frame edges during a pan or tilt also inherently reveal or remove portions of the image.

There are also many types of moving image which do not exhibit much similarity from one frame to the next, such as ocean waves or blowing leaves.

Image fade ups or fade outs, and scene cross-dissolves, also tend to gradually obscure or reveal scene changes, sometimes yielding a poor match. This is especially true when exclusively using a minimum SAD for matching, since that algorithm is not effective at handling fades and dissolves.

There is also the practical limitation that most motion compensation searches are limited to a small fraction of a frame. For example, a typical search range is between 5% and 15% of the frame's width and height. A moving ball in the sports of tennis, soccer, baseball, or football is likely to move further than this within a frame time, such that no motion match would be found within the preset limited search range. When B frames are placed between I and/or P frames, the distance between the P frame and previous reference P or I frames is often further increased by the number of frames. For example, with M=3 such that there are 2 intervening B frames, an object will travel 3 frames in time to the next P frame. Thus, there are many cases where practical search range limitations result in an inability to match macroblocks.

With digital sensors, such as CCD and CMOS imagers, it is common to have some degree of sensor sample aliasing. This is due to the deviation of practical square pixel sensor sites from more optimal sinc-like (sine(x)/x) or Gaussian-like filters. An optical filter (usually a bi-refringent quarter-wave layer) helps limit spatial frequencies to the pixel spacing, but the net filter is still imperfect to some degree. Motion of detailed image regions will therefore alias, which is a confounding factor (a "confound") to motion matching. Also, imagers typically have regional sensor imperfections which impose a fixed pattern on each image frame. Fixed pattern noise does not move with respect to the sensor pixels, even if an image moves across the sensor. Thus, fixed pattern noise represents an additional confound in motion compensation. In U.S. patent application Ser. No. 11/225,665, "High Quality Wide-Range Multi-Layer Compression Coding System" by the present inventor, a system is presented for accumulating the fixed pattern noise on pure image black (e.g., with a capped lens) and subtracting it out to reduce the level of this confound with respect to motion compensation.

Thus, as can be seen from all of these various frame-based issues, motion matching is inherently imperfect. When performing noise reduction or frame rate conversion, the goal is the creation of a sequence of image frames with reduced noise, or having a different frame rate. In the case of noise reduction, the inherent motion matching imperfections result in an inability to reduce noise for some regions of some frames. In the case of frame rate conversion, inherent motion matching imperfections result in an inability to improve upon a simple weighted blending of adjacent frames for some regions of some frames.

Aliasing in DWT 9/7 Low Bands

The DWT 9/7 bi-orthogonal subband wavelet algorithm (as used in intra-coded JPEG-2000) builds a resolution pyramid with factor-of-two resolution layers. However, the low-low band of the DWT 9/7 bi-orthogonal subband wavelet differs somewhat from an optimal windowed-sinc filter. This difference will result in some aliasing artifacts in each factor-of-two resolution layer. The more layers of resolution reduction, the more aliasing will be present in the image.

Optimal Filters for Layers

In U.S. patent application Ser. No. 11/225,665, "High Quality Wide-Range Multi-Layer Compression Coding System" by the present inventor, an optimal (windowed-sinc-based) filter is used to create a resolution pyramid with quantized deltas at each resolution level. Such optimal filtered resolution layers are not prone to the aliasing affects of DWT 9/7 low-low subband filters. The use of block-displacement motion compensation is also described at full resolution, or at a layer below full resolution (such as at half or quarter of full resolution).

In practice, one or more optimal filter plus delta layers can be matched with one or more DWT 9/7 bi-orthogonal subband wavelet layers. In particular, when applying block-displacement motion compensation, it is useful to minimize aliasing by using optimal filters for layers immediately adjacent to the motion compensation layer (above, below, or both, even though other layers may use the DWT 9/7 wavelet), since aliasing interferes with block-displacement matching.

In addition, the compression coding system is extended to arbitrarily high precision and dynamic range by utilizing ubiquitous floating point in computations, excluding the quantization step and corresponding variable-length coding of the resulting integers.

Optimal Windowed Sinc Filter

The theoretically optimal filter function for resampling is a sinc function (sine(x)/x) of infinite extent. The theory assumes that the samples themselves were taken with the same sinc filter of infinite extent. However, no real pixel samples correspond to such sampling, but are rather more similar to a Gaussian sample or a box sample. In light of this, a more useful variant of the sinc function is truncated by being weighted with a "window". A typical practical windowed sinc function has an extent of ±3 times Pi (6 total pixels). A common window function is cosine(Pi/6) which has its first zeros at ±3. The central Gaussian-like positive lobe extends to zeros at ±1 times Pi (2 total pixels).

When applying the windowed sinc to resizing filters, the scale is set to the lowest of the two resolutions. When applying the windowed sinc to a displacement filter, the size of both resolutions is the same.

U.S. Pat. No. 6,728,317, "Moving Image Compression Quality Enhancement Using Displacement Filters with Negative Lobes" by the present inventor, describes the use of negative lobed windowed sinc filters for displacement of macroblocks. For each macroblock, a selection can be made of one of a number of displacement filter functions of varying levels of sharpness. Such selection is beneficial since noise levels and sharpness will vary over an image, such that the best match for one macroblock may be sharper or softer than the best match for another macroblock.

In addition to fully-sharp windowed sinc scaled with the first zeros at ±1 times Pi, it is possible to "soften" an image, blurring it slightly, when resampling for displacement or resizing. Softening is achieved by linearly increasing the scale of the sinc function (thus widening it) to greater than ±1 to the first zeros, while retaining the ±3 window extent. The amount that the sinc function scale is increased above ±1 controls the amount of softening (blurring) during the resample.

There are other common and useful filters applied to resampling which do not use negative lobes. These include simple Gaussian, box, and triangle filters, as well as spline and bicubic smooth curves. It is also sometimes useful to add the inner all-positive center portion of the sinc in the range ±1 with full amplitude and then zero beyond ±1. This form of sinc is truncated to its all positive central region over the range ±1.

Arbitrary or variable resizing can be achieved by placing a windowed sinc (or other useful sampling function) over the center of each new pixel, applied by normalized weighting to the pixels or the source image. Normalization is necessary to ensure that the sum of coefficients of the resampling function adds to 1.0 (unity), since the number of taps applied within the resampling function (e.g., windowed sinc of ±3 extent) during variable resizing can vary widely.

Amplitude Reduction of Resolution Enhancing Layers Near Frame Edges

In U.S. Pat. No. 5,852,565, "Temporal and Resolution Layering in Advanced Television" by the present inventor, resolution enhancing layers are used to improve an MPEG-2 block motion compensated DCT base layer. The resolution enhancing layers are difference images, which may be motion-compensated from previous frame resolution enhancing layer difference images. The resulting difference to the correct resolution enhancement is then coded using either wavelets or DCT. Near the edges of the frame, the amplitude of this resolution enhancing difference layer may be reduced, since regions of interest within a frame are not usually at the very edge of the frame.

Integration of Noise Reduction with Encoding when Using Lossless Residual(s)

In U.S. Patent Application No. 60/758,490, "Efficient Bit-Exact Lossless Image Coding Residual System" by the present inventor, the requirement is established that noise reduction must be integrated with encoding when using a lossless bit-exact residual coding.

Computation of Correlation and Autocorrelation

Correlation and autocorrelation are widely used in signal processing.

Autocorrelation of a region of pixels is the square of each pixel value's difference within a region from the average (DC) pixel value of that region. The square of these signed values is then summed over the pixels within the region to yield the autocorrelation.

Correlation between two signals, or in this application between two regions of digital image pixels, is also known by the name "cross correlation". Correlation between two regions of pixels first subtracts the average of each region from each value (to create signed values), and then multiplies the values for each location between the two regions. The result is summed over the pixels within the region to yield the correlation.

Note that correlations can be zero and negative, although autocorrelations are always positive (or zero if all pixels are equal).

SUMMARY

The present invention applies the concept of a flowfield to motion compensation for video compression of moving images. A per-pixel motion represents a "field" of motion vectors, one for each pixel, indicating the movement, or "flow", of each pixel from one frame to the next frame. The collection of such motion vectors for a frame is a "flowfield". In the present invention, a flowfield can be scaled to one or more resolutions, with the resulting scaled flowfield typically having a resolution differing from (but may also be the same as) the resolution of the original flowfield.

The present invention uses a hierarchical match using blocks or warped block-like regions to create one or more reduced resolution flowfields. The reduced resolution flowfields are resized for use at various resolution layers, and the motion vectors are similarly scaled for use at each resolution layer. Each resized flowfield then contains one motion vector and one confidence value for each pixel at that resolution layer. Using the confidence value and the motion vector length, a modulation amount can be determined for resolution-enhancing delta layers. Encoding-only flowfields match with one or more previous and one or more subsequent frames to determine both modulation for resolution-enhancing layers, as well as sharp/soft filtering for the original image, the base layer, and for the resolution-enhancing layers. These encoding-only flowfields can be used with any number of codec types by using the flowfield motion vector length and confidence to drive sharp/soft filters to improve efficiency via in-place noise reduction (using the knowledge obtained from the flowfield). The encoding-only flowfields are discarded after their use in encoding, and therefore do not require coded bits. The use of encoding-only flowfields can be applied to all frame types, including intra, predicted, flowfield-predicted, and multiply-predicted frame types. One use of the current invention is to improve intra coding efficiency using encoding-only flowfield matching with adjacent frames.

The present invention also utilizes coded flowfields for motion compensated compression. Compression coded flowfields which point to one or more nearby reference frames are used by the decoder to propagate pixels from the reference frames to the current time via per-pixel displacement using the interpolated (i.e., resized and rescaled) decoded motion vector and confidence value flowfields. The displaced pixels are then subtracted from the base and/or from each resolution enhancing delta layer prior to quantized compression coding of the current frame's pixels. The resulting flowfield-driven motion compensation yields a significant improvement in moving image compression efficiency for wavelet and other non-macroblock coding systems, since macroblock displacement motion vectors are not optimal for these types of codecs. Macroblock and DCT-based coding systems can also benefit from the current invention.

The present invention also applies flowfields to exploit the similarity of left-eye-view and right-eye-view moving images in compression coding 3-D Stereoscopic images.

The details of one or more implementations of the invention are set forth in the accompanying drawings and the description below.

BRIEF DESCRIPTION OF THE DRAWINGS

Like reference numbers and designations in the various drawings indicate like elements.

DETAILED DESCRIPTION

Overview

Figure 1A:
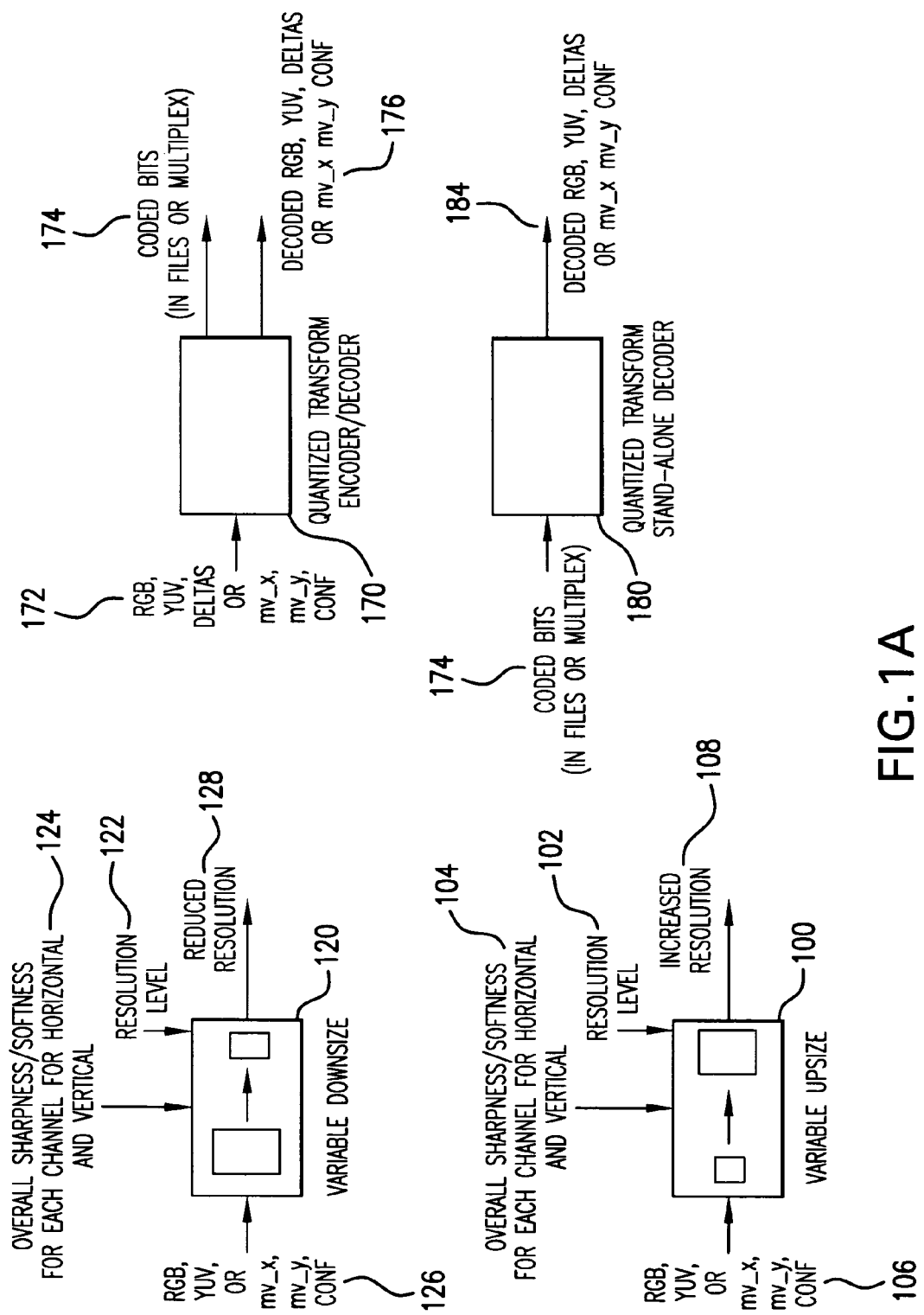
FIG. 1 is a block diagram of the basic functional tool set of the present invention.

A per-pixel motion represents a "field" of motion vectors, one for each pixel, indicating the movement, or "flow" of the corresponding pixel from one frame to the next frame. The collection of such motion vectors for a frame is a "flowfield". In robotic vision literature, the description of the motion within a scene is sometimes also known as "optical flow". In the present invention, a flowfield can be scaled to one or more resolutions, with the resulting scaled flowfield typically having a resolution differing from (but may also be the same as) the resolution of the original flowfield.

A counter-intuitive aspect of the present invention is that by using more motion vectors per frame, fewer bits are needed to code a sequence of images.

Unlike motion-compensated noise reduction or frame-rate conversion, motion compensation for image compression does not need to result in a correctly-appearing image. The sole goal of motion compensation for compression is the reduction of bits needed for compressing a moving image sequence. A moving image sequence often has regions of frames which can be matched to reduce quantized transform coded bits. If the matching is visually imperfect, but still decreases the coded bits, the motion compensation algorithm is still considered to be successful.

As described in the background above, when coding using optimal filter deltas, and with DWT 9/7 bi-orthogonal subband wavelets, sharp edge artifacts associated with macroblock displacement should be avoided, since sharp edges will waste bits. Further, OBMC (Overlapped Block Motion Compensation) is not optimal, since it will result in multiple displaced superimposed images, and thus does not correctly preserve details under non-uniform motion fields.

Therefore, a motion compensation technique is needed which primarily results in smooth images, absent sharp edge artifacts. If sharp edges appear in the actual image, they should be matched between frames as exactly as possible in order to reduce the bits needed (compared to an intra coding such as JPEG-2000, which must re-create sharp edges and other details in images for every frame).

Further, it would be desirable to have the ability to apply a motion compensation technique to multiple resolution layer deltas, as well as some base resolution layer. Using a resolution layering system which minimizes aliasing, such as one based upon optimal filtering as described in U.S. patent application Ser. No. 11/225,665, "High Quality Wide-Range Multi-Layer Compression Coding System" by the present inventor, the present invention teaches how it is possible to motion-compensate image details between corresponding resolution-enhancing layers. Note, however, that some aliasing will be created using the DWT 9/7 bi-orthogonal subband wavelet to create factor-of-two resolution enhancing layers (via LL, HL, LH, and HH subbands, as described in application Ser. No. 11/225,665). Such aliasing will significantly interfere with the ability to motion compensate the base layer, and result in even greater interference with the similarities of details when motion compensating the difference between resolution-enhancing layers. Aliasing is tied to pixel phase, and motion compensation will usually alter the phase of pixel details during displacement. Thus, it is more effective to use optimal filters (i.e., windowed-sinc-based) at resolution layers above and/or below the flowfield motion compensation layer. Preferably all resolution layers higher than the flowfield motion compensation will use an optimal filter to minimize aliasing.

The present invention describes a technique which efficiently achieves the desired motion compensation system.

Resampling & Displacement Tools Based Upon Parameterized Windowed Sinc

Figure 1B:
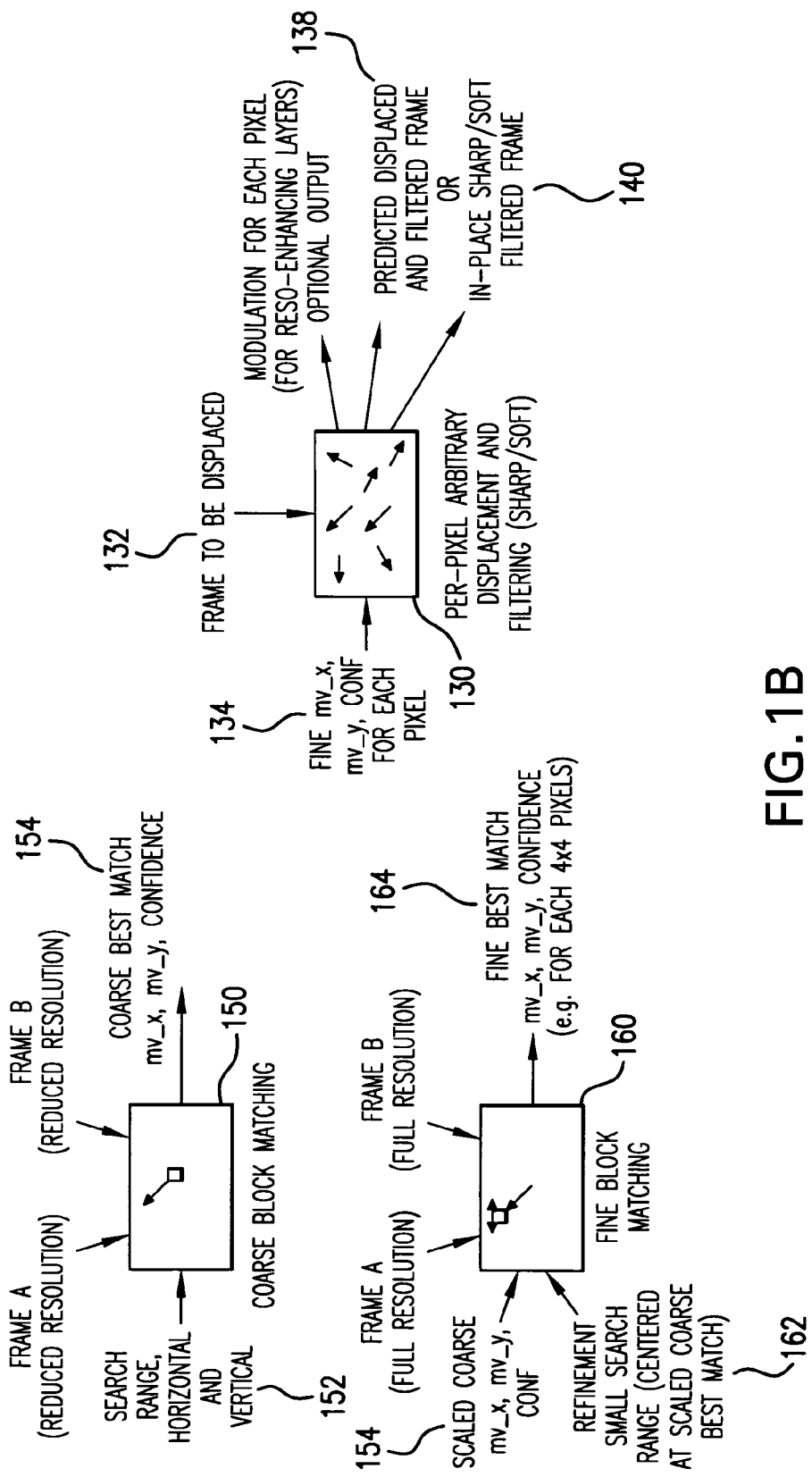

The present invention utilizes a number of basic tools or components alone or in combination to implement the various features of the invention. FIG. 1 is a block diagram of the basic functional tool set of the present invention. In particular, the present invention utilizes the following tools or components built upon a parameterized windowed sinc function:

1) A variable upsize filter 100 with separate parameters for horizontal and vertical increased resolution pixel counts 102 and for the sharpness/softness level 104 (i.e., the width of the windowed sinc function, or of other useful filters) of each of red, green, and blue, or Y, U, and V input channels 106. An increased-resolution output 108 results from application of the upsize filter 100. The filter can also be applied to motion vector horizontal (mv_x) and vertical (mv_y) component inputs, as well as to confidence values (conf).

2) A variable downsize filter 120 with separate parameters for horizontal and vertical decreased resolution pixel counts 122 and for the sharpness/softness level 124 (i.e., width of the windowed sinc function, or of other useful filters) of each of red, green, and blue, or Y, U, and V input channels 126. A reduced-resolution output 128 results from application of the downsize filter 120. The filter can also be applied to motion vector horizontal and vertical components, as well as to confidence values.

3) A variable displacement filter 130, wherein each pixel in an input frame 132 can have independent horizontal (mv_x) and vertical (mv_y) displacements 134 applied, as well as confidence values. In addition, each pixel can have an optional independent vertical and horizontal sharpness/softness level (applied based upon motion vector length) for each of red, green, and blue, or Y, U, and V channels. The output of the displacement filter 130 is one of a displaced frame 138 (if the inputs are motion vectors), with or without sharpness/softness filtering, or a sharp/soft filtered frame 140 (if no displacement is specified) or a modulation amount for each pixel (which can be applied to resolution-enhancing layers). Note that "modulation" refers to the weighting of resolution-enhancing pixel deltas. In the illustrated embodiment, the sharpness/softness level is controlled entirely from motion vector length. However, an independent input may be provided to vary the amount of sharp/soft filtering as a function of motion vector length or other user-defined function.

In order for these variable (or "arbitrary") resizing and displacement filters to function well, substantial sub-pixel resolution is needed for centering the resampling filter (usually a windowed sinc filter). For example, a resolution of approximately 1% of a pixel distance provides sufficient precision. Another example, which is still practical to implement, is to use a very fine resolution of 0.1%; or one thousandth of a pixel.

One example of a practical implementation method for these filters is to use a lookup table. When there are 10 levels of sharpness/softness, then there would be a total of 1000 entries for each filter coefficient (1000=100 sub-pixel resolution steps at 1% pixel resolution×10 levels of sharpness/softness). Even for 100 levels of sharpness/softness and 1000 sub-pixel resolution steps, the resulting 100,000 lookup table entries still remain practical to implement.

One embodiment of the displacement and upsizing filters has 6 taps for a windowed sinc of ±3 extent. Thus, 6000 entries (6 taps times 10 sharpness/softness levels times 100 sub-pixel units) would define a useful working set for displacement filters, each independently normalized to 1.0 (unity). For downsizing filters, many more than 6 taps might be needed. For example, a factor of two downsize would need 12 taps (a ±6 extent on the downsized resolution maps to a ±12 extent on the original full resolution image).

Note that a case might occur when the horizontal resolution is being upsized, but the vertical resolution is being downsized, and vice versa. For example, this case would be the result of anamorphic (non-square-pixel) and square-pixel layer resolutions being mixed. Although this is not a common case, it can be handled by using a concatenation of the upsize filter 100 for the upsize portion (retaining the other dimension constant) and the downsize filter 120 for the downsize portion (again retaining the other dimension as constant).

Figure 2:
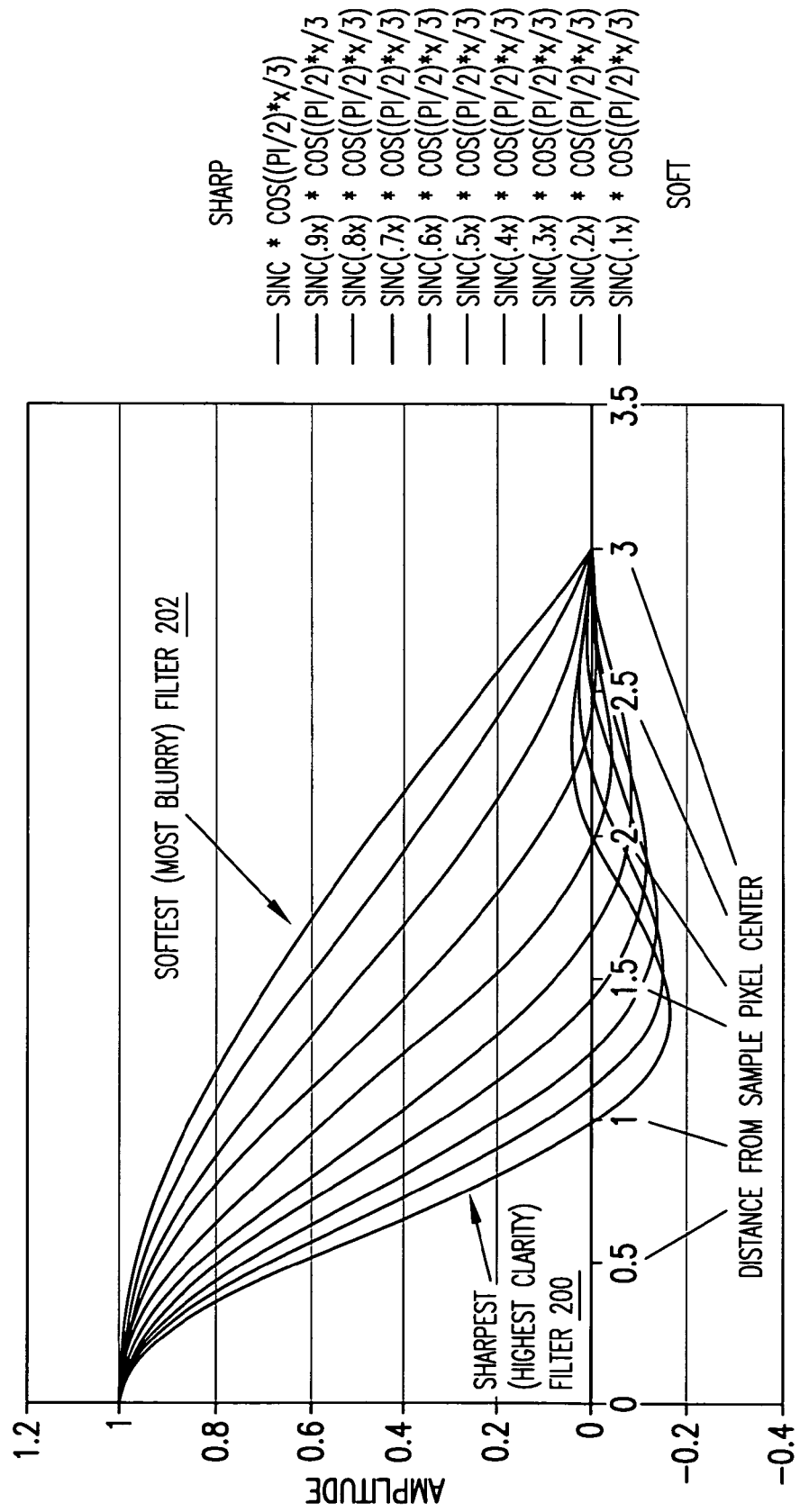
FIG. 2 is a graph showing the symmetric half of a preferred variable-sharpness/softness weighting function based upon a windowed sinc filter sampling function of width ±3.0 pixels.

As noted above, each of the upsize 100, downsize 120 and displacement 130 filters include sharp/soft filters. FIG. 2 shows the symmetric half of a preferred variable-sharpness/softness weighting function based upon a windowed sinc filter sampling function of width ±3.0 pixels. The sinc function is $\sin(x)/x$. A windowed sinc of ±3.0 pixels is further weighted by $\cos((pi/2)*x/3)$. Full sharpness 200 is achieved when the X axis scale is equal to the pixel spacing of the lower resolution image (the input for upsizing, the output for downsizing, or the equal resolution of both images during displacement, which does not involve resizing). Softness is achieved by expanding the X axis within the sinc function (but not the cos window function). For ten steps from sharpness to softness, the example windowed sinc variable-sharpness/softness filter has the form:

a=integers 1 through 10
b=a/10.0 (i.e., b=0.1, 0.2, 0.3, 0.4, 0.5, 0.6, 0.7, 0.8, 0.9, or 1.0)
x=x axis or y axis of pixels (lower of sizes if resizing), where a unit distance is the distance between pixel centers
c=bx
w=cos((pi/2)*x/3) (window function)

The filter weighting function is therefore: $w \cdot \sin(c)/c$

Note that normalization is typically required before applying this filter to discrete pixel samples in the present invention (either color components or motion vectors at each pixel). Normalization yields a sum of 1.0 for the discrete filter values.

Implementation of such a filter function in software or hardware is straightforward. Other filter functions may be used as well.

In addition to the three filters described above, the invention utilizes four additional components or tools. Referring again to FIG. 1, a coarse block match 150 takes as inputs two frames A, B having reduced resolution, and search range values 152 independently set for the horizontal and vertical. The coarse block match 150 compares each pixel block (e.g., 16×16) in frame B for a match in frame A, within the bounds of the search ranges, and outputs 154 coarse motion vectors mv_x and mv_y for each block, along with a confidence value as to the "goodness" of each match. The match process may be accomplished using known minimum SAD (sum of absolute difference) algorithms. The confidence value may be computed, for example, using a large SAD to indicate poor confidence, and a small SAD to indicate high confidence. Also the SSD (sum of squared difference) may be similarly used. A method which is tolerant of some portion of the region having a large mismatch, but where the majority of the region has a good match, is to take the median the absolute value of the differences, or, equivalently, the median of the square of the difference (or both). The lowest median value represents the best match for the majority (at least half) of the pixels. The use of SAD, SSD, and/or median of absolute difference for block matching are all commonly used methods for block matching. In addition to these commonly used methods, it is also beneficial to utilize a match between correlation and autocorrelation for both best match as well as for confidence. The closer the match between correlation and autocorrelation, the higher the confidence. A combination of SAD, SSD, the median absolute difference, the median square difference, and correlation/autocorrelation matching can also be utilized. For example, a weighting times best match criteria of each can be utilized, providing some of the benefits of each different type of match. Confidence may differ from best match criteria utilizing non-linear functions of the best match criteria, when useful. Further, confidence might sometimes be usefully based upon different criteria than the matching criteria.

Referring again to FIG. 1, a fine block match 160 takes as inputs two frames A, B at full resolution, the output 154 of the coarse block match 150 (scaled to match the resolution of the input frames), and refined search range values 162 independently set for the horizontal and vertical (each centered on the corresponding scaled coarse best match for each block). The fine block match 160 compares each pixel block (e.g., 4×4) in frame B for a match in frame A, within the bounds of the refined search ranges, and outputs 164 fine motion vectors mv_x and mv_y for each block, along with a confidence value as to the "goodness" of each match.

Referring again to FIG. 1, a next component is a quantized transform encoder/decoder 170, which takes as input red, green, and blue, or Y, U, and V color values from a frame, or X and Y motion vectors and confidence values associated with a frame, or "delta" values from the difference between two frames. The output are compressed coded bits 174 resulting from application of known transforms and quantized transform coding methods, such as those taught in U.S. patent application Ser. No. 11/225,665, "High Quality Wide-Range Multi-Layer Compression Coding System" by the present inventor. Such coded bits may be stored in files or transmitted as part of a multiplex stream of data, in known fashion. The quantized transform encoder/decoder 170 also outputs a decoded version 176 of the encoded input 172 to allow further processing (the input differs from the decoded version of the encoded input as a result of losses incurred during encoding).

The next component is a quantized transform stand-alone decoder 180 which decodes the output of the encoder/decoder 170, outputting the decoded values 184. Note that the same decoder is also included in the encoder/decoder 170, in order to generate the decoded version 176 of the encoded input 172.

Using these tools, a computationally efficient encoding and decoding system can be implemented to embody the present invention. A real-time hardware or software decoder at standard definition video resolution can be implemented on today's desktop computers. High definition software decoding will be real-time in only a few years. Real-time hardware encoding and decoding is also practical with today's technology (e.g., using programmable gate arrays).

Multi-Resolution Layered Coding

Figure 3:
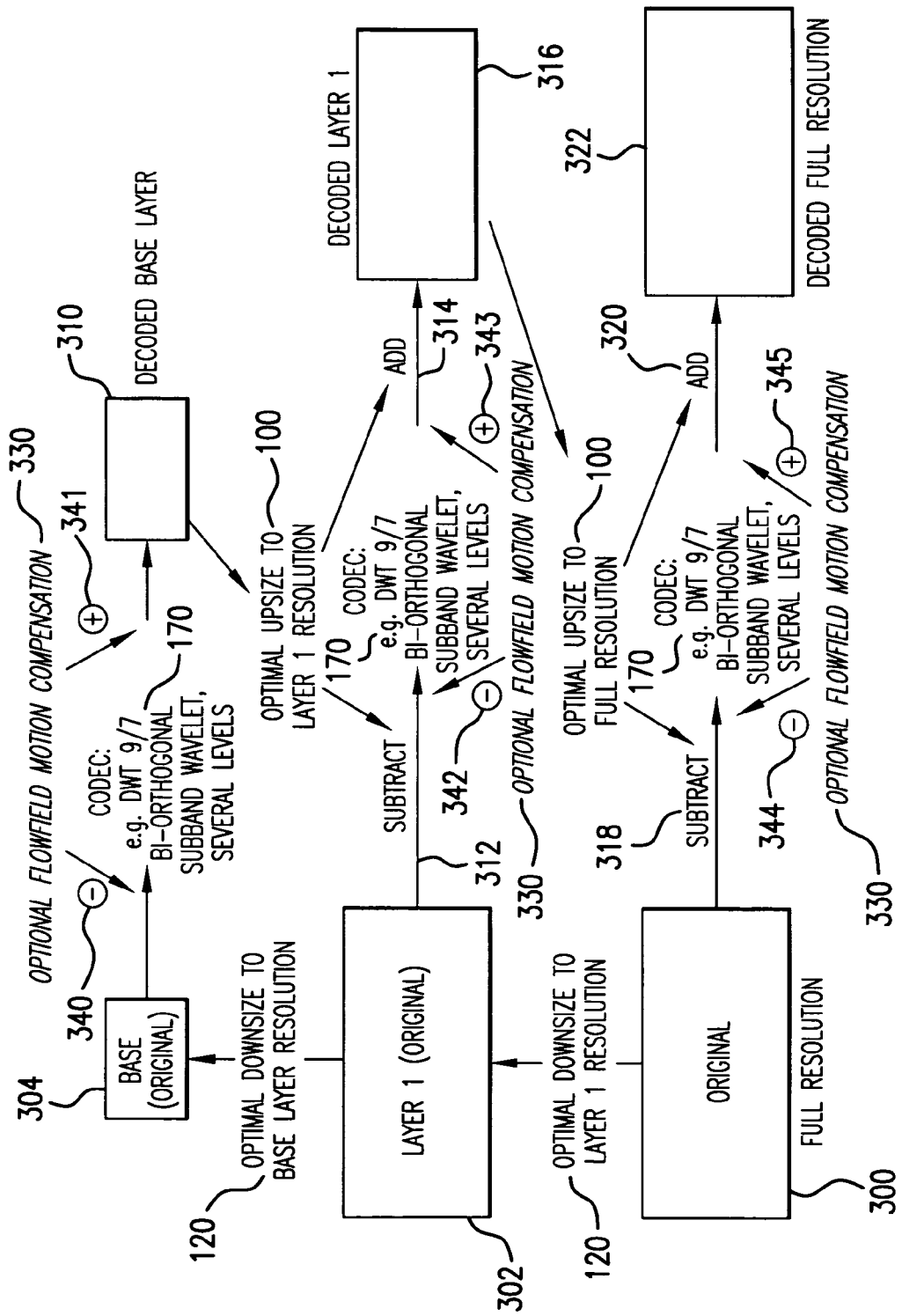
FIG. 3 is a block diagram showing multi-resolution layered coding using optimal resizing filters and a quantized codec, and optional flowfield motion compensation.

FIG. 3 is a block diagram showing multi-resolution layered coding using optimal resizing filters and a quantized codec (e.g., DWT 9/7 bi-orthogonal subband wavelet coding), and optional flowfield motion compensation. In this example, the full resolution of an original frame 300 is reduced to a lower resolution using the optimal downsize filter 120, resulting in Layer 1 (302). Layer 1 is then further reduced to an even lower resolution using an optimal downsize filter 120, resulting in the base layer 304. Thus, three layers of resolution are created using the optimal filter, for coding by a quantized transform. Note that additional or fewer intermediate layers of resolution may be used; three are shown by way of example only.

For each of the layers 300, 302, 304, a corresponding quantized codec transform is applied. In the case of the base layer 304, the output of a corresponding quantized codec transform 170 is a decoded base layer 310. That decoded base layer 310 is upsized by the optimal upsize filter 100 to the same resolution as Layer 1. Layer 1 and the upsized decoded base layer are subtracted 312, and the result is coded and decoded by a corresponding quantized codec transform 170. The decoded output of that transform is added 314 back to the upsized decoded base layer, resulting in a decoded Layer 1 (316).

Similarly, the decoded Layer 1 (316) is upsized by the optimal upsize filter 100 to the same resolution as the original frame. The original frame and the upsized decoded Layer 1 are subtracted 318, and the result is coded and decoded by a corresponding quantized codec transform 170. The decoded output of that transform is added 320 back to the upsized decoded Layer 1, resulting in a decoded full resolution version 322 of the original frame 300. Note also that bit-exact lossless coding can be applied as an alternative to the quantized lossy codec at this level, or as an additional layer after the lossy codec. Additional signal-to-noise (SNR) layers can be added after this lossy layer, and prior to, and optionally including, the final lossless layer.

Optionally, flowfield motion compensation 330 may be applied at each of these three example layers, using variable resizing of the motion vectors (usually variable upsize) to correspond to the resolution of each layer at which it is applied. The flowfield for each frame or layer is coded (typically via transformed quantized coding) and sent to a decoder, along with quantized (and usually transformed into coefficients) coded difference values for the frame or layer pixels. Each flowfield motion compensated image is then subtracted 340, 342, 344 from each corresponding layer prior to quantized (and usually transformed) coding. Upon decoding of each frame or layer, the decoded flowfield is used to motion compensate a previously-decoded image at each corresponding layer's resolution, which is then summed 341, 343, 345 to the decoded difference pixels.

Use of Floating Point

A floating point representation for motion vectors and pixels allows high precision computations during the various filtering steps (both displacement filters and resizing filters). The use of floating point also allows integration with existing wavelet and optimal filter tools, as described in U.S. patent application Ser. No. 11/225,665, "High Quality Wide-Range Multi-Layer Compression Coding System" by the present inventor. Further, the present invention can also be integrated with U.S. Patent Application No. 60/758,490, "Efficient Bit-Exact Lossless Image Coding Residual System" by the present inventor. A residual can be used to yield an efficient bit-exact wide range image reproduction with the flowfield motion compensation system of the present invention.

Types of Flowfield Motion Compensation

One aspect of the present invention utilizes Intra, Forward, and Multiple frame types. Intra frames, called "I" frames, stand alone, as in the prior art. An "F" frame is a Forward Flowfield Predicted frame, and an "M" frame is a Multiple Reference Frame Predicted frame. The F frame is similar to a "P" (forward predicted) frame in MPEG-2 and MPEG-4 macroblock-based motion compensation. The M frame is similar to a "B" (bi-directionally predicted) in MPEG-2 and MPEG-4 macroblock-based motion compensation. However, importantly, F and M frames utilize flowfield motion compensation rather than macro-block based motion compensation.

An important concept of the present invention is to create a flowfield from one "F" reference frame to the next. If "M" frames are present, the method can utilize the flowfields of nearby frames, with emphasis on the flowfield which goes between the nearest previous reference frame (either "F" or "I") and the nearest subsequent F frames which reference each other via a flowfield. M frames can also use new flowfields (usually one forward and one back) to reference the previous and subsequent reference frames (either "F" or "I").

Figure 4:
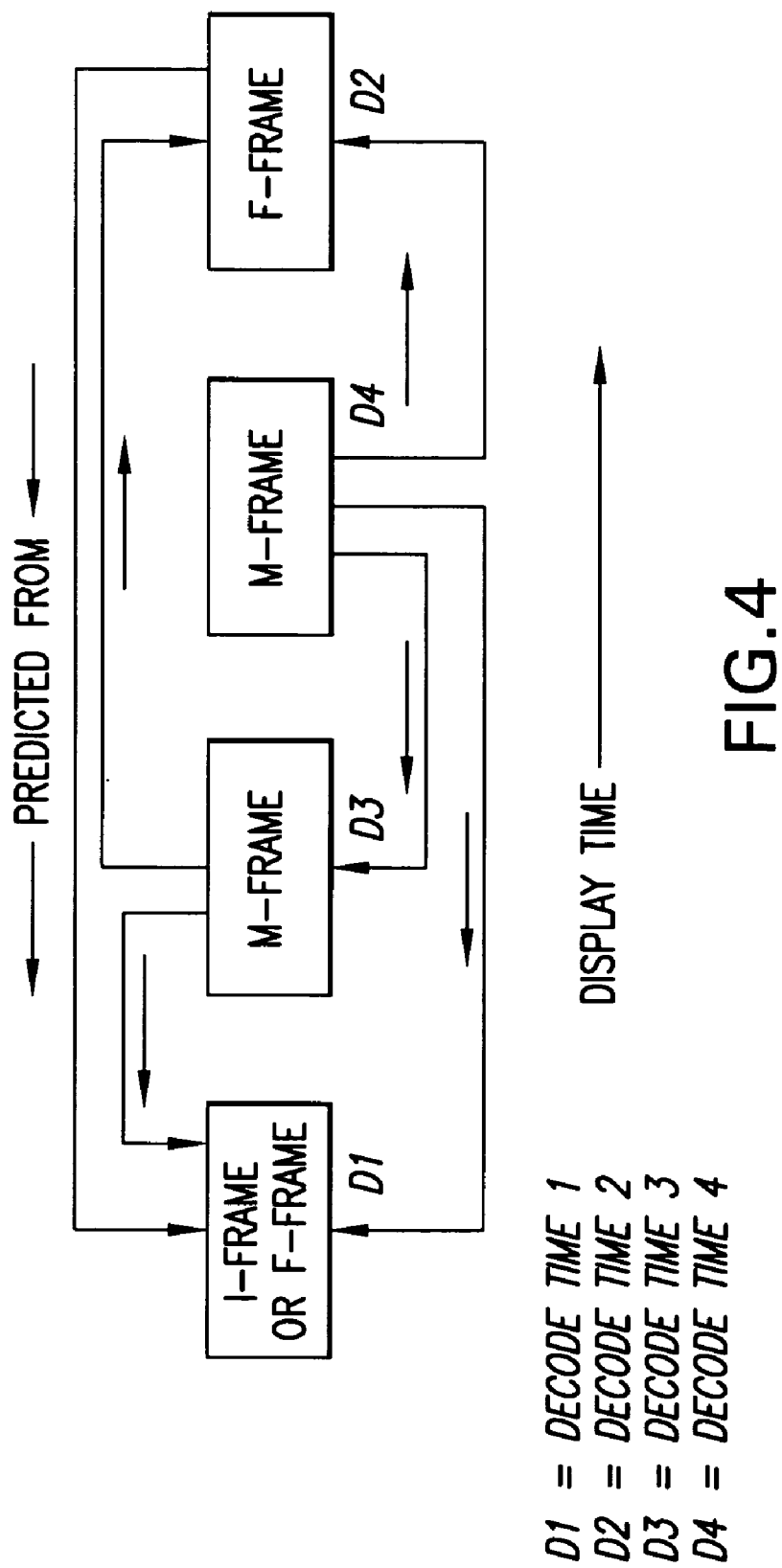
FIG. 4 is a block diagram showing an example prediction dependency for flowfield motion compensation.

FIG. 4 is a block diagram showing an example prediction dependency for flowfield motion compensation. In this example, the display time of each frame goes from left to right in the figure, whereas the decoding time proceeds from D1 (an I or F frame), to D2 (an F frame), to D3 (an M frame), to D4 (an M frame). Example dependencies are shown wherein the F (forward predicted) frame at decoding time D2 is flowfield motion predicted solely from the I (intra) or F frame which was decoded at decoding time D1. The M (multiple frame reference predicted) frame at decoding time D3 references the frames decoded at both times D1 and D2, and preferably uses a weighted blend of the flowfield motion predicted images which reference frames D1 and D2 to yield a blended flowfield motion predicted image for time D3. The M frame at decoding time D4 references the previously decoded frames from times D1, D2, and D3. Frame D4 preferably uses a weighted blend of the flowfield motion predicted images which reference D1, D2, and D3 to yield the blended flowfield motion predicted image for time D4.

Motion Vector Interpolation

In the simplest embodiment of the invention, a motion vector is found for each N×N block using a best-match criteria. For example, each 16×16 block can be matched using minimum SAD (sum of absolute difference). For this step in this simplest embodiment, the motion compensation process is the same as MPEG-2. However, the next step is to interpolate the motion vectors to full resolution. This is effectively accomplished applying the variable upsize filter 100 at upsize by 16 (both horizontally and vertically) to the motion compensated output of the first matching step, thereby upsizing the horizontal and vertical motion vector displacements. MPEG-2 motion compensation is a simple case of this upsize filter where the filter function is a simple box filter of width 16. However, a smoother upsize filter, such as a Gaussian or windowed sinc, will smoothly vary the motion vectors between every pixel. Only the center pixel of each block is guaranteed to have been part of a best match, however.

Reduced Resolution Block Match

A more effective first step in the present invention is to create a reduced resolution image for each frame using the variable downsize filter 120. Although full resolution motion matching can also be used, a reduced resolution is less sensitive to noise (lower resolutions have lower noise). When using this reduced resolution, this step will be refined with further full resolution searching.

When determining motion vectors, it is usually beneficial to match each region using a larger area than the represented region. For example, if we are finding a motion vector for every 4×4 pixel region in a reduced (or full) resolution image, we can match a larger 8×8 region by extending the 4×4 region by 2 pixels on each side. There will be a resulting motion vector for each 4×4 region (even though the match was made using a larger 8×8 region in this example).

A weighting can be applied to the 8×8 region favoring the center, such that full weight is given to the inner 2×2 pixels, with linear (or other function) weighting reduction to the edge of the outer 8×8. The outer 8×8, for example, could have for rows/columns 1 and 8 an 85% weighting, with 2 and 7 at 90%, 3 and 6 at 95%, and 4 and 5 (i.e., the center 2×2 pixels) at 100% weighting.

It is also usually beneficial to bias the reduced resolution block match to favor shorter motion vectors. In a uniform field having no detail, like a blue sky, it is beneficial to choose short motion vectors instead of regions of sky and image noise which are far away, even though far away regions may match slightly better. If a minimum SAD is used to determine the best match, the SAD of longer vectors can be scaled up as a function of the motion vector length to favor shorter motion vector matches. A zero motion vector match is often desirable, and the SAD at the zero motion vector can be scaled down to favor it. The amounts of these favoring functions can be tuned to match anticipated image types and their anticipated average noise floors. Even small biasing functions in favor of short and zero vectors can be quite helpful in smoothing the flowfield and removing long extraneous vectors.

The motion vectors from the reduced resolution match can be interpolated into a flowfield using the variable upsize filter 100. For example, if there is a motion vector for each 4×4 region using reduced resolution images having a ¼ horizontal and vertical resolution, then the resulting motion vectors will be upsized by 16 (horizontally and vertically) to yield one motion vector for every pixel.

SAD, SSD, and Median

When determining motion vectors, in addition to SAD, the sum of square differences (SSD) can be used, with an appropriate scaling (such as 0.01), to form a weighted sum with the SAD. Other exponents beside 1.0 (SAD) and 2.0 (SSD) are also potentially useful, such as 1.5. The higher exponents (such as SSD, with an exponent of 2.0) bias against each individual large mismatch, whereas the lower exponents (such as SAD, with an exponent of 1.0) bias against overall mismatches. The median of the 64 pixels in an 8×8 region finds a best match when more than 50% (the majority) of the pixels match well. A blend of SSD, SAD, and median, with appropriate blend weights, can be effective in finding a good match. The use of correlation and autocorrelation will be described below, and can also be usefully blended to improve the quality of matching.

Refinement Matching

The present invention also utilizes the option of refining the motion compensated matching by using one or more additional motion matches at increasing steps of resolution. For example, after interpolating up to full resolution, each 4×4 region at full resolution can be matched by searching a small delta distance of a few pixels horizontally and vertically. This process can also utilize intermediate searching steps, such as (for example) ½ resolution and then full resolution. In this way, the motion vector flowfield is refined by each such resolution increase and refinement searching step. In this example, there would be an accurate match yielding a motion vector for every 4×4 region of the full resolution image (thus at quarter resolution).

Such refinement will both retain the integrity of the original block match, as well as adding the integrity of smaller local matching for each smaller region at ever increasing resolution, up to the full resolution.

The resulting flowfield will be a reasonable representation of the actual image motion flowfield when good frame region matching is possible.

Noise Reduction

It is likely that a flowfield will have motion vector noise due to imperfections in the matches and due to noise between frames. It is therefore useful to apply common noise filters such as softening and median filters to the motion vector field. This is useful prior and/or subsequent to any and every resolution step, including the final per-pixel flowfield interpolation filtering.

Note that the use of noise reduction smoothing, plus the use of a smooth upsize filter, allows statistical improvement in the precision of the motion vectors. This provides the practical benefit of allowing the use of reduced matching precision at one or more steps, including the final full resolution step. For example, if 4×4 regions are being matched at any resolution, including full resolution, the matching can be performed at whole pixel boundaries with only a slight overall degradation in efficiency compared to half-pixel, quarter pixel, or eighth pixel displacement vector block matching. The statistics of the noise reduction will tend to smooth the motion vector locations to correct sub-pixel fractions. If floating point values are used for motion vector lengths and for the noise reduction filters, the displacement and resizing filters can accurately interpolate values to a fine fraction of a pixel (including fine resolution such as ¹⁄₁₀₀ or ¹⁄₁₀₀₀ of a pixel).

A simple way to implement such noise reduction is to iterate multiple passes of a basic noise reduction filter. A noise reduction filter can be implemented as a simple softening filter (e.g., unsharp mask), then a sharpening filter or a median filter with the values of the neighboring pixels (motion vectors or neighbors in this case), or a combination of soften then sharpen and median filters.

It is also possible to regionally soften the motion vector flowfield when the confidence is low, or when a region is known to be out-of-focus (usually due to depth-of-field). Thus, the amount of local smoothing of the motion vectors can be driven by the confidence channel, or by other regional information signaling that greater flowfield smoothing would be locally beneficial.

Warped Matching

Since the goal of the reduced resolution matches is usually to create a guide flowfield for further refinement, more complex matches can also be used beyond simple block displacement matching (i.e., searching a block around a region of surrounding pixels, looking for a best match). For example, the 8×8 block, for the 4×4 region matches at reduced resolution, can be altered by expansion, shrinking, rotations, warping, and other natural small-regional motions. Warping can include pincushion, keystone, shearing, tilting, and other natural useful warps. It can also be convenient to use affine transformations which separate the horizontal and vertical displacements. Affine transformations yield a moderate useful class of shape-distorting transformations.

Since the resulting flowfield will be tolerant to local shape changes in the 4×4 region and between a given 4×4 region and adjacent regions, distorted block matches can augment simple displacement block matches when creating each resolution step from the lowest to the highest. The resulting per-pixel flowfield, at any resolution, can then use the warped block displacements prior to further interpolation filtering (usually using variable upsize) of the flowfield.

A simple way to test these matches is to sum various distortion pattern motion vectors in an 8×8 array with a test displacement center motion vector. Using the variable displacement tool 130, the sum of the overall center motion vector with the pattern motion vector can yield the entire useful range of distortion patterns. The distortion pattern motion vectors will usually be fairly short, typically being half a pixel at the edge of the 8×8 region, and less approaching the center (which becomes nearly zero). The distortion pattern can be weighted both positively and negatively to yield left and right shear, up shear versus down shear, pincushion and narrow waist, end bulge versus end pinch, top and bottom bulge versus pinch, left rotation and right rotation, expansion versus contraction, etc. Further, the weight can scale the amount of the distortion to test an arbitrary signed range of distortion amounts (for example, by multiplying the distortion pattern motion vectors by 1.0, 0.67, 0.33, −0.33, −0.67, and −1.0).

Layered Use of the Flowfield

Once a flowfield is created in any of the manners discussed above, it can be interpolated both up (using the variable upsize filter 100) and down (using the variable downsize filter 120) in resolution to be applied at any resolution of a layered system. In the example of using 4×4 regions, if a motion vector is available for every 4×4 region, then an upsize by 4 can be used (horizontally and vertically) to yield a motion vector flowfield for each pixel at full resolution. At an intermediate resolution layer of half resolution, the motion vector flowfield can be upsized by two (horizontally and vertically) to yield a motion vector for every pixel in the half resolution image.

If arbitrary resolution layers are used, such as ⅔ of full resolution, then the motion vector flowfield can be interpolated to these arbitrary resolutions using the variable upsize 100 and/or variable downsize filters 120 (however, usually upsize will be preferred).

The motion vectors must be scaled in length corresponding to the amount of upsize or downsize, since the number of pixels in the displacements must match the resolution in which these displacements are being applied. Thus, for example, if a frame is upsized by 4, then the corresponding motion vectors must be scaled up by a factor of 4.

The motion vectors in each flowfield may be implemented using whole-pixel or fractional-pixels searches. Fractional pixels displacements should involve correct displacement filters when the image is sharp, but a variety of levels of sharpness can be applied for the displacement (including for the whole-pixel and zero displacements).

MPEG-2 supports ½ pixel macroblock displacement using a poor-quality box filter. MPEG-4 part 2 allows negative lobes at the ½ pixel point but is a box filter to ¼ pixel resolution. MPEG-4 part 10 (AVC) allows more positions of displacement with negative lobes, corresponding to U.S. Pat. No. 6,728,317 entitled "Moving Image Compression Quality Enhancement Using Displacement Filters With Negative Lobes" by the present inventor. However, all of these macroblock-based motion vector displacements are implemented as integers with small fractional components (e.g., ½ or ¼, adding one or two bits to the integer's decimal point, respectively).

The present invention may be implemented using integer or integer plus fraction motion vector displacements. However, the preferred embodiment utilizes floating point for the motion vectors, allowing continuous motion vector interpolation. The variable displacement filter 130 is preferably implemented so that it can accept floating point motion vectors, one for each pixel or one for each region of pixels (e.g., a region of 4×4).

Confidence

In determining motion vectors, the match quality when comparing regions may be interpreted as a confidence measure for each level in the matching process. For example, the minimum SAD may be retained such that a low value indicates a high confidence. Other match methods, such as comparing correlation with autocorrelation for similarity, can also be used. A combination of methods can also be used, such that several match criteria can be weighted together to create a combined confidence level.

Some common frame-to-frame changes, such as a scene fade or an object moving toward a light, will have an overall or local brightness change between frames. For many such changes, regions which visually match will not match using an SAD criteria for best match. Correlation and autocorrelation remove DC (i.e., the average value) from a frame, such that correlation-based algorithms will often match at locations where DC-offset-removed SAD also matches. In order to improve SAD, an average DC value may be added or subtracted locally to the overall frame. This is accomplished by adding a small local positive or negative DC value to the pixels to one of the two images prior to computing the differences and summing their absolute values (SAD is the Sum of Absolute Differences).

When using a regionally varying DC bias, and thus not using an overall DC bias for matching an entire frame, it is beneficial to use a DC SAD and/or SSD bias which varies smoothly over regions of the frame. Accordingly, each region can be examined to determine the average SAD and/or SSD with a variety of DC bias amounts. The resulting DC corresponding to the minimum SAD for each region can then be smoothed over the entire frame, and applied when finding the optimal motion vectors. Since the average SAD has been minimized using this regional or overall DC bias, the match has been correspondingly improved. The confidence, therefore, has also been correspondingly improved.

Since the result of matching is the confidence and motion vector, the DC value used with SAD need not be sent to the decoder.

Note that a common confound in motion compensation is the gradual darkening of images near the edge of the frame due to lens "rolloff" in the original camera. Very few cameras and lenses are perfectly uniform in conveying light from all regions of the frame. The use of DC offset testing and variation in finding the minimum SAD automatically removes this confound due to lens edge brightness falloff. Large area gradual color variations due to other optical issues in the camera will also be removed when the DC is independently varied for RGB, or YUV. However, it will be typical to only use small DC variation amounts when optimizing SAD minimum during matching. Some variations across a frame may be larger than typical DC variation amounts. In such cases, it is best to attempt to discover overall color and brightness variations across the frame, and factor these into the DC values used when performing SAD matches. Note that an image region of pixels moving from the edge of the frame toward the center will usually brighten if there is lens-edge darkening due to lens design imperfection. On the other hand, a region moving from the center toward the edge will normally darken. Thus, the DC bias amount will need to be varied depending upon nearness of a region to the edge, as well as the direction with respect to the nearest edge (left, right, top, or bottom), in order to correct for overall frame brightness variation. After a number of frames, the optimal DC resulting in consistently minimum SAD results will eventually yield a map of the overall frame brightness rolloff near edges, and other non-uniformities in the image. Thus, it is useful to accumulate a running average of the DC (one for RGB or YUV, or one for each of R, G, and B, or each of Y, U, and V) associated with minimum SAD for each region (e.g., for each 4×4 pixels). A running average can be accumulated during encoding by keeping a count of the number of values which have been stored, and by weighting in the new value by the reciprocal of the incremented number of values. The number of values also helps establish whether a given region has had a sufficient number of frame references to create a smooth and accurate average.

Note that this methodology will also correct for other consistent variations within a frame, such as a light near the edge of a frame. The light can even have a slightly different color compared to the lighting in other parts of the frame, and yet still be corrected via three DC values, one for each of RGB, or of YUV. In this case, the DC will increase near the frame edge, rather than decrease. However, a moving camera, shot cuts, and scene changes will all hinder the accumulation of such useful information using the average DC for each image region. Thus, while the testing of small variations in DC values is generally useful for optimizing and minimizing SAD, the usefulness of the accumulated average of the DC is dependent upon the circumstance. It can be useful in some circumstances, but will not be useful in others. It is thus beneficial to determine whether it will be useful in a given circumstance, such as by manual indication based upon known scene properties, or by testing for any benefit. If so, the result should be indicated to the encoder. For example, with a surveillance camera having constant lighting (such as constant night illumination or windowless indoor overhead lighting and without large changing shadows), a single lens without zoom, and a fixed position camera (no pan or tilt), the accumulated DC average value can be useful, and this can be indicated to the encoder.

In particular, using various independent criteria, such as the SAD, the DC-biased SAD, the SSD, the DC-biased SSD, and the correspondence between autocorrelation and correlation, various candidate motion vectors can be evaluated. A comparison of the DC-biased SAD and/or SSD with a non-biased SAD and/or SSD can help determine whether the DC bias is beneficial or not in a given region. The motion vectors corresponding to the several lowest resulting SAD and/or SSD positions can then be compared with the motion vectors corresponding to the several best autocorrelation-to-correlation matches. The best motion vectors can then be examined with respect to smoothness of the flowfield compared to neighboring motion vectors, and other selection criteria. It may also be useful to iterate multiple passes over the entire flowfield in order to evaluate various candidate motion vector choices with respect to similar candidate motion vector choices for neighboring motion vectors, until a "relaxed" motion vector field is achieved (using an equivalent process to mathematical relaxation iteration techniques). The resulting motion vector selected for each tested location will usually be very effective for use in the final flowfield.

Another useful element in the search for the lowest SAD and/or SSD and the smoothest flowfield is to examine the flowfield of other nearby frames, and between other nearby frames. For example, when using flowfields between other nearby frames, such flowfields will usually need to be projected into the current frame's time, or the matching frame's time, or both (see below for a description of means of projecting and inverting flowfields). While nearby frames may not match everything in the current frame (such as a turn signal light on a car which is only on in the current frame, but not on in any nearby frames), the nearby frames often provide useful guidance for most regions of most images when optimizing flowfields. For example, these additional motion vectors can also be tested to see if they provide a better match having better confidence.

The confidence value of each region can be retained and processed using the variable upsize (or downsize) filter tool. It is common to use 3 channels for upsize filters and downsize filters for RGB and YUV. For convenience, the same three channels can be used to process the horizontal and vertical components of the motion vector and the confidence values. Note that the confidence is not scaled when the resolution is upsized or downsized, even though the motion vectors must be scaled.

Confidence can be refined at each motion vector refinement layer, since a new best match over an ever-smaller region is available.

Absolute and Relative Confidence

Confidence (i.e., confidence values, determined as above) can be considered relative to an average overall confidence. Above the first matching layer in a refinement hierarchy, the confidence of each lower layer is available, including the overall average confidence for each of red, green, and blue, or Y, U, and V. These local and overall average confidence values can be used to optimize the effectiveness of the flowfield motion compensation.

A local or overall best match might be found in some case to have a relatively poor confidence, such as a sum of R, G, and B or Y, U, and V SAD's larger than some threshold, such as 0.1 (when using the range 0.0 for black to 1.0 for nominal white). Alternatively, if the best match of a correlation between frames compared to the autocorrelation of the new predicted frame differs by more than some selected value, such as 20%, the match can be considered to be poor. On the other hand, an SAD at around 0.001 and/or an autocorrelation and correlation within about 3% may be seen as a good match. Thus, it is possible to determine that a given local or overall best match is good or poor based solely on the value of the best match.

An overall poor match can indicate that there is a scene cut between the reference and predicted frame. As such, an overall poor match, such as a high average SAD, can be used to determine that a given frame should be intra coded instead of being predicted. However, this can also be determined by comparing the number of bits generated by predicting the frame with the bits for intra-coding the frame, or with respect to the most recent previous intra-coded frame.

Useful determinations and parametric adjustments can also be based upon a comparison of a given best match criterion to the overall average match quality. If a match is better than the average match quality, and the average match quality is good (or at least not poor), then that particular match can be seen to be better than the average, and is likely to be a good match.

Automatic Determination of Noise Floor from the Flowfield Using Best Match Confidence Level as a Function of Color and Brightness The best local and average match levels are a combined indication of the difference between frames, together with the noise level of the image. The noise level will form an indication of the difference between frames that would occur even if the frames were to be otherwise identical to each other and perfectly matched during motion compensation. The frame-to-frame noise will be present in the best matches, even if the images appear otherwise identical.

In general, noise in the image is a function of brightness and color. For complex images, such as multi-image composited frames (e.g., blue-screen or green-screen), the noise level may further vary over different regions of the image.

The lowest local or overall match level (i.e., highest confidence) can be categorized by brightness and color. This can be done by keeping lists of the lowest match level for each range of brightness and color, forming a three-dimensional histogram. An examination of the resulting list then yields an automatic determination of the noise floor as a function of brightness and color. If the histograms apply to regions within the image, then this noise floor information is both regional as well as a being a function of color and brightness.

The noise floor, as a function of color and brightness, can be determined by examining the best match within each (e.g., the best 4×4 or 8×8 match SAD) for each of red, green, and blue, or Y (typically=0.59G+0.29R+0.12B), U (=R−Y), and V (=B−Y) in each histogram list. If the lists are sorted to the lowest SAD value for each color, and if the histogram is kept for each range of color and brightness, then the noise floor will be indicated by the lowest value in each histogram list. Alternative, the lowest several, dozens, or hundreds of values, or the lowest portion of the list (e.g., lowest 10%) can be averaged to determine the noise floor. Since each histogram can be maintained regionally, as well as by color and brightness, a reasonably complete characterization of the noise floor for an image can be obtained using histograms of the flowfield match level (e.g., SAD of the best match, or the similarity of the correlation and autocorrelation of the best match, or a function of both, and/or other useful match quality criteria). Note that a typical use of the histogram will involve 3-D interpolation (the three dimensions usually being red, green, and blue or Y, U, and V).

However, it is often not possible to know whether frames differ significantly within the image being seen, such as when the camera is looking at a full frame of ocean waves. In such a scene case, it will not be possible to infer the noise floor. However, over a number of frames and a number of scenes, the noise floor can eventually be discovered, since stable scenes are the norm, and pathological scenes (such as a full frame of ocean waves) are the rare case. Composed moving images (like movies and television shows) must be composed of stable image regions for the eye to view in order to understand the meaning of the scene. Scientific and natural scenes, however, are not guaranteed to be visually stable, although a simple examination by human viewing can easily indicate pathological cases which are not useful for determining image noise floor.

In addition to pathological scenes, the typically limited range of brightness and color in any given scene may not fill in the noise floor for all colors and brightnesses. However, this automatic characterization will find the noise floor for all colors and brightnesses which are actually present in the current frame, which is usually sufficient. Over a number of scenes, however, most brightnesses and most of the range of colors used in a given show will eventually be automatically characterized using this method. However, it may become necessary to distinguish between different cameras, different brands of cameras, film, and other moving image sources, in order to segregate their noise floor characterizations. Such segregation may be determined automatically in most cases, by examining the noise floor histogram of each shot and/or each scene. Human examination, or prior categorization of image sources (e.g., by frame range for each image source), can also be used to distinguish image sources when determining the noise floor.

For each image source, if the noise level of the images is known a priori, such as with a fully characterized digital motion image camera, that noise level can then represent a value corresponding to a perfect motion match between any region of the image. Thus, such a priori knowledge of the camera characteristics is another way to provide the noise floor for use in comparison with any best match to further grade the quality of any such match with respect to the noise floor.

Use of Autocorrelation and Correlation as Additional Means to Determine the Noise Floor In addition to minimum SAD, it is also useful to keep a sorted-list histogram (as a function or region, color, and brightness) of minimum autocorrelation for best-match regions. The lowest autocorrelation is another indication of the noise floor, in addition to the minimum SAD. The autocorrelation need not examine the flowfield, nor adjacent frames, since autocorrelation is a local measure of detail (including the noise floor detail) in each image frame.

The autocorrelation noise floor can be retained instead of, or in addition to, the SAD and/or SSD noise floor.

It is also often useful to use the flowfield displacements to examine the autocorrelation at the matching region of one or more nearby frames. Thus, more than one useful autocorrelation is available through flowfields to nearby frames.

In addition, the correlation to those locations in matching frames is also useful. For example, the lowest correlation values across the flowfield at the location of the best matches will also provide another useful representation of the noise floor. The noise between frames is both correlated and uncorrelated. For example, thermal sensor noise, or film grain noise, is uncorrelated from frame to frame. However, fixed-pattern noise, especially with zero motion vectors, is correlated noise. Displaced fixed pattern noise is partially correlated if the patterns interact with displacement (e.g., depending on the sensor fixed noise patterns).

The lowest correlation values across the flowfields must be determined at the point of best matching (using a different match criteria than lowest correlation, such as minimum SAD, or correlation being nearly the same as autocorrelation). However, such lowest correlation values, when histogram sorted as a function of region, color, and brightness, represent yet another useful measure of the noise floor.

A comparison of the correlation to autocorrelation for zero motion vectorsversus non-zero motion vectors provides a direct measure of the fixed pattern noise in frames which are similar. Thus, in addition to keeping histogram lists as a function of region, brightness, and color, it is also useful to keep separate histogram lists for zero and nonzero motion vectors. Using the resulting correlations, with respect to autocorrelations at the same locations of best matches at both zero and non-zero motion vectors, the comparison directly yields a measure of the fixed-pattern noise floor. Fixed pattern noise is a confound to motion compensation, including flowfield motion compensation. Thus, knowledge of the fixed pattern noise floor can be helpful in both the creation of the flowfield motion vectors, as well as other uses of the noise floor, which can often benefit from an independent characterization of the local fixed pattern noise level (such as patterns in sensor or scanners) versus the image noise level (such as film grain or sensor thermal noise).

By way of example, consider the lowest sorted autocorrelation (the lowest within the sorted histogram list) in a region (such as a 4×4 block) around a zero motion vector to both the previous and subsequent frame (in the case where the motion vector is zero to both for a best match using a criterion such as minimum SAD). The correlation of the current frame against the previous and subsequent frame's pixels can be compared to the autocorrelation of the current frame, the autocorrelation of the previous frame, and the autocorrelation of the subsequent frame in this region (e.g., the 4×4 block matching region). If these three autocorrelations are all near each other in amount, and if the correlations to the previous and subsequent frame are each a significant enough amount (e.g., about 30%) lower than the average autocorrelation, then the frame-to-frame noise floor without fixed pattern noise will be near the amount indicated by the correlation (in this zero motion vector case). The difference between the higher average autocorrelation and the correlation (in this case, 30%) is the approximate amount of the fixed pattern noise.

Similarly, if the lowest correlation within the histogram's sorted list is 30% higher for nonzero motion vectors than the lowest correlation within the histogram's sorted list for a zero motion vector, then the difference (in this case, 30%) further indicates the approximate amount of the fixed pattern noise. Only zero motion vectors allow in-place cancellation of area fixed pattern noise with respect to the correlation between different frames.

Note that line-array film scanner fixed-pattern noise can be detected with motion vectors which have zero on one axis (perpendicular to the direction of the line array scan), corresponding to the frame scan sweep of each pixel on the line array using similar methodologies.

Accumulating Fixed Pattern Noise

In order to determine the fixed pattern noise, a softened blurred version of the region can be subtracted from a sharp version of the region for all cases of zero motion vectors and high confidence (e.g., good match). For each pixel in the frame, a running average of this difference may be retained by accumulating the RGB or YUV difference when there is a zero motion vector and high confidence. The running RGB or YUV average can be gradually accumulated by storing the number of entries in the accumulation, and weighting each new entry by the reciprocal of the incremented number of entries. Eventually, when the number of entries reaches hundreds or thousands of frame references, the fine detail of the fixed pattern noise will have accumulated in the running average for each of RGB and YUV.

Note that larger patterns in the fixed pattern noise, such as a darkening of the image near frame edges, must be determined using other methods (such as by camera and lens characterization, or by using test images of uniform fields of grey).

The presence or absence of zero motion vectors to nearby frames in any given region of any given frame will be inconsistent. Thus, fixed pattern noise information must be marked with respect its presence or absence in any given frame.

Because of the inconsistent presence of regions of zero motion vectors, it is potentially useful to accumulate noise floor information over multiple frames, shots, and scenes. However, this is only useful if there are no changes in image source (like a scene cut between different cameras, or a change of film stock), nor per-shot or per-scene changes in color adjustment. However, a consistent camera with a consistent color balance setting can provide moving images which can be used to accumulate a map of the fixed pattern noise floor level. The fixed pattern noise itself can also be mapped gradually over a sequence of frames by comparing local variations in pixel values with respect to average pixel values for each local region of the image. When this is done utilizing both zero-motion-vector matching regions, as well as non-zero-motion-vector matching regions, the fixed pattern noise can eventually be determined (after a number of frames and scenes). Note that the resulting fixed pattern noise can eventually be determined as a function of brightness and color for every pixel location. Thus, a complete characterization of the fixed pattern noise can eventually be accumulated in the case of a single camera with unchanging color settings.

Of course, constant-color frame groups which are iterated over all colors and brightnesses can be more directly used to characterize fixed pattern noise within image sensors and cameras, as well as film scanners.

However, using the techniques described here, significant portions of the fixed pattern noise and its regional noise level can be characterized automatically from normal image scenes, and even for individual frames (optionally also examining nearby neighboring frames).

Once a map of the fixed pattern noise is determined, by whatever means, as a function of color and brightness for each pixel, the fixed pattern noise can be removed from every frame. Fixed pattern noise removal is beneficial to motion compensation, as well as to the quality of each frame's image (including intra frames). In cases where portions of the image have obtained fixed pattern noise information for some colors and brightnesses (but not the entire image for all colors and brightnesses), that information can still be used in those regions and for those brightnesses and colors: Thus, a partial benefit can still be achieved when only partial characterization of the fixed pattern noise and noise floor level have been obtained (e.g., for some regions, for some colors and brightnesses). Note that the fixed pattern noise floor is simpler to characterize that the fixed pattern itself, and thus is more often available for given regions, colors, and brightnesses.

Note that noise floor is a function not only of color and brightness, but also of resolution layer (in the preferred resolution-layered codec). Minimum SAD, SSD, and autocorrelation can all be applied to each resolution-enhancing layer to provide a characterization of the noise floor at each resolution-enhancing layer as a function of color and brightness.

Image Sharpness Tied to Motion Vector Length

Due to motion blur during the "shutter open" time, a rapidly moving object will be blurred along the direction of motion. For example, if a 50% (also known as 180 degree "shutter angle") shutter-open portion of time is used, then a 6 pixel motion at a given resolution will have a 3 pixel motion blur, and thus a soft filter function can be used with a larger width than a normal full-sharpness windowed sinc. The displaced motion-blurred object will have the same extent (e.g., a 3-pixel blur) in each frame, so the soft filter function should not be set to increase the length by much. However, if an object is known to have been blurred over 20 pixels, a couple of pixels wider and softer filter would not lengthen the blur by much in proportion to this longer blur. Note that it is sometimes useful in conjunction with the present invention to signal the shutter angle to the decoder, if it is known, and thus to scale filter sharpness/softness as a function of this shutter angle.

When using a softer filter, a Gaussian, spline, or other adjustable-sharpness displacement filter function can be applied in addition to a widened windowed sinc. The signal processing filter theory of filter resolution reduction utilizes an ever-widening windowed sinc in order to have an ever-softening filter. See, for example, FIG. 2. The knowledge that the motion vector length indicates the amount of motion blur can be utilized when performing the displacement filter step. For example, if a given pixel has a long horizontal motion vector, a soft displacement filter can be used for the horizontal component of displacement. If a pixel's motion vector is short, then motion blur is most likely insignificant, and sharp displacement filters should be used to preserve detail. Since motion vector lengths are scaled with each layer in resolution, the amount of motion blur relative to that resolution level will be used in determining the required filter sharpness at that level.

Because the motion vectors in the flowfield are scaled to any resolution level in which they are applied, the motion blur amount can be inferred entirely from an assumption of (or knowledge of) the shutter open percentage (shutter angle). If intervening M frames are present, then the motion vectors between non-adjacent frames, such as a P to a previous P or I frame, are then scaled to a single frame unit (e.g., for M=3, divided by 3), and then applied given the assumed (or known) shutter open percentage. Matching the flowfield pixel displacement filter sharpness to the motion blur associated with the pixel's motion vector length allows flowfield image displacement which is highly effective.

The major benefit of using soft displacement filters is that noise is not conveyed through flowfield motion compensation, in the case of significant motion. Using a fully sharp displacement filter conveys the previous reference frame's noise as well as image. Uncorrelated noise adds statistically to increase by the square-root of two (1.414 . . . ) between two uncorrelated noise sources when they are summed. Use of the motion vector direction allows details to be conveyed fully orthogonal to the direction of motion, while still reducing noise via soft filtering along the direction of motion. Thus, in regions of the image having softer displacement filters, only the current frame's noise will need to be coded, even though full detail is present perpendicular to the direction of motion.

If a portion of the image is out of focus (due to lens depth of field, for example), but is not displaced, then the image will be soft with short motion vectors. In this case, unless other information is provided, the displacement filter will be sharp even though the image is not sharp. However, it is possible to use the local autocorrelation of a small region (e.g., 4×4 pixels) to determine if image detail is present, by comparing the autocorrelation with the noise floor at the average brightness and color. High autocorrelation will indicate significant local detail, whereas low autocorrelation approaching the level of the noise floor indicates out-of-focus (or otherwise softened) image regions which can then utilize a softer pixel displacement filter. In this approach, it is possible to have unwanted suppression of low-amplitude detail, such as carpet texture or lawn texture which will be displaced using a soft displacement filter. However, the difference correction after motion compensation should restore these details if the quantization is set at or below the image noise floor.

It should be noted that all motion compensation errors will be corrected by the quantized difference correction, such that the flowfield motion compensation is successful if it reduces the overall bits at one or more levels (or at all levels), even if the motion-compensated image has regions which are incorrect or imperfect.

Frame to frame inherent confounds exist as well, due to the nature of frame-based motion capture, where frame-to-frame regional matching is impossible and thus where motion compensation cannot be beneficial to coding efficiency within those regions. Again, the correction of motion compensation errors using a quantized coding delta will still yield a correct image on each frame, even when motion compensation is thus ineffective in a given region. Fortunately, such pathological cases where frames cannot be matched are statistically much less likely than frames where large regions match successfully. Thus, it is statistical likely that flowfield motion compensation will usually benefit compression coding efficiency.

Divergent Motion Vectors

Another useful criterion for determining confidence is to examine the local divergence of motion vectors. If the motion vector for a given pixel is similar to its neighbors, then there is little divergence, indicating high confidence. If, however, there is significant divergence between a motion vector and its neighbors, then low confidence can be inferred and a softer displacement filter utilized.

These motion vector determinations can be combined with the confidence measure at each level to indicate a filter sharpness versus softness setting, both horizontally and vertically.

Further, if a motion vector is on a diagonal, the filter can be applied by rotating, then soft filter displacement, then re-rotation. Another approach to rotation for diagonal motion vector motion blur softness is to use affine transformations to rotate prior to soft blur filtering along one axis (horizontal or vertical), and then a reverse affine transformation to restore the original diagonal angle. Thus, filter softness can be aligned with the motion vector direction, although separate horizontal and vertical motion vector components are usually sufficiently effective if applied separately to horizontal and vertical filter sharpness.

Iterated Flowfield Refinement

The motion vector flowfield is applied at one or more resolutions, with various confidence values and motion vector lengths driving local (and per pixel) vertical and horizontal filter sharpness during flowfield displacement. The net result on the flowfield-displaced image(s), and the resulting coded difference image(s) of a given motion vector choice, can be tested for various possible best choices. By examining the number of local coded bits, or more simply the local SAD (or other useful match criteria), for a small region surrounding each candidate motion vector, the best motion vector can be selected. This can be particularly useful in regions of low detail, such a sky containing only soft wispy clouds. Many potential motion vectors may have very similar confidence levels. By retaining several of the next-highest confidence vectors, in addition to the highest confidence (best match), it is possible to keep a short list of candidate motion vectors to examine. This method is also useful when the best match is poor, since several matches which are nearly as good may contain one motion vector which is more efficient than others when used in coding. Another useful approach is to compare a given candidate motion vector with neighboring vectors to see if it is similar to one or more of them. Motion vectors which are nearly the same as one or more of the neighboring motion vectors will result in a smoother flowfield, and are thus usually a better choice. Comparison and similarity with several neighbors will be a better choice than one neighbor. As a simple iterative process, comparison with neighbors at the upper left, above, upper right, and left makes for a simple way to compare with neighbors while proceeding to scan the image in conventional fashion (i.e., left to right, top to bottom). The comparison of candidate motion vectors with neighbors and selection for similarity is a means of minimizing divergence among the candidates.

This process of examining several candidate motion vectors can be applied at each level of motion vector resolution refinement, from the lowest reduced resolution block match, to each intermediate resolution layer, up to full resolution. The entire process, through all the layers, may be iterated with various candidate motion vectors, testing each candidate vector at each motion vector resolution refinement layer, or just a portion of the layers. Once the best set of vectors is determined, these best vectors can then be interpolated into the flowfields applied during pixel displacement at various resolution layers.

Human-Assisted Flowfield Optimization

It will also often be beneficial to use human-assisted tools to optimize the flowfield, given that automatic decisions about flowfield choices will sometimes be less desirable than choices than can be guided by a human. For example, a person can point out regions which are out-of-focus or which are fast moving, and conversely regions of interest with high detail. Further, some best matches may yield unnecessary or suboptimal distortions in the flowfield. Computer-assisted human guidance can help choose motion vectors which yield more natural flowfields, as well as increasing coding efficiency (since flowfield artifacts which increase the bit rate can be reduced or eliminated).

Since the flowfield will be encoded via compression, it will usually be helpful to show the flowfield's effectiveness subsequent to flowfield compression encoding and decoding, since it is the decoded flowfield that is applied to the image. This can be done by showing the flowfield as a pseudo-color image and/or as vectors and/or by showing the flowfield-displaced image prior to quantized delta correction. It is also useful to include any other processing steps, such as flowfield smoothing, prior to, or subsequent to, compression coding and decoding, when performing human-assisted optimization of the flowfield.

Encoding and Compressing the Flowfield

While a flowfield does not technically comprise "pixel" values, the array of values comprising a flowfield may be processed by the components of the present invention as if such values were in fact pixels. Since a flowfield will usually be smooth, an optional first step in encoding and compressing a flowfield is to reduce its resolution (e.g., using the variable downsize filter 120). The next optional step is to scale the flowfield so that the maximum vector length (i.e., the maximum search range after one or all layers) is approximately the same value as a white pixel. When using floating point, the usual convention for a white pixel is that it be at 1.0, although floating point coding supports numbers well above 1.0. Note that it is also convenient to scale the motion vector lengths to the flowfield layer-resolution at which they are applied when restoring the maximum vector length. Another way to consider this concept is that the maximum motion vector length is a different number of pixels on each layer of a resolution hierarchy.

The next optional step is to apply a non-linear function to the flowfield in order to more finely encode short motion vectors with a common quantization value. It is not necessary to have high precision when displacing large amounts, since motion blur will inherently limit available sharpness. For short motion vectors, however, significant precision and accuracy is desirable. A simple example function is the square root. Since motion vectors are signed, the sign must be extracted, the square root (in this example) taken of the absolute value, and then the sign must be restored when decoding. Other non-linear scalings can also be applied, but the inverse of any non-linear scaling must be statically implemented in the flowfield decoder, or else flexible scaling functions must be signaled to the decoder (e.g., in a transmitted or conveyed header) and properly inverted to restore proper linear motion vector lengths and their corresponding signs.

At this point in the process, the flowfield may be encoded exactly as if its values were pixels, using, for example, quantized DWT 9/7 bi-orthogonal sub-band wavelet coding, or any other suitable quantized transform codec. One all-band layer may be used, or several layers may be used, when coding using subbands. A useful subband example is three layers, with the lowest resolution having a low-low band as well as the HL, LH and HH bands (the other layers not using a low-low band); for details, see the description in application Ser. No. 11/225,665. It is typical to use finer quantization for each successive reduction in resolution in multi-layer wavelet coding. A typical quantization scaling is the square root of 2 (i.e., 1.414 . . . ). However, since motion vector smoothness and high accuracy at low spatial frequencies is desired, a value of 2.0 quantization scaling for each subband layer will usually be more effective. Similarly, the "tilt matrix" biases finer quantization of low frequencies in some DCT-based codecs (such as MPEG-2 and MPEG-4 part-2). Further, it will generally be optimal to use a zero deadband for flowfield quantization, as described in application Ser. No. 11/225,665. However, if a deadband proves helpful at one or more of the flowfield subband layers, then it must be signaled to the decoder (or statically allocated in common between the encoder and decoder), as with the pixel quantization deadband.

Using this method, a motion vector flowfield can be efficiently coded and conveyed with the compressed image bits (or within a multiplexed bitstream) to a decoder. Folders can be used for each element of compression coding, as described in application Ser. No. 11/225,665. When using subbands, a single folder can contain a file for each flowfield quantized wavelet layer (or quantized DCT), or a combined file, or separate folders can be used for each wavelet layer (or quantized DCT).

If desired, a separate quantization value can be sent to the decoder (e.g., in a transmitted or conveyed header) for each flowfield layer. This quantization value can change with each scene, with each frame, or regionally within a frame. Alternatively a static scaling with respect to the overall image quantization can be applied for each layer, such that the overall quantization of the pixels together with the flowfield are controlled by a common master quantization (which can vary each scene, each frame, or regionally within a frame). Conceptually, it makes sense to improve the precision of the flowfield gradually as the pixel precision is improved, helping improve the overall efficiency, and retaining a relatively consistent proportion of the total bits for coding the flowfield.

Dynamic Optimization of Flowfield Coding

The goal of motion compensation using flowfields is the reduction of bitrate. In addition to tying the quantization precision of a coded flowfield to overall quantization quality, it is also optionally useful to dynamically adjust the resolution of a flowfield. A flowfield can vary in resolution with each image frame, if useful, since variable resizing is an inherent capability of the present invention. Larger resolution flowfields require more bits to encode, but more accurately define the details of motion within a scene. Lower resolution flowfields require fewer bits, and will sometimes be fully effective in cases of simple overall motions or relatively still images.

Similarly, quantization can also be varied with each image frame, and need not remain in a constant relationship to overall quantization settings.

A simple method of optimizing flowfield resolution and quantization is to try various resolutions and/or quantizations, to see which results in the least coded bits. This type of heuristic approach is feasible using current computers, which allow testing of multiple scenarios involving different resolution and quantization parameters to be computed and compared for lowest bit rate.

Computation can be reduced by using the quantization and flowfield resolution settings from a previous frame, but trying increased and/or decreased values, to see if there is improvement. In such an approach, quantization and or flowfield resolution would be gradually incrementally varied when there is improvement due to a change up and/or down.

The resolution and quantization of flowfield encoding can be usefully varied for F frames, for M frames, and even for each individual frame reference of multiple-reference M and/or F frames.

Discontinuity Coding

It is common to have sharp edge boundaries when one object moves in front of another. A simple method of providing for such sharp edge boundaries is to use a high resolution binary mask for two or more partitions in the frame. The binary mask edges can be at very high resolutions, potentially exceeding the highest original image resolution. Binary masks can be efficiently coded using run length codes. Run length codes for binary masks may utilize sub-pixel precision both vertically and horizontally in order to provide anti-aliasing information at object motion edges. However, run length coding with very high resolution for a binary edge will often be the simplest and most effective approach.

The corresponding flowfield for such a masked frame will then be segmented into regions, preferably bounded by extending each region boundary to convenient shapes such as trapezoids or rectangles. Within each region, the normal compression-coded flowfield is utilized. The run-length-code boundaries are used to switch between flowfield regions.

As with the flowfields, the resolution of the binary edge can be scaled for use at various coding resolutions, or it may be retained for processing edge discontinuities at high resolution, even when the flowfield is applied at lower resolutions.

Discontinuities can be found by examining local motion vector divergence. Discontinuities can then be further refined by using median-filters over the region and/or other means of favoring the majority of pixels across a discontinuous edge. Fine search ranges can be greatly increased to discover small region motion near the boundary edge. Subdivision and refinement of areas continuing to show motion vector divergence will yield a precise motion discontinuity boundary for use with the run-length coded binary mask(s). If used, the binary edge run-length codes must be sent to the decoder along with their activation, along with the flowfield segments.

Motion blur should be added at the boundary, but cannot be precisely created for motion compensation. However, the boundary can be softened, using the in-place sharp/soft filter 130, based upon local divergence, which will be high at the discontinuity, or based upon nearness to the discontinuity (and therefore nearness to the run-length-coded binary edge). The amount of softening, as usual, should depend upon the motion vectors. At the edge, the difference in the motion vectors on each side of the edge boundary will indicate the amount to blur using softening in the sharp/soft filter. If the vectors are nearly the same, then no additional blurring is needed beyond that which is already present in the pixels (or optionally softened for long motion vectors). If the vectors are different, resulting in a significant difference motion vector when subtracted, then substantial softening should be added. The horizontal component of the difference motion vector, and the vertical component of the difference motion vector, can be used independently to soften along the horizontal and vertical directions, respectively. Alternatively, the softening can be applied along the direction of the difference motion vector (using rotation or other methods as described elsewhere in the present invention).

Smoothing, if applied prior and/or subsequent to flowfield compression, can be disabled near the discontinuity, or else can be applied independently to each partitioned region.

Finer quantization can be scaled in regions of high divergence, whether or not discontinuities are segmented, in order to more accurately model the motion vector flowfield in such regions. In this case, the flowfield quantization must be regionally signaled to the decoder.

Optional coding efficiency improvement can sometimes be gained by using an overall motion vector for each region, with local deltas to that motion in the flowfield. The resulting deltas can have reduced length, and may then code more efficiently in some cases. The regional overall motion vector must be sent to the decoder for each region using overall motion and flowfield delta, together with a flag to indicate use of the overall vector and delta for each such region.

Note that the present invention does not require this optional discontinuity coding, since overall coding efficiency can still be significantly improved with smoothed flowfields.

Decoded Flowfield Smoothing

As with flowfield smoothing prior to quantized transform compression coding, it is also useful to optionally filter decoded motion vectors to smooth out quantization errors. Such optional smoothing becomes part of both the decoding portion of encoding, as well as stand-alone decoding. These must both match exactly. Any smoothing noise-reduction parameters, or the presence or absence of this noise-reduction smoothing, must be signaled to a decoder so that the exact algorithm used for the decoding portion of encoding is duplicated. Any mismatch will result in not only an inability to perform bit-exact coding (subsequent to lossy coding), but errors will propagate and increase with every flowfield-compensated F frame. Careful exact-match implementation of noise-reduction can support exact match residual coding as well as being free from any flowfield-propagated errors.

With or without such decoded flowfield smoothing, the process of flowfield motion compensation is inherently a feedback system wherein pixel value motion-compensated delta quantization always constrains the final result (at every decodable resolution layer) to strict error bounds for each pixel (e.g., RGB or YUV) value (subject to the use of a deadband, which increases the quantization near zero).

Layered Application of Flowfields

As described above, the flowfield for each F and M frame can be scaled and upsized (or downsized) to be applied to one or more layers, as appropriate. At each resolution-increasing delta layer, motion compensation via the corresponding flowfield can be optionally applied. It will usually (but not always) be the case that the spatial image details can be efficiently propagated by flowfield motion compensating each up-resolution delta layer. If a more efficient coding is achieved by not using motion compensation at one or more layers, then the given layers need not use motion compensation, whereas other layers may benefit from motion compensation. Which resolution-increasing layers are selected (often all of them) must be signaled to the decoder if they are dynamically selected (on a per-frame basis, for example). Similarly, the base layer of a frame need not use flowfield motion compensation, but may optionally use intra coding, whereas the higher resolution-increasing layers may optionally select motion compensation.

Note that the bits required to compress a flowfield should be included in the decisions, since the goal of motion compensation is primarily the overall reduction of bitrate.

Use of the Noise Floor to Set Quantization at Each Level in a Resolution-Layered Codec Quantization can be varied by region with many moving-image codecs (including MPEG-2 and MPEG-4, as well as the DWT 9/7 bi-orthogonal subband flowfield-compensated codec described as an example in the present invention). The noise floor can be effectively determined or otherwise indicated (e.g., via human assist) in many useful cases as a function of region, brightness, and color. Note that this noise floor can be computed at various resolutions in a resolution-layered coding system, and need not be a characterization only at a single resolution. By re-matching and performing a new histogram list at a variety of resolution layers, with either compression coded and decoded flowfields, or preferably with original uncompressed flowfields, it is possible to characterize the noise floor not only regionally and as a function of brightness and color, but also as a function of resolution layer as well. Given that the use of flowfields for determining noise floor differs from other uses of flowfields in the present invention, it may be desirable to recompute the flowfields at a variety of resolution layers (after downsizing the original image to various useful layer resolutions). Such flowfields may be discarded with respect to other uses, in cases where their resolutions or precision are inappropriate for such other uses, or such flowfield determinations may naturally match other flowfield computations which are otherwise useful.

Out-of-focus regions, or regions otherwise lacking in detail, can be discovered by determining the local autocorrelation, and comparing it with the lowest noise-floor autocorrelation. If they are nearly the same, then the given region of the image is primarily noise floor, and lacks image detail.

In this way, the noise floor can be characterized for each resolution layer, often automatically. The resulting noise floor can then be used not only for regionally controlling the in-place sharp/soft filter at every resolution level, but the quantization for each region for each resolution level can also be set at or below (or other specified relationship) the noise floor. It is highly desirable to be able to set the quantization at, or a specific proportion below, the noise floor for all colors, regions, brightnesses, and resolution layers. This can be fully automated in many useful cases.

Overall Amplitude Reduction and Regional Modulation of Previous Frame Resolution-Enhancing Layers In an F frame, the decoded flowfield-compensated resolution-enhancing layers will be saved for subsequent flowfield displacement followed by subtraction from that next frame's resolution enhancing layer. Each I frame resolution-enhancing layer will also be saved for subsequent flowfield displacement followed by subtraction from that next F or M frame's resolution enhancing layer.

Quantization for each resolution-enhancing layer may be independently set (sometimes regionally), depending upon the desired image quality at that resolution. It is usually desirable to set quantization at or below the noise floor, although this may only be approximate given that noise is generally a function of color and brightness, as well as quantization noise from lower layers which is corrected in each resolution-enhancing layer (due to the feedback-correction nature of each resolution-enhancing delta layer).

Due to this relationship between each resolution-enhancing layer's quantization and the image noise floor at that resolution, as well as the quantization correction for lower layers, there will be inherent quantization noise and image noise saved with each F frame at each resolution-enhancing layer. Optimally, this "saved noise" will be below the noise floor of the original image frame at this resolution enhancing layer (if there were no quantization, there would be perfect layered encoding of this resolution enhancing layer). Even so, whether below the noise floor or not, noise will be present in each saved I or F frame for subsequent use. Given that these frames are flowfield-displaced and then subtracted from the current frame's resolution-enhancing layer, quantized, dequantized, and then saved, noise and quantization error (usually at or below the image noise floor, depending on quantization for that layer and lower layers) will be added with each frame. The adding of such noise, with the flowfield displacement of each F frame, will result in a field of accumulated noise buildup which moves with the flowfield. However, such noise buildup will be removed at each I frame.

The purpose of flowfield-compensating each resolution-enhancing layer of each F frame is to gain the benefit of the similarity of details in each frame's resolution-enhancing layer at that level. In other words, the resolution-enhancing edge details track with the flowfield, and when subtracted can reduce the amplitude of high-frequency edge details which must be encoded for that resolution-enhancing delta layer. It is not necessary for the flowfield-displaced previous-frame resolution-enhancing details to have full amplitude in order to be effective. If they have half amplitude, for example, they would still reduce similar details by half, still resulting in a benefit.

On the other hand, full amplitude flowfield compensation of each resolution-enhancing layer has the disadvantage that noise in the flowfield-displaced frame's resolution-enhancing layer will add to the noise in the current resolution-enhancing layer, thus reducing coding efficiency. Also, imperfections in the displacement filters, and/or in the object's motion blur and speed in each frame, will result in further degradations to the benefits of flowfield motion compensation for each resolution-enhancing layer.

In order to reduce such degradations, a simple amplitude reduction can be used when each (I or F) frame's resolution-enhancing difference for each layer is stored for future use. Typically a multiplication by a scale factor in the range of 0.7 to 0.9 will both gradually suppress the buildup of accumulated noise in the flowfield for each resolution-enhancing delta layer, but also function better in the presence of imperfect displacement filters and imperfect frame-to-frame detail matching (usually due to slight changes in motion and motion blur).

This simple scale factor can be slightly different for red/U, green/Y, and blue/V channels, which can be optimized independently. This simple scale factor can also be slightly different for each resolution-enhancing layer, since image noise levels generally are less at lower resolutions, and since quantization effects of lower layers change at each increased resolution-enhancing layer.

These amplitude scale factors must be sent to the decoder (usually in the header) if they are not statically set in common between the encoder and decoder. The decoder within the encoder, and the stand-alone decoder, apply the scale factor after decoding each resolution-enhancing layer (either I or F frame), but prior to storing that layer for use by subsequent frames.

It is also possible to regionally-vary this scale factor in order to optimize for differences in noise levels in different regions of the image (because noise levels generally vary with region, since they are generally a function of color and brightness). If used, the regionally-varying scale factor must be signaled to the decoder.

The flowfield-motion-vector-length-driven and low-confidence-driven filter softness during displacement will naturally reduce noise levels in image regions having high motion blur, thus reducing the propagation of noise. This will also naturally suppress noise buildup. However, for regions of low displacement, with a sharp flowfield displacement filter, noise will naturally build up in the absence of the amplitude reducing scale factor described above.

Note that out-of-focus regions, due to depth of field, which might match with high confidence and a short motion vector, will add their image noise and little or no detail at resolution-enhancing layers. Thus, if and when out-of-focus regions can be determined, they can be modulated to reduced amplitude levels at resolution-enhancing regions via the modulation described in other sections, or via the regionally-varying amplitude-reducing scale factor described here. Using the regionally-varying amplitude-reducing scale factor described here, the scale factor should be set all the way to zero when a region is known to be out of focus, since only degrading noise at this higher resolution spatial-frequency band will be sent through the flowfield.

Use of Confidence to Regionally Guide Motion-Compensated Quantization

If regional quantization adjustment is available in a layered or non-layered codec, the quantization can be varied according to the motion compensated flowfield displacement confidence. The average confidence over each region of independently-adjustable quantization can be utilized to lower quantization in regions of low confidence. As an alternative to average confidence, the lowest confidence can be used to lower quantization, thus correcting based upon the poorest confidence within the region. Further, a blend of lowest confidence and average confidence can be used.

This concept can be applied to any useful region size having independent quantization within the flowfield-motion-compensated image. This concept can also be utilized by traditional block-based motion compensation when regional quantization adjustment is available, such that a high SAD over one or more blocks would lower the quantization value for the corresponding region of blocks.

Coarser quantization can be utilized in regions of high confidence, since the image is known to have been displaced with high confidence via the flowfield to the current location in the current frame. A low confidence indicates that the region did not translate accurately via the flowfield to the current location, and thus a lower quantization will ensure increased accuracy by ensuring that additional coding bits are applied to correct this low confidence region. The result can be an overall additional compression efficiency, when taking into account the regional confidence when determining regionally-adjustable quantization. Regions with a high confidence match can be quantized more coarsely and will still appear to have been coded with good quality.

This concept of controlling regional quantization based upon regional confidence can be utilized even if rate control is also being used to control regional quantization values to maintain a particular bitrate and decoder buffer fullness constraint. Regions with high motion-compensation (whether block-based or flowfield) confidence can have their quantization increased to coarser levels, therefore saving bits. Low confidence regions should use a finer quantization, when the bitrate and buffer constraints allow.

The concept of controlling regional quantization based upon regional motion-compensation confidence can be applied to single layer flowfield-compensated or block-motion-compensated codec. This concept can be applied only to the base layer in a layered codec, or optionally (additionally or alternatively) to each layer above the base layer as well.

Use of Displaced Pixels for Noise Reduction During Encoding-Only Flowfield Processing Encoding-only flowfield motion compensation can be utilized for more than in-place sharp/soft filtering, resolution-enhancing layer modulation, and SNR delta layer modulation. Pixels displaced from nearby frames with high confidence can be averaged with the pixel from the current frame using a weighted average based upon confidence to reduce noise. When there is high confidence at a given pixel, a small portion of the nearby frame pixel's value may be weighted together with the current pixel's value. Such weighted blend will result in a noise reduction, usually without much loss of sharpness when motion vectors are short or zero. With longer motion vectors, the noise will be reduced if the confidence of the match is high, which is beneficial since rapidly moving regions do not contain image detail, but will contain noise. The noise reduction in the case of longer motion vectors will be in addition to the noise reduction provided by in-place sharp/soft filter and resolution-enhancing and SNR delta layer modulation. The noise reduction is due to the noise being uncorrelated between frames. Thus, if the image matches with high confidence during flowfield motion compensation, a small amount of pixel blend will help reduce noise.

The pixel from the nearby frame will be weighted with the current frame's pixel after the nearby frame's pixel is subjected to flowfield displacement and sharp/soft filtering. Any number of nearby frames can be weighted into this blend, although the adjacent previous and subsequent frames are usually the most similar, and therefore should usually have the largest blend weights.

Once a pixel has been displaced and sharp/soft filtered, its value should be weighted in proportion not only to confidence and frame nearness, but also based upon the pixel value. Typical digital camera noise, for example, is a combination of thermal noise which is at a constant level, and Schott noise, which is proportional to pixel brightness (usually independently for each of the red, green, and blue pixels). Thus, it is best to ensure that a pixel's value is not altered by the pixel values of nearby frames by much more than the original image noise floor, if such noise floor can be determined or estimated. Since the original image noise floor is a continuous function of the brightness level of the pixel, the noise-reduction blend weighting of pixels from nearby frames should also be a function of the brightness level of the pixel. For example, if reference white is at 1.0, the blend weight for the previous and subsequent frames should perhaps have a maximum blend weight of 0.03 of the pixel's 1.0 value. The blend weight should perhaps be gradually increased to 0.06 of the pixel's value as the pixel's value decreases to 0.3, thus being 0.06×0.3=0.018. The blend weight might increase to 0.10 of the pixel's value at 0.05, thus being a blend weight of 0.10× 0.05=0.005. Accordingly, the blend weights should be a continuous function of pixel brightness, either as a function of luminance, applied to U and V in addition to Y, or independently for each of red, green, and blue. The resulting blend weight will therefore gradually and continuously decrease with decreasing pixel brightness, but will gradually and continuously increase in proportion to the pixel's value.

This weighting example corresponds to the noise floor properties of digital movie cameras. For other types of noise floors, other appropriate blend weighting functions can be used. For example, for a constant noise floor, which might exist in a synthetic moving image, a constant amount of blend weight from nearby frames can be utilized. In general, the weighting should correspond to the noise floor properties of the original moving image, whether known or estimated.

In addition to weighting, the amount that a pixel can differ can usefully be bounded by minimum and maximum thresholds. For example, if a nearby frame displaced pixel differs by more than 0.05 from a white pixel having 1.0 brightness, then the pixel should be limited to that difference (either above or below 1.0, thus being limited to 1.05 or 0.95 in this example). This can be a hard clip, or a gradual reduction of the pixel's difference as the difference increases. In this way, the weighted blend is guaranteed to reduce noise while not allowing any pixels in a given original frame to wander very far from the original value. This can be valuable when compression coding using a lossless residual, since the original image, including all of its noise, must eventually be reconstructed (in one or more layers) by the codec. It can also be useful to know that the noise reduction processing cannot alter the image beyond a certain amount from its original values. This is particularly optimal when the noise reduction of this step is set to move pixels by an amount at or below the noise floor of the image (which is generally a function of color and brightness). Since this is a noise reduction step, conceptually the noise reduction is being applied within the bounds of the noise level itself (when weighted and difference-limited in this manner).

The pixel difference can be hard clipped or soft clipped (via a function which reduces the difference as it gradually approaches the difference limit). Such clipping (hard or soft) can be applied to each individual displaced pixel (from a given frame), or can be applied to a weighted blend of the displaced pixels from two or more frames. However, it is simplest to clip each difference first, to weight the clipped pixel value by its confidence and in proportion to the pixel value to which it will be blended. It will often be simplest if this difference clipping, confidence weighting, and pixel value weighting is done independently for each nearby frame's pixel. The resulting noise-reduced pixel in the current frame will then have independent weighted influences from each nearby frame utilized.

In this aspect of the invention, the flowfield has been interpolated via up-filtering from block match motion vectors which were matched at reduced resolution. The flowfield may therefore not perfectly match every pixel for the purpose of noise reduction, even when the block match confidence is high. The interpolated confidence cannot account for small distortions in the flowfield motion which might be present, since interpolation via up-filtering of the motion vectors is smoothly varying. The motion may have minor warps and distortions which do not align perfectly through flowfield displacement. Because of this and other small errors and distortions which are possible in the methods of the present invention, each pixel difference should be considered with respect to whether each displaced pixel yields a value near to each current pixel.

Conceptually this is similar to reducing the confidence for pixels which differ significantly. A simple method to apply confidence reduction is to set the confidence to zero, and therefore the weight to zero, for pixels which have a difference larger than some threshold. A better approach, however, is to have an amount of difference, below which the full confidence value is applied, and beyond which the confidence is gradually reduced toward zero. For example, for a current pixel with value 1.0, differences up to ±0.02 can be weighted solely according to their confidence value. For differences having an absolute value above 0.02, the confidence can be reduced by, for example, multiplying the confidence by (0.04−abs(difference))/0.02. This will linearly reduce the confidence to zero as the absolute value of the difference increased from 0.02 up to 0.04 (in this example). Above 0.04, the confidence, and therefore the weight, is set to zero.

Note that confidence values for encoding-only flowfields may be determined using more than one difference-based confidence method, some of which may be more sensitive to small subsets of the pixels having a significant difference. For example, the sum of square difference is more sensitive to a small number of pixels being significantly different than the sum of absolute difference as a measure of confidence. Thus, for some purposes in noise reduction, it may be useful to determine and upsize several different confidence measures. Note that the upsizing of field of confidence values to full resolution provides a smoothly varying field of confidence values, which does not accurately represent individual pixel confidence values. As an example, if two of sixteen pixels are significantly different in a 4×4 region, an SAD-based confidence value might be used for weighting, but an SSD-based confidence value might be used to adjust difference limits. In this way, regions known to have a few outlying pixels can be limited to a smaller difference amount than regions in which SSD and SAD both indicate that most pixels have a similar difference in the tested region (e.g., 4×4 pixel block region at full resolution for best match motion vector prior to up-filtering to full resolution).

Similarly, the extraction of DC when determining the best match can indicate a gradual regional brightness change. It may be useful to remove the DC during displacement for use in noise reduction, or even for motion compensation (although the DC would need to be coded and sent if used in motion compensation). Since noise reduction is an encoding-only flowfield process, the DC is available, and the DC can be retained and interpolated (via upsize) separately from the confidence. Thus, if the values are nearer (thus having smaller differences) when the DC of the best match is removed during displacement, such pixels from nearby frames can be blended after applying a DC offset for use in noise reduction.

Several of these various confidence and matching parameters and functions can be retained and utilized independently when setting weighting and difference limits during noise reduction.

Note that the use of pixel difference parameters in proportion to the current pixel value generalizes to wide dynamic range images, which might have both very large and very small values for pixels, since the pixel weight with respect to nearby frame pixels is a function of brightness, which may thus be extended indefinitely toward high brightness and toward low brightness.

When there is a scene cut, the automatic limits and the reduced confidence will limit the influence of a non-matching frame across a cut. However, it will usually be better just to detect the scene cut when possible (either automatically or manually) and not use any weights from displaced pixels which cross a scene cut.

Other aspects of the present invention for encoding-only flowfields reduce noise and thus reduce wasted bits via in-place soft filtering and reduced modulation when there is significant motion. The noise-reduction processing described in the present section reduces the noise level of in-place sharp portions of the image having little or no motion (as well as adding additional noise reduction to areas of significant motion). This is similar to U.S. Pat. No. 6,442,203 in the use of confidence to weight a blend of displaced pixels from nearby frames for the purpose of noise reduction. The method differs, however, in that U.S. Pat. No. 6,442,203 utilized a small block search and match surrounding each pixel at full resolution, or at an increased resolution, which is computationally very expensive. The present invention utilizes a reduced resolution block match, and flowfield motion vector and confidence interpolation (interpolation via up-filtering) to full resolution, which is computationally efficient.

Equivalence of Storage and Retrieval for Overall Scale Factors, Use Prior add Subsequent to Displacement after Retrieval It is equivalent to apply the scale factor described above when retrieving a stored previous reference frame for resolution-enhancing delta layers, instead of when storing such frames. Applying the scale factor during retrieval has the advantage that various candidate scale factors can be tested to determine the most efficient scale factor. Similarly with regional scale factors, various values can be tested in each region to determine the effect on coding efficiency for each layer within that region, as well as across multiple resolution-enhancing delta layers within that region.

Overall scale factors can be applied after displacement using decoded flowfield motion vectors, although any regionally-varying scale factors are usually best applied in the previous frame's time, prior to displacement, if these regionally-varying scale factors were determined using that previous frame. If such regionally-varying scale factors are determined in the current frame time, for example using one or more of the current frame's encoding-only flowfields, then these regionally-varying scale factors are best applied after displacement using the decoded flowfield.

Note that regionally-varying scale factors are essentially a regional modulation of resolution-enhancing delta layers.

Various configurations of the application of scale factors and modulation can be tested and optimized for each frame and for each resolution-enhancing delta layer. Once the best scale factor values and the best configuration of applying these scale factor(s) and regional modulation is determined, the results must be signaled to the decoder. All processing in series with the motion-compensated previous frame at all layers must be strictly duplicated within the stand-alone decoder to be identical to the decoding processing performed during encoding.

Encoding-Only Flowfields

It is often best to create flowfields using original source frames. When this is done, there is no affect on the original-based flowfields due to compression processing. The coded flowfields, and the retained resolution-enhancing layers, and the retained base-layer image, are of course affected by compression processing. It is therefore possible to compute flowfields for every single frame in an image frame sequence, and have these flowfields available when optimizing the coding decisions for each frame (such as whether to make a given frame an I frame or an F frame, or such as how much modulation to apply to a given region when saving a resolution-enhancing layer for future F frames).

The present invention optionally makes use of one or more encoding-only flowfields without using these flowfields for pixel displacement, and without compressing or retaining these flowfields. Although any flowfields which would be compressed and used for motion compensation can be used and sent with each frame, the encoding-only flowfields can also be created independently, and discarded after each frame.

The two uses of encoding-only flowfields are for in-place selected softening, and for modulation of resolution-enhancing layers prior to encoding them.

By way of example, the previous and subsequent frame can be utilized with the hierarchical motion vector and flowfield matching process when processing a present frame. The resulting uncompressed flowfields indicate the motion vector flowfield and matching confidence for the present frame with respect to the previous and subsequent frame. The resulting encoding-only uncompressed flowfields can be applied to any frame type, such as an F frame which is motion compensated with respect to a reference frame which is three frames previous, or an M frame with various multiple reference frames, or an I frame which doesn't motion compensate.

Figure 5:
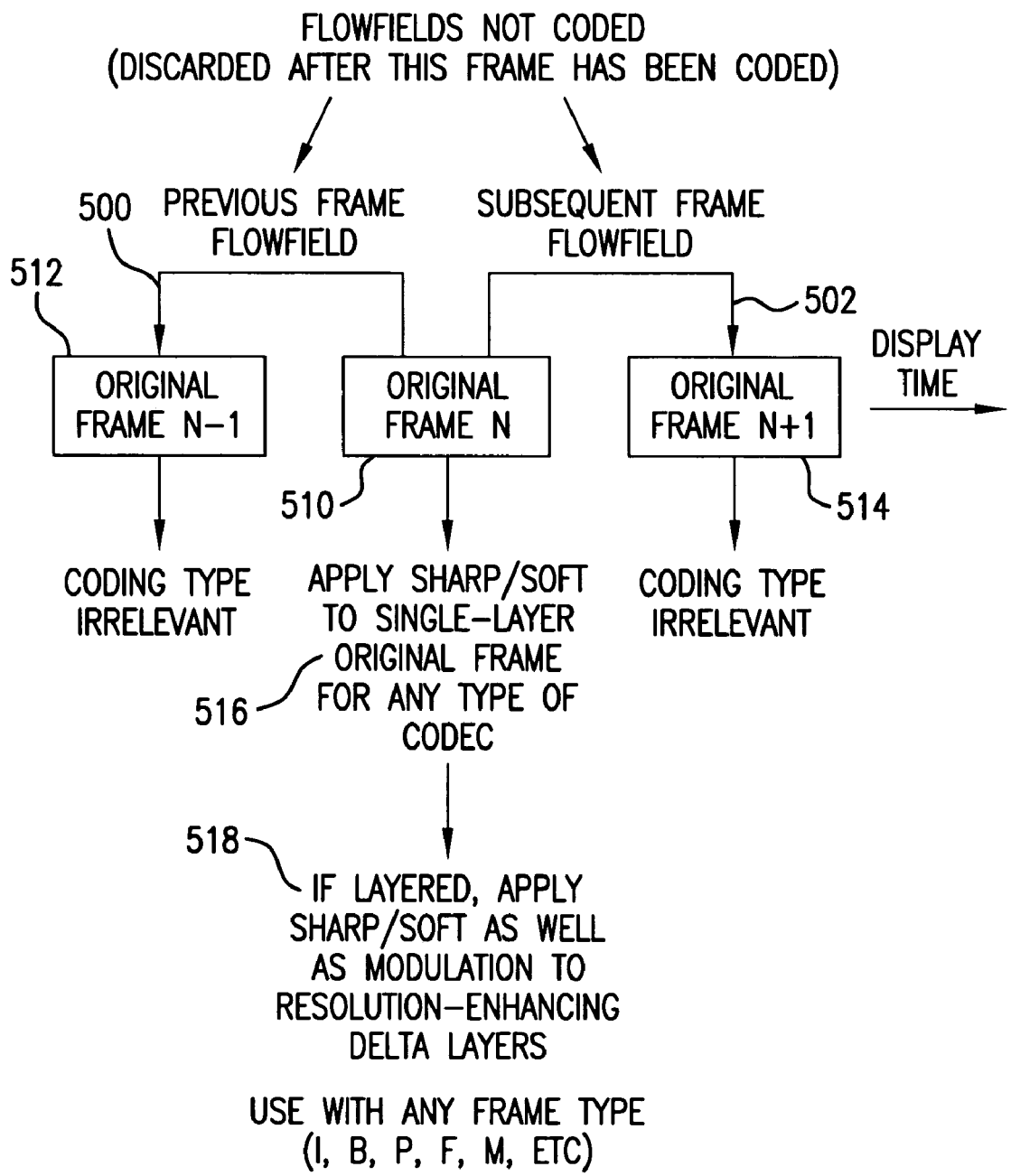
FIG. 5 is a block diagram showing the use of encoding-only flowfields with adjacent frames to determine motion vector lengths and confidences, then using these motion vector lengths and confidences to drive sharp/soft filtering for all layers (and for the original image prior to encoding) and to drive modulation for resolution-enhancing-delta-layers and signal to noise (SNR) layers above the base layer.

FIG. 5 is a block diagram showing the use of encoding-only flowfields with adjacent frames to determine motion vector lengths and confidences, then using these motion vector lengths and confidences to drive sharp/soft filtering for all layers (and for the original image prior to encoding) and to drive modulation for resolution-enhancing-delta-layers and signal to noise (SNR) layers above the base layer.

In this aspect of the present invention, flowfields 500, 502 are used with respect to adjacent frames 510, 512, 514 to determine the motion between the current frame 510 and these adjacent frames 512, 514. The flowfields are not coded, but are only used to provide control 516 to a sharp/soft filter component (as well as modulation to SNR and resolution-enhancing delta layers) applied to the current frame 510. In areas of high motion, an in-place sharp/soft filter is set to a soft filter. In areas of low motion, the sharp/soft filter is set to a sharp filter. The degree of sharpness versus softness at each pixel is determined by the length of each motion vector within each flowfield 500, 502, which contain a motion vector for each pixel. The sharpness/softness can be determined directionally (e.g., via rotation to and from the direction of motion) or alternatively can be applied independently to the horizontal and vertical pixel axes using the horizontal and vertical components of each pixel's motion vector.

Note that no additional information need be sent to the decoder, since this encoding-only flowfield-driven sharp/soft filtering (as well as modulation to SNR and resolution-enhancing delta layers) is applied to the pixels of a frame before encoding, as a form of noise-reduction preprocessing. This aspect of the present invention can be applied to both intra and predicted (e.g., both M and F) frames. Further, the flowfield reference frames used by this in-place sharp/soft filtering process need not be the same as the frame references used in flowfield (or other) motion compensation. For example, this flowfield sharp/soft filter preprocessor can be used with conventional motion compensated codecs such as MPEG 2 or MPEG 4, or with intra codecs such as JPEG-2000.

In-Place Sharp/Soft Filtering Using Encoding-Only Flowfields

Still referring to FIG. 5, when processing a region, if the confidence values are high with respect to either a previous or subsequent frame, and a motion vectors are short, then the region contains image detail which should be preserved via sharp filtering (although the region could be out of focus). Even if only one of the two frames suggests a sharp high-confidence match with short motion vectors, the region should be preserved via a sharp filter. If, however, a region has low confidence with respect to both the previous and subsequent frame, or long motion vectors with respect to both the previous and subsequent frame, then an in-place flowfield-controlled softening filter (which varies per pixel) can be applied to reduce noise, since no detail is present within the region.

This in-place sharp/soft filtering can usefully be applied to the original frames, prior to encoding with any codec, and whether or not the codec supports layering. Thus, this aspect of the present invention can usefully be applied to all moving image codec types. Further, in the present invention, it does not matter what frame type is being processed, be they intra frames, P and B frames in MPEG-2, and MPEG-4, or F and M frames. Note that some codecs, such as JPEG-2000 DWT 9/7 bi-orthogonal subband wavelets, only consist of intra frames, and yet can benefit significantly from this aspect of the present invention when applied to the original-resolution source frames. However, unlike the present invention, JPEG-2000 subband layers at reduced resolutions cannot take advantage of this in-place sharp/soft filtering, since bi-orthogonality would be degraded.

In the present invention, such sharp/soft filtering can be usefully re-applied not only to the original image, but to the original of the base layer and to each resolution-enhancing delta layer 518 (either to the original or to the difference). By reapplying at various resolutions in a layered codec, the motion vector length with respect to the resolution will inherently differ at each layer, thus yielding somewhat different sharp/soft filtering appropriate to each level. For example, a motion vector length of 3 with respect to a half resolution base would correspond to a motion vector length of 6 in the full resolution image. The flowfields can have a different resolution than any of the layers, or may be the same resolution as one of the layers, and will be scaled and resized via upsizing (or sometimes downsizing) filters before being applied to the in-place sharp/soft filter step.

If a region is known to be out of focus through some means (such as local image levels being at the noise floor), independent of motion vector length (which might be short) and confidence (which might be high), then that region can also be softened. The softening of fast moving regions, low confidence regions, and out-of-focus regions helps reduce noise in image regions which have little or no image detail.

Modulation of Resolution-Enhancing Delta Layers Using Encoding-Only Flowfields

For resolution-enhancing delta layers of a layered codec, as with the present invention's preferred layered codec, it is also useful to apply the encoding-only flowfields to modulate such resolution-enhancing delta layers. As with sharp/soft filtering, a long motion vector or a low confidence suggests a lack of sharpness in a given region. A long motion vector with high confidence is a more certain indication of image softness than low confidence, since low confidence indicates no match to adjacent frames, yet the image may still have high detail in this region of the current frame. Given that resolution-enhancing delta layers have the sole purpose of adding sharp details when increasing resolution, it is useful to reduce the amplitude of these layers in regions which are known to be soft due to fast motion. If regions are known to be out of focus, or otherwise lacking in detail, the amplitude of the resolution-enhancing delta layer may be reduced even if the motion vectors are short. The amplitude modulation of SNR layers may also be similarly reduced.

As with sharp/soft filtering, the motion vectors should be scaled to each resolution at which they are applied, yielding a different modulation at each layer since the motion vector length will vary with respect to different layer resolutions. The length of the motion vector at a given resolution indicates the degree to which detail will be present or absent at that resolution. Also, if the image level corresponds to the statistically minimum autocorrelation noise level, then the region is known to be lacking in detail, most likely due to being out of focus.

Also as with sharp/soft filtering as shown in FIG. 5, if the current frame matches only one of the previous or subsequent frames, a match on either frame, with a short motion vector on either frame, indicates that a region should remain fully modulated to preserve detail. The maximum of the modulation for each pixel should be taken from the previous frame flowfield versus from the subsequent frame. Alternatively, an average of the two modulation levels can be used.

The encoding-only flowfields are discarded if they are not also intended for flowfield motion compensation in F or M frames. The encoding-only flowfields also need not have the same resolution as the motion compensation flowfields for F or M frames, and they need not be compressed nor sent to the decoder.

Figure 6A:
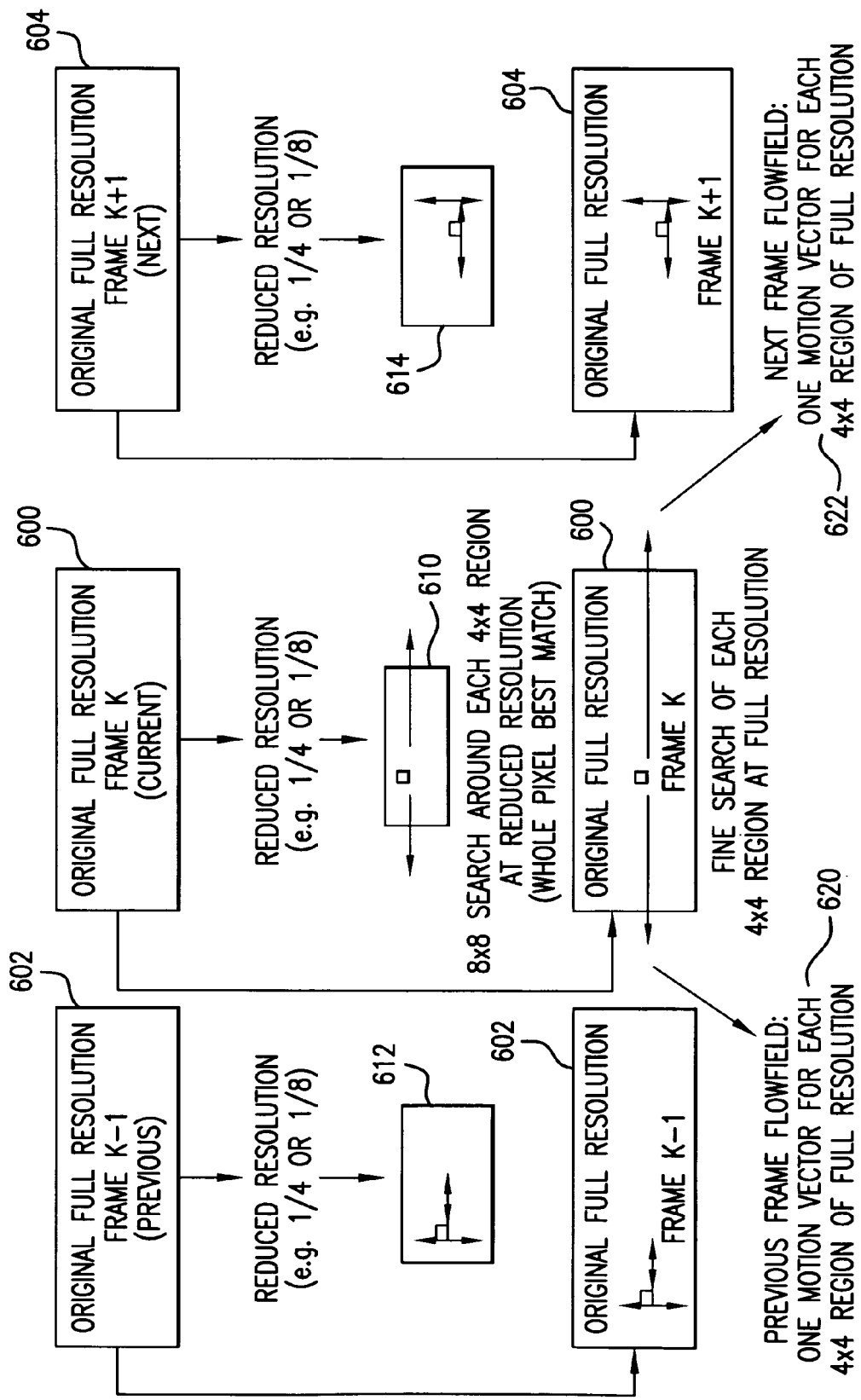
FIG. 6 is a block diagram showing the application of encoding-only flowfields to various resolutions to control sharp/soft filtering and to control modulation at resolution-enhancing-delta-layers and SNR layers above the base layer.
Figure 6B:
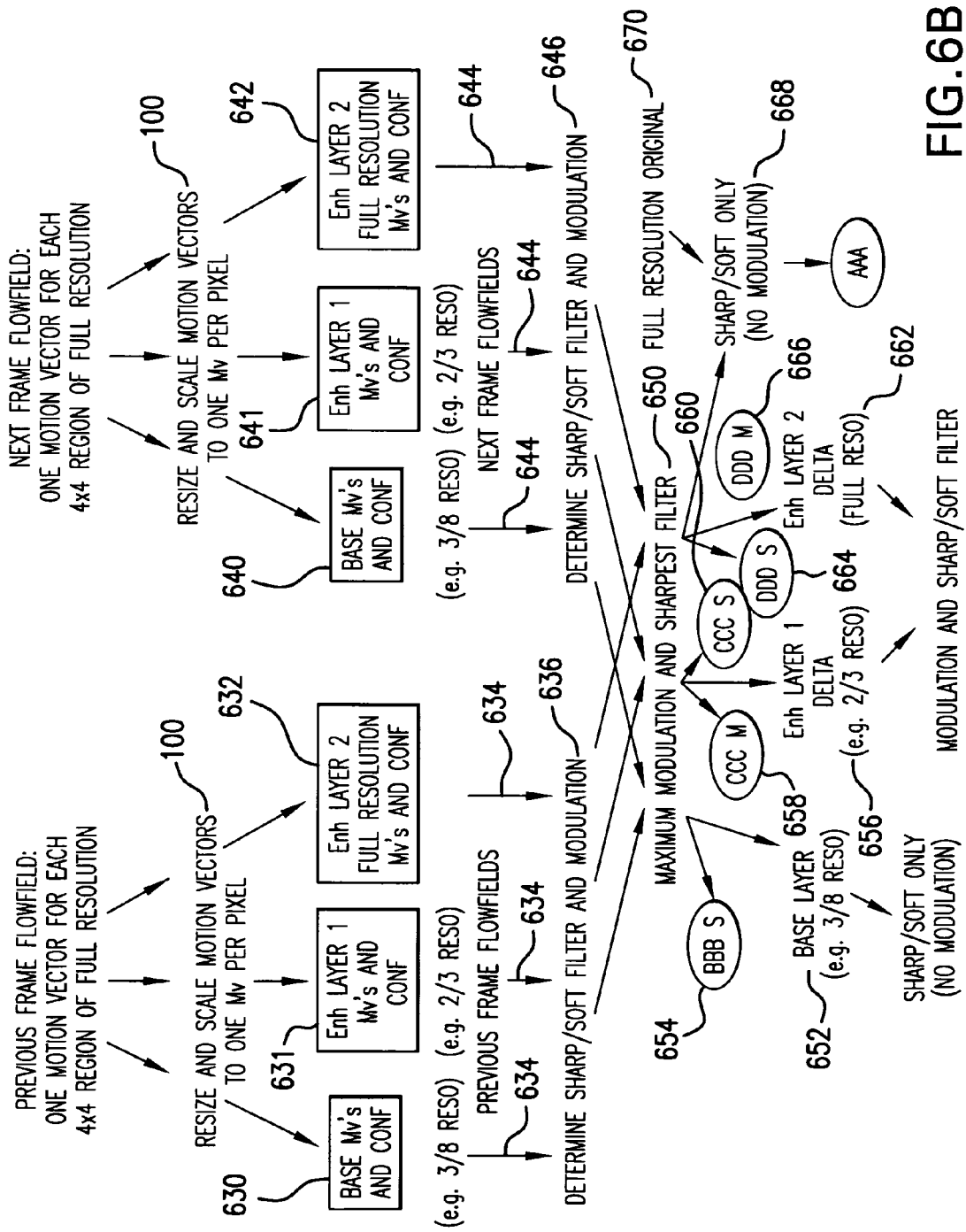

FIG. 6 is a block diagram showing shows the application of encoding-only flowfields to various resolutions to control sharp/soft filtering and to control modulation at resolution-enhancing-delta-layers and SNR layers above the base layer. In particular, FIG. 6 shows an example application of flowfield-driven in-place sharp/soft filtering to the various resolution layers within layered codecs (particularly to the preferred example layered codec described in the present invention based upon optimal filters). All steps in this process are applied before compression coding, for both intra and motion-compensated coding (both flowfield and block-based motion compensation).

FIG. 6 shows an example embodiment of the steps for creating flowfields to the previous and subsequent frames, using the components shown in FIG. 1. In this example, full resolution images for the current frame 600, previous frame 602, and subsequent frame 604 are downsized (using the variable downsize filter 120) to either ¼ or ⅛ resolution corresponding images 610, 612, 614. The reduced resolution current frame 610 is then compared to each of the previous 612 and subsequent 614 reduced resolution frames. In this example, an 8×8 block match is performed surrounding each 4×4 pixel region, at this reduced (¼ or ⅛) resolution, to determine a coarse best match. The resulting coarse motion vectors are then scaled up and used as the center of a narrowed fine search for each 4×4 pixel region at full resolution; that is, the full resolution current frame 600 is compared to each of the previous 602 and subsequent 604 full resolution frames for fine search matches. This results in one motion vector for each of the previous and subsequent frames for each 4×4 pixel region, resulting in corresponding flowfields 620, 622 having ¼ of the full resolution.

Each of these ¼ resolution flowfields 620, 622 is then resized using the variable upsize filter 100 to corresponding fractional (e.g., ⅜, ⅔) and full resolution layers 630-632, 640-642, with confidence values, thus creating corresponding sets of previous frame flowfields 634 and next frame flowfields 644 for use as in-place sharp-soft filters for each image layer. Note that the motion vector lengths are also scaled to correspond to the pixel distance within each layer.

In addition to use as an in-place sharp/soft filter for each layer, all resolution-enhancing flowfield layers above the base layer can also be modulated 636, 646. Each resolution-enhancing layer above the base layer contains deltas to be summed with the upsized next-lower layer. These deltas can be usefully modulated based upon the length of the motion vectors, since fast moving regions will only contain noise, and do not contain image detail. Thus, the amplitude of the resolution-enhancing deltas for such fast moving regions can be reduced. Slow-moving or non-moving regions, however, will require full modulation at each resolution-enhancing layer to convey image detail.

Corresponding pairs of previous frame flowfields 634 and next frame flowfields 644 may be compared 650 on a pixel-by-pixel basis to generate sets of output flowfields of various characteristics, including the base layer at ⅜ resolution 652, the maximum sharp/soft values for the previous and next frame flowfields for the base layer at ⅜ resolution 654, the enhancement 1 layer at ⅔ resolution 656, the maximum modulation values for the previous and next frame flowfields for the enhancement 1 layer at ⅔ resolution 658, the maximum sharp/soft values for the previous and next frame flowfields for the enhancement 1 layer at ⅔ resolution 660, the enhancement 2 layer at full resolution 662, the maximum sharp/soft values for the previous and next frame flowfields for the enhancement 2 layer at full resolution 664, and the maximum modulation values for the previous and next frame flowfields for the enhancement 2 layer at full resolution 666. The original full resolution image 670 can be sharp/soft full filtered 668 using the resolution enhancement 2 layer to generate a sharp/soft filtered output AAA that is useful in later process stages.

In FIG. 6, S is for Sharp/Soft, M is for Modulation, BBB is for the base layer at ⅜ resolution, CCC is for the enhancement 1 layer at ⅔ resolution, and DDD is for the full resolution enhancement layer 2. Note that various data sets AAA, BBB, CCC, and DDD from FIG. 6 will be applied within the encoding-only portions of FIG. 7 (intra coder) and FIG. 8 (flowfield motion-compensated encoder for coding F and/or M frames).

Encoding-Only Modulation Weighting Near Frame Edges

Regions of visual interest within moving images are rarely intentionally composed to be at the very edge of a frame. Accordingly, in general, the minimum of the modulation of resolution-enhancing layers can be lowered in proportion to nearness to the frame edge, yielding greater reduction of resolution-enhancing deltas for high motion and/or low confidence regions near the edge. The maximum of the modulation can also be gradually decreased, yielding slightly less maximum sharpness at the very edge of a frame.

Figure 7A:
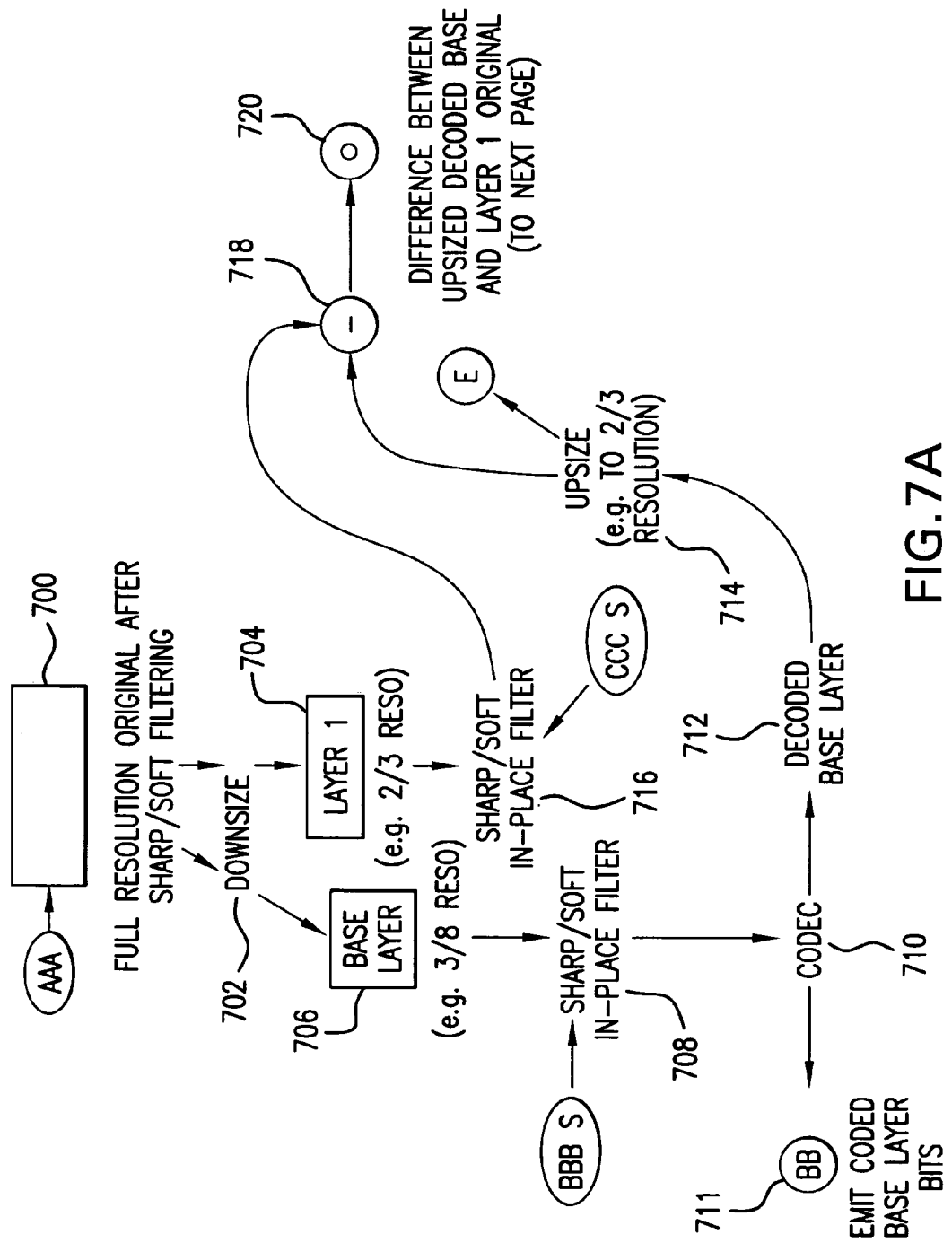
FIG. 7 is a block diagram showing the application of encoding-only flowfields from FIG. 5 and FIG. 6 to construct an intra-frame encoder
Figure 7B:
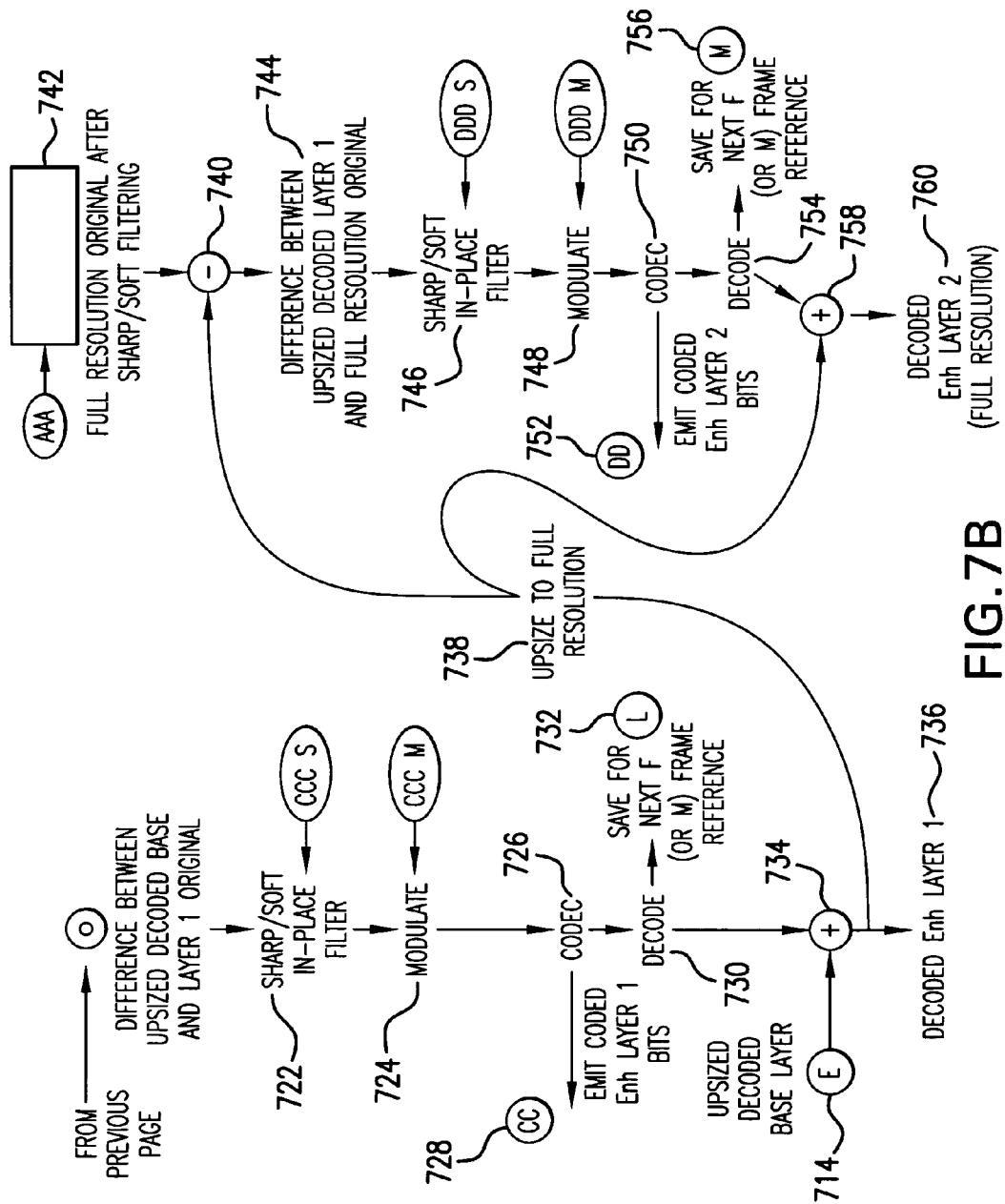
Figure 8A:
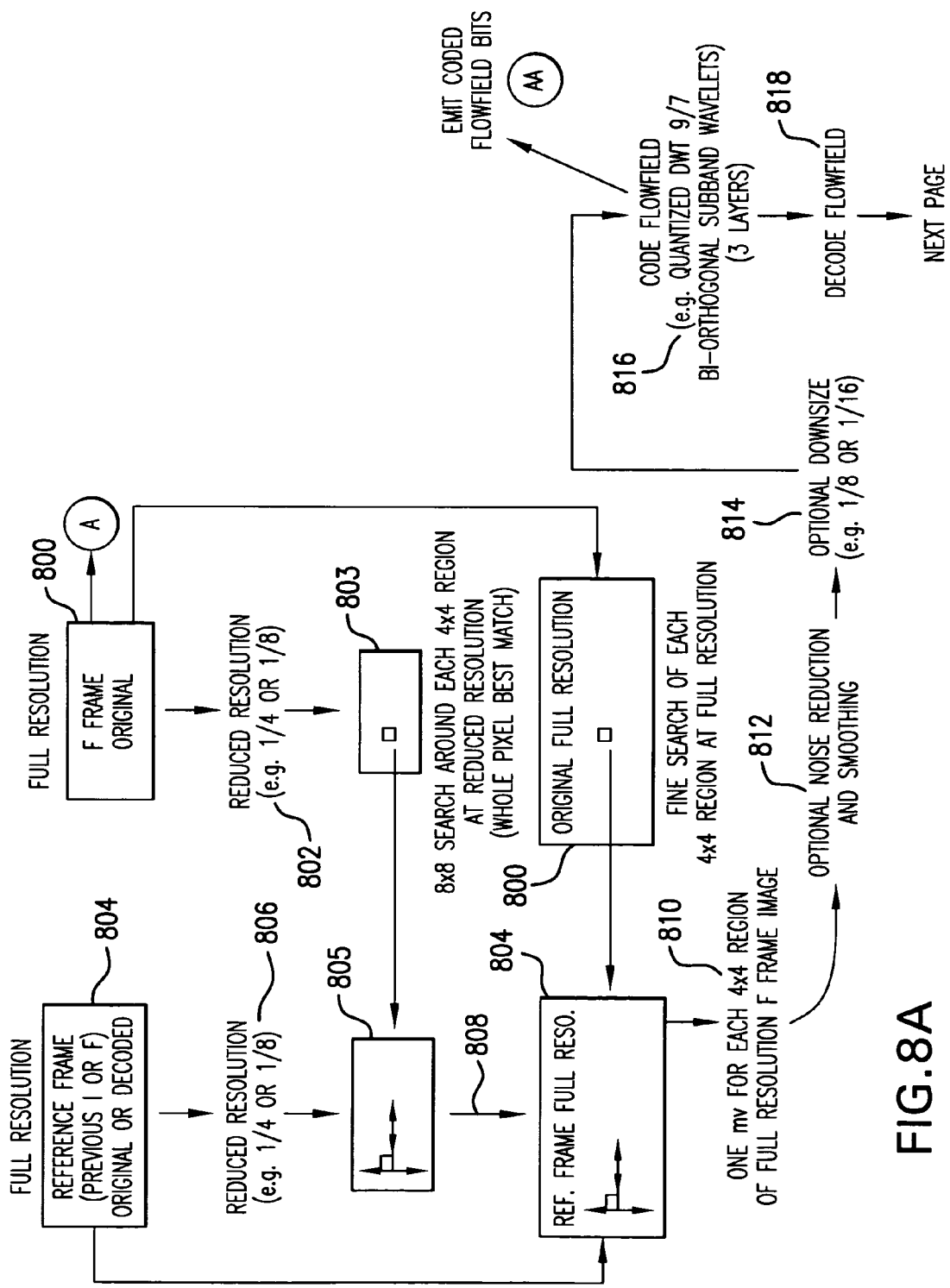
FIG. 8 is a block diagram showing a flowfield-motion-compensated encoder which can make M (multiply-referenced) or F (forward predicted) flowfield motion compensation frame types.
Figure 8B:
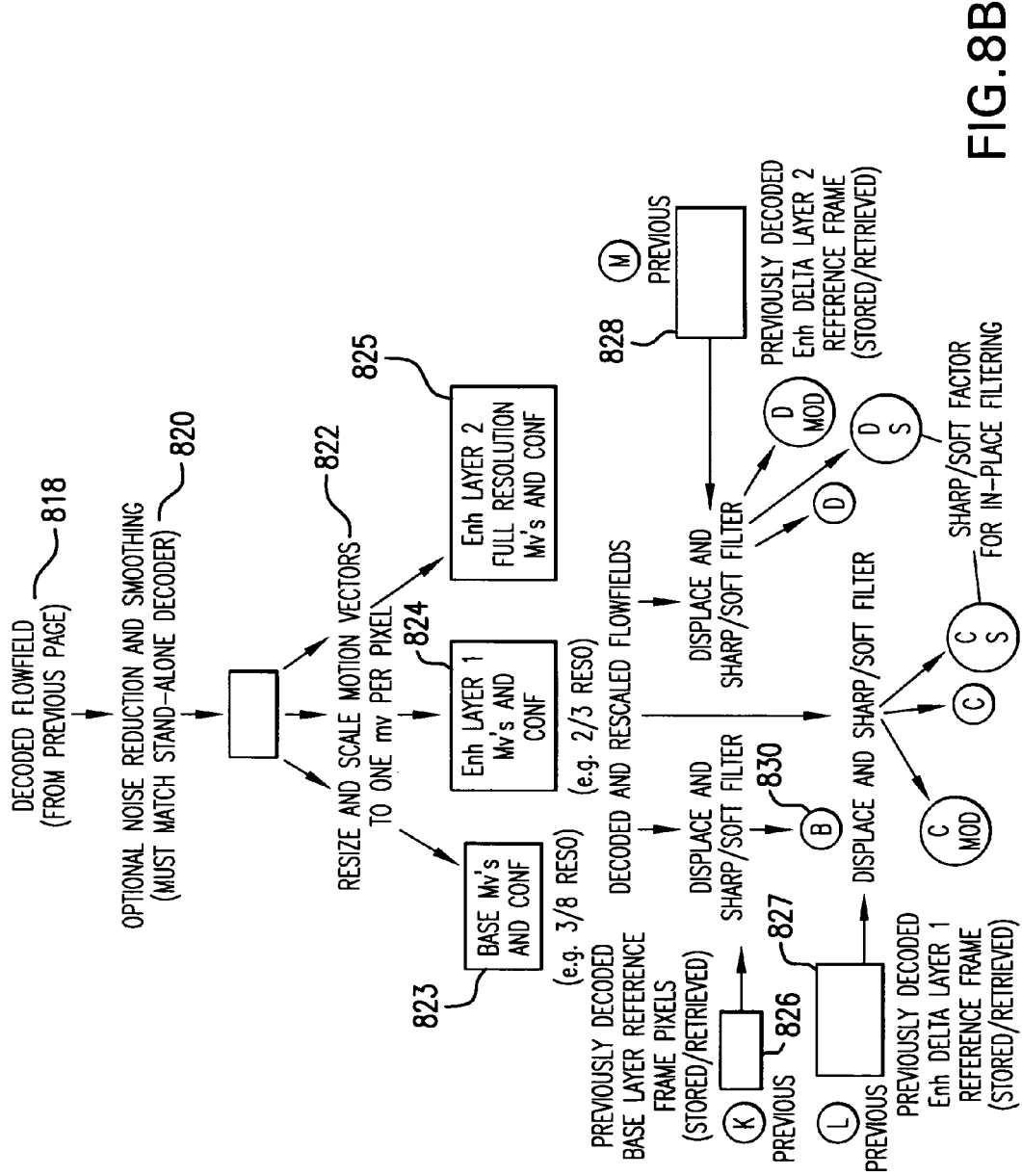
Figure 8C:
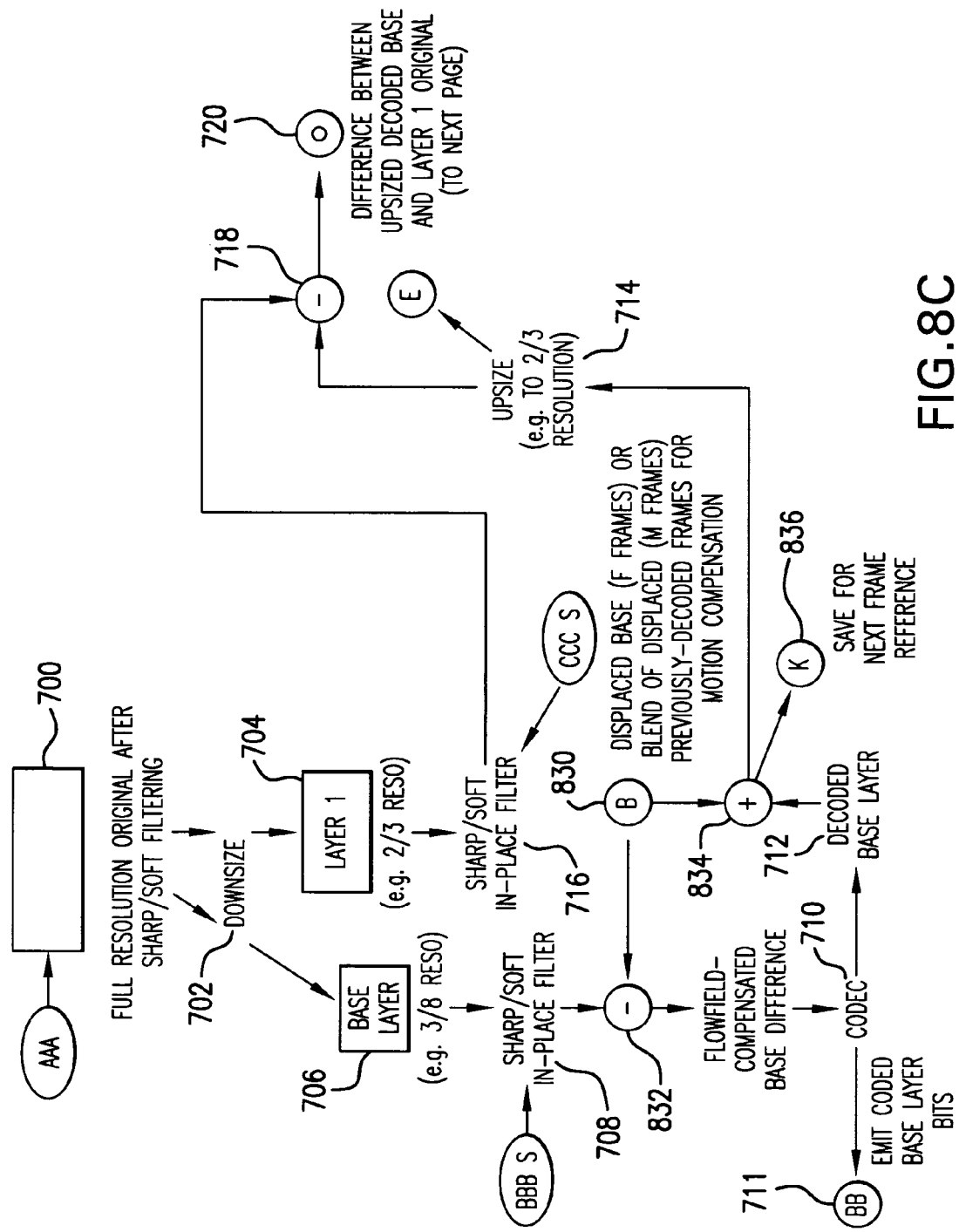
Figure 8D:
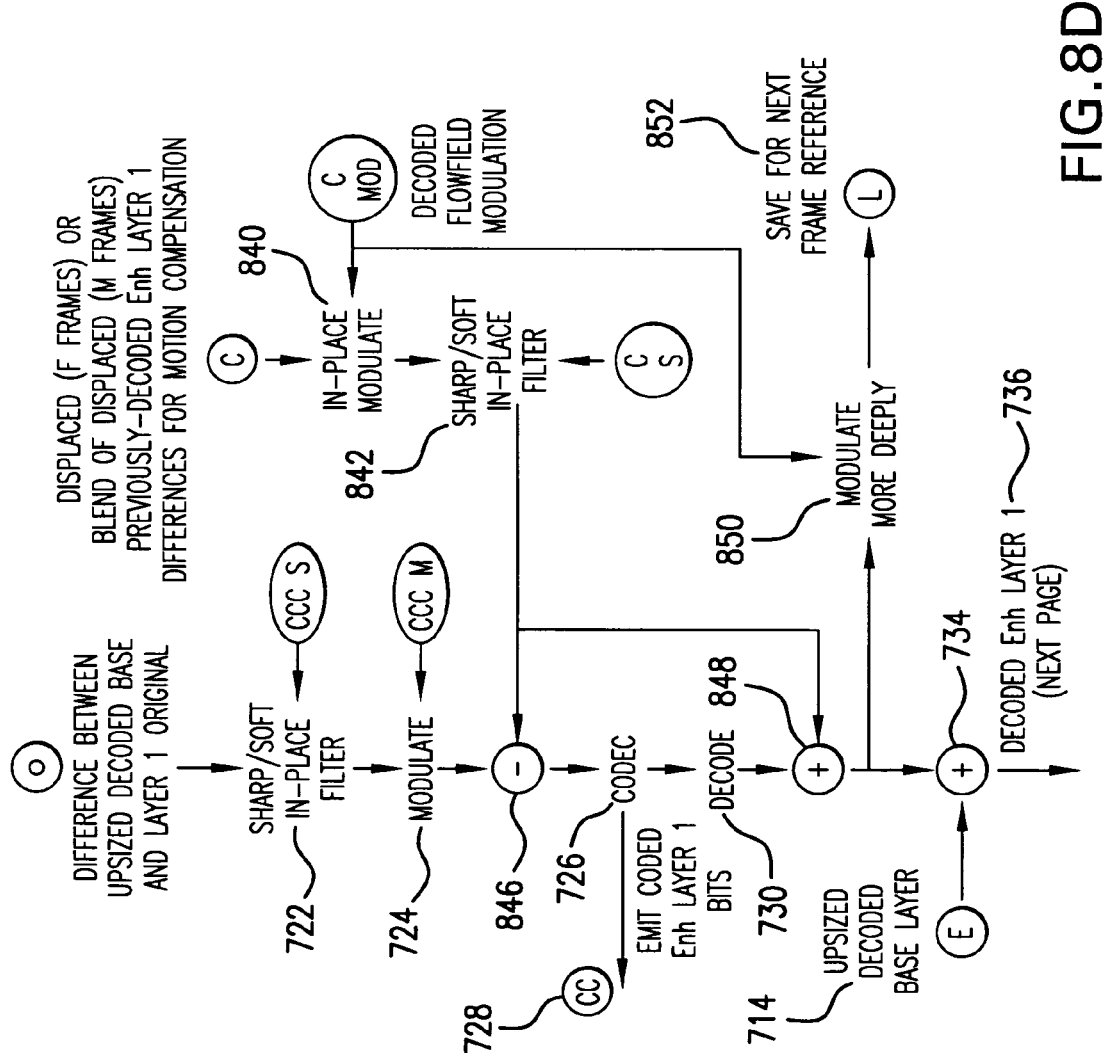
Figure 8E:
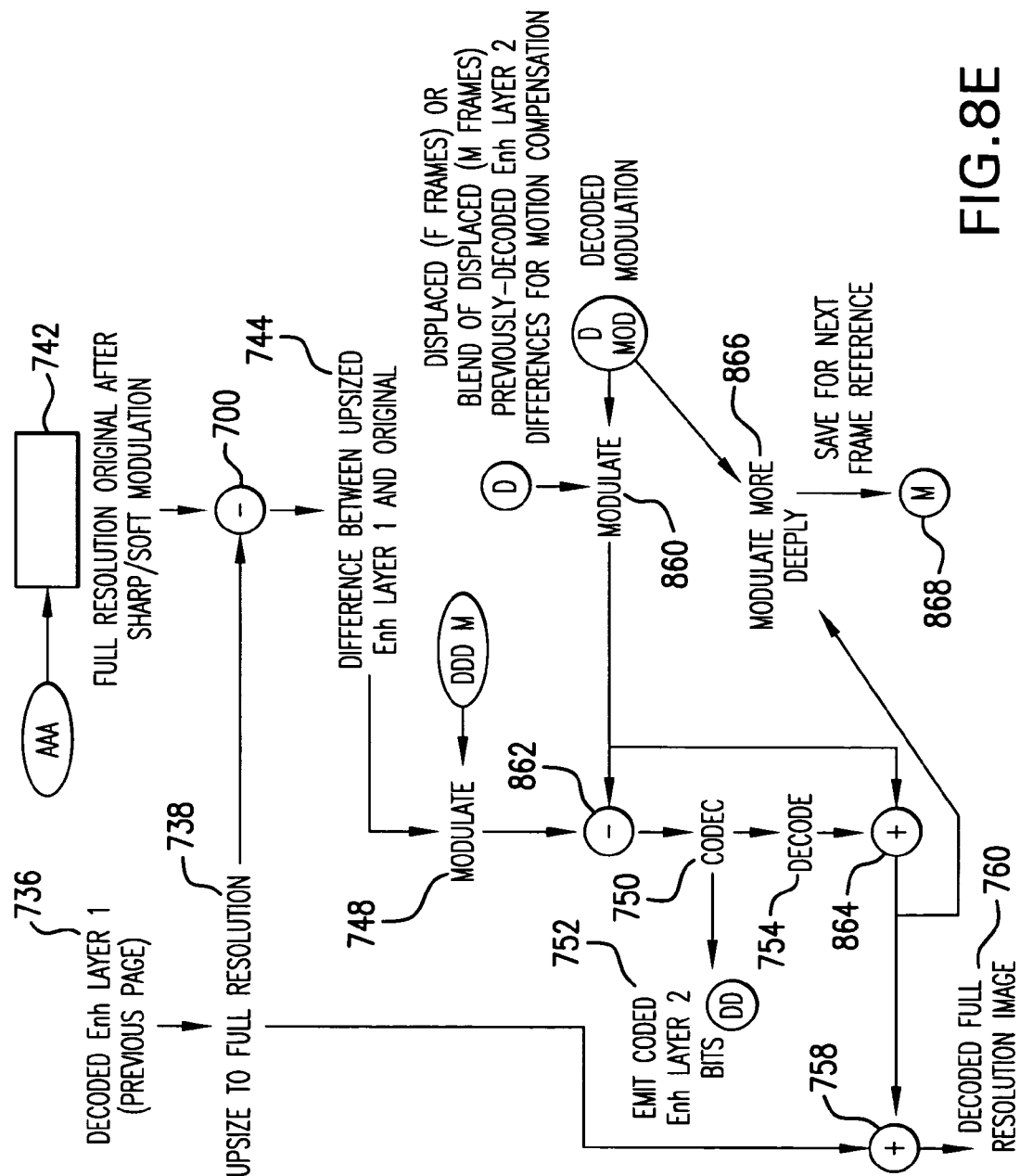

FIG. 7 shows the application to intra encoding of sharp/soft in-place filtering and resolution-enhancing layer modulation. In this example, a full resolution image 700 (from FIG. 6) is encoded using a variable downsizing optimal filter 702 to yield a layer 1 704 which is ⅔ of the full resolution, and a base layer 706 which is ⅜ of the full resolution. A sharp/soft in-place filter BBB S (from FIG. 6) is applied 708 to the base layer 706 and the result coded using a quantized codec 710, which outputs bits representing the coded base layer 711. A decoded version 712 of the output of the codec 710 is stored 713 for subsequent use, and upsized 714 to the same resolution as layer 1 704. A sharp/soft in-place filter CCC S (from FIG. 6) is applied 716 to layer 1 and the result subtracted 718 from the upsized decoded base layer 714 to generate a difference output 720.

The difference output 720 can then be sharp/soft filtered 722 and modulated 724 using corresponding same-resolution outputs CCC S and CCC M from FIG. 6, and the result coded using a quantized codec 726, which outputs bits representing the coded enhancement layer 1 728. Note that, as above, "modulation" refers to the weighting of resolution-enhancing pixel deltas.

The decoded version 730 of the output of the codec 726 is also added 734 back to the upsized decoded base layer 714 to generate a decoded enhancement layer 1 736. That output may then be upsized 738 to full resolution and subtracted 740 from the full resolution original image (after sharp/soft filtering) AAA (from FIG. 6) to generate a difference output 744. As with layer 1, the difference output 744 can then be sharp/soft filtered 746 and modulated 748 using corresponding same-resolution outputs DDD S and DDD M from FIG. 6, and the result coded using a quantized codec 750, which outputs bits representing a coded enhancement layer 2 752. A decoded version 754 of the output of the codec 750 may be saved 756 for use as a reference for coding a next F or M frame. The decoded version 754 of the output of the codec 750 is also added 758 back to the upsized decoded enhancement layer 1 to generate a decoded enhancement layer 2 760.

FIG. 7 is constructed with tools from FIG. 1, using data created in FIG. 6. Note that no additional information need be sent to a decoder, since this encoding-only application of flowfields to sharp/soft layered filtering and to modulation of resolution-enhancing layers is applied to pixels prior to encoding.

Use of Coded Flowfields for Motion Compensation

Unlike encoding-only flowfields, motion compensation flowfields are compression coded and then sent (directly or via an intermediate medium) to a decoder. A decoded flowfield's motion vectors are used by both the encoder and decoder to displace pixels from one or more previously decoded reference frames, using a sharp/soft filter during the displacement, to generate a representation of the current frame. In the layered system of the present invention, the pixels from a base layer and all resolution enhancing delta layers are each displaced using motion vector flowfields scaled to their respective resolution. The resulting displaced base image is subtracted from the current frame's original base image prior to coding, resulting in a coded delta at the base layer. Similarly for the preferred layered codec of the present invention, each displaced resolution-enhancing delta layer is subtracted from the corresponding resolution-enhancing delta layer prior to coding, resulting in corresponding coded delta at each such layer.

After the base and resolution-enhancing delta layers are decoded, they must be added to the flowfield-displaced previous frame base and flowfield-displaced previous resolution-enhancing delta layers. After this sum, the base layer is complete. The base layer is then upsized and added to the resolution enhancing first layer, to yield the decoded image at this first layer resolution. The first layer decoded image is then upsized to the next higher resolution (such as full resolution), and added to the decoded resolution enhancing delta layer to yield the decoded next higher layer (and, by repetition, ultimately the full resolution image).

During this process, the sharp/soft filter 130 is applied using the scale of motion vectors at each given level to indicate the amount of softness to be used (since motion vector length must be considered in units of a given layer's resolution).

Modulation can also be usefully applied within the decoding process using the decoded motion vector length. The simplest application of this decoded flowfield modulation is when the decoded base and decoded resolution-enhancing delta layers are stored and/or retrieved for reference by the next F (or M) frame (see discussion below of modulating when storing versus modulating when retrieving). In addition to this modulation, an overall amplitude reduction scale factor is also applied prior to storing and/or retrieving.

Decoded Flowfield-Driven Modulation and Overall Amplitude Reduction of Resolution-Enhancing Delta Layers When used, an amplitude-reducing scale factor is applied when the decoded resolution-enhancing layer is stored and/or retrieved, and does not affect the current frame (only subsequent frames). This differs from the affect of encoding-only modulation, which directly affects the coded appearance of the current frame. Modulation while storing and/or retrieving only affects the current F frame in that it was applied to previous frames when they were stored and/or retrieved, and then displaced (and/or optionally modulated after displacement) for subtraction in the current frame.

Another difference is that encoding-only modulation reduces the resolution enhancing layer prior to quantization, but typically retaining some amount of the original image noise and detail (since it is not possible to completely isolate noise from detail). For example, typical ranges of modulation for resolution-enhancing layers might be about 0.5 to about 1.0, or about 0.75 to about 1.0, varying by region as described in other sections (preserving sharp detail at 1.0 when detail is known to be present).

For a regionally-varying amplitude-reducing scale factor, detail is not reduced in the current frame, nor in subsequent frames, even if the scale factor is zero, since the stored and/or retrieved frame is not used directly (it is flowfield-displaced and subtracted from the next F frame's resolution-enhancing difference layer). Thus, the scale factor described here is unlike encoding-only modulation wherein a zero modulation value will suppress all detail (thus zero is not used in encoding-only modulation, but rather a minimum modulation is usually in the range about 0.5 to about 0.75). The scale factor described here can be set to zero whenever there is doubt about detail being present in a particular region of the image, without degrading image quality. The goal of the scale factor described here is the reduction of frame-to-frame propagated noise, as well as the optimization of efficiency in flowfieldmotion-compensation at each given resolution-enhancing layer. When low-noise detail of any amplitude is present in a region, the decoded resolution-enhancing delta should be stored and/or retrieved with its near-full amplitude, such as when using an amplitude scale factor of 0.8. With normal noise and full detail, a maximum amplitude scale factor should be in the range of 0.7 to 0.9, with 0.8 being typical. If a high noise out-of-focus region is determined (or shown via manual assist), then there is no benefit to retaining any of its amplitude. In intermediate regions, unsure of sharpness, a value between 0.0 and the maximum (e.g., about 0.8) would be best, such as, for example, 0.4.

Encoding-only modulation is usually created by using an uncompressed motion flowfield (since there is no benefit to using a coded/decoded flowfield). A given layer's encoding-only modulation, therefore, does not need to be signaled to the decoder, since it is implicit in a given quantized resolution-enhancing layer. However, any regional amplitude scale factor applied when storing decoded resolution-enhancing layers, as described here, must be signaled to the decoder. The encoding-only modulation (in this case, using original uncompressed motion vectors and confidence), although it has already been applied to modulate the resolution-enhancing layer, was only modulated to a portion of the amplitude (such as 0.5 or 0.75 minimum modulation). The reconstructed modulation, determined from the decoded motion vectors, can be applied in series with the overall amplitude-reducing scale factor to achieve a regional modulation when storing and/or retrieving a frame's resolution-enhancing delta (for future F frame or M frame use). In this case, the modulation can go all the way to zero.

Further, given that the modulation is a function of confidence as well as motion vector length, the confidence channel can be modified such that it contains not only the quality of matches, but is augmented to have reduced confidence on regions known to be out-of-focus (for example, were regions are manually indicated, or where the image detail amplitude is at or below the noise floor). Thus, although the actual match might have high confidence, a region's confidence can be over-ridden and then greatly reduced for an out-of-focus region as a means to reduce modulation when storing resolution-enhancing delta layers (since out-of-focus regions in resolution-enhancing delta layers and in SNR layers only contain noise, but no detail). It is optional whether such an augmented (regionally reduced) confidence is applied at the encoding-only modulation step, and/or the resolution-enhancing-delta frame copying/storing step, and/or the retrieving step prior to displacement and/or subsequent to displacement (optionally using the confidence values from the new frame time). If applied at the resolution-enhancing-delta frame copying/storing step, as the means of achieving the regional amplitude-reducing scale factor described in this section, the augmented (regionally reduced) confidence should be quantized and stored with the quantized motion vectors.

Thus, modulation is best applied twice when processing resolution-enhancing delta layers of F frames (note that M frames are not generally stored for future use, although they can be stored if it is useful to reference them further). The first encoding-only modulation derived from the original (uncompressed motion vectors and (possibly augmented) confidence values is applied once with limited amplitude range (from 1.0 down to somewhere around 0.5 to 0.75 as minimum modulation) to regionally amplitude reduce scale (modulate) the resolution-enhancing delta layer values at a given layer prior to quantized encoding. This first encoding-only modulation is potentially directly visible if over-applied (or at least it affects the visible image by regionally reducing the amplitude of detail sharpness provided by a given resolution-enhancing delta layer). It is the goal of this first encoding-only modulation to not reduce detail sharpness compared to sharpness in the original image frame, but to reduce the noise added in regions which have motion blur, no detail (e.g., out of focus), or low confidence, or at screen edges.

The second modulation derived from the decoded motion vectors and (possibly augmented) confidence values is applied again, with a wide amplitude range (e.g., from 0.8 down to 0.0) when copying/storing and/or retrieving the decoded resolution-enhancing layer for use with subsequent F frames and M frames. This second modulation is not directly visible, and only affects compression coding efficiency (thus helping optimize the reduction in bit rate, seeking optimally minimal coded bits) of subsequent F frames and/or M frames.

Applying Modulation when Retrieving vs. when Storing

Note that it is equivalent to apply the second modulation while storing versus retrieving a resolution-enhancing delta layer for reference by subsequent F and/or M frames. It makes no difference whether the information is modulated prior to being stored, or subsequent to being retrieved. After retrieval, a new frame is being processed which references the stored frame's information. The advantage of applying modulation at the time of retrieval is that many modulation scalings and amounts can be tested for coding efficiency when used as a motion compensation reference in the current frame. If, however, modulation is being driven by a previously-decoded flowfield from the prior reference frame, such flowfield must be retained if it is to be available for use in one or more subsequent frames for testing modulation amounts.

Note that it is further possible to test modulation amounts, both overall scaling as well as regional modulation, subsequent to the current frame's decoded flowfield displacement. In this way, both the previous decoded flowfield which would have been applied when the resolution-enhancing delta layer was stored, as well as the current frame's decoded flowfield, can be available to determine optimal modulation of the previous reference frame's resolution-enhancing delta layer after it has been retrieved for use as the motion compensation reference in the current frame for subtraction from the current resolution-enhancing delta layer.

It is possible for a region of low confidence to be a mismatch at the current frame with respect to a previous frame, and yet be an area of nearly motionless high detail which will match subsequent frames. Using the decoded flowfield modulation, this area will be suppressed, even though it would match well to regions of subsequent F frames. This will result in some motion-compensation inefficiency for this region when coding the next F frame, but will not affect the image in the next frame (since this modulation does not directly affect image appearance, only bitrate efficiency). On the following frame, however, the region will be retained, since the next-frame match will indicate that this detail region should be retained for use in subsequent frames. Thus, the region's inefficiency will be limited to a single F frame. It is possible to remove even this inefficiency by creating a flowfield for the subsequent F frame, or by examining the encoding-only flowfields to nearby frames (usually previous and subsequent). By examining both the flowfield for the current frame (which will be either an I frame or an F frame), as well as the flowfield for the subsequent F frame, it is possible to determine that this region of revealed detail should be preserved at high modulation (e.g., in the range of 0.7 to 0.9) when being stored for the subsequent F frame, even though the current frame considers this region to have poor confidence (or possibly having a long motion vector via an extraneous poor match). Note that the preservation of this region of detail must be signaled via the compressed confidence channel in the flowfield in such a way that a long motion vector's implied lack of confidence will be overridden. The decoder must use such signaling, or any other appropriate method, to know when a region's modulation should be high when storing and/or retrieving each resolution-enhancing layer. Another appropriate method is for the decoder to decode the flowfield for the subsequent F frame prior to decoding this layer of the current F or I frame. That subsequent flowfield is also a valid indicator of which regions of detail should retain high modulation (e.g., in the range about 0.7 to about 0.9). Thus, information from the current flowfield in an F frame, and/or information from the subsequent F frame's flowfield, can be used to control the amount of the decoded flowfield modulation when storing and/or retrieving the current F frame's resolution-enhancing layers for use by subsequent F frames. For an I frame, only the subsequent F frame's flowfield is available to control the amount of the decoded flowfield modulation when storing the current I frame's resolution enhancing layers for use by that subsequent F frame. If the subsequent F frame's flowfield is utilized in the decoded flowfield modulation, then the stand-alone decoder must match the decoder within the encoder either statically, or else it is necessary to signal to the decoder when to utilize this subsequent F frame's flowfield.

For I frames, the overall amplitude-reducing scale-factor (e.g., in the range of about 0.7 to about 0.9) can still be applied, even if flowfield and confidence information have not been computed (thus yielding no modulation information). Further, it is possible to compute intra frames (after the very first) using flowfields for the encoding-only regional modulation (e.g., modulating from 1.0 scale down to about 0.5 or about 0.75 scale). The decoding regional modulation (derived from the decoded flowfield motion vectors and confidence) cannot be applied, since no flowfield is conveyed to the decoder for intra frames. However, as mentioned above, the flowfield for the subsequent F frame can be decoded, and applied at the second modulation when storing and/or retrieving the I frame's resolution enhancing layers. When this is done, the decoder in the encoder must match the stand-alone decoder.

Note that the best coding choices may be made as each frame is decoded within the encoder. However, the examination of subsequent flowfields implies that those subsequent F frames are coded as F frames, when in fact they might be more optimally coded in some cases as intra frames (wherein there would be no flowfield). Thus, during the encoding process, it may be beneficial to apply the techniques of this invention on multiple passes through a sequence of frames in order to first determine which frames should be forced to intra coding and other coding choices as described herein, and then subsequently to code the sequence using those optimal coding determinations. As an alternative to, or in addition to, multiple passes, a human-assisted determination of regional and frame coding choices can be utilized. For example, it is simple for a human to specify regions of detail in a frame which are newly revealed and which will persist in subsequent frames.

It can also be beneficial to modulate both when storing and when retrieving. When storing, the benefit is that the amplitude of low-detail areas is reduced (and thus the noise as well as accumulated coding errors) within the resolution-enhancing delta layers. When retrieving, the benefit is that the flowfield-displaced resolution-enhancing delta layer has its amplitude further reduced before and/or after displacement in low detail areas of the next frame to which it is being applied. Thus, low detail areas are reduced from the image being stored (from a previously decoded frame), and low detail areas are further reduced in areas where the next motion-compensated frame (which is the current frame being decoded) has low detail.

Note that no modulation while storing is possible for intra frames, since no flowfields are coded. However, modulation upon retrieval is available when I frame resolution-enhancing delta layers are retrieved prior and/or subsequent to displacement for use in F and/or M frames, since M and F frames decode flowfields which can be used to control modulation upon retrieval.

Modulation Weighting Near Frame Edges when Storing and/or Retrieving Resolution-Enhancing Delta Layers for Motion Compensation The modulation minimum and maximum can both be reduced at frame edges when storing for displacement to future frames for motion compensation. Equivalently, the overall modulation, including the edge modulation, can be applied when the resolution-enhancing layer is retrieved prior and/or subsequent to displacement. This can be in addition to encoding-only modulation of resolution-enhancing delta layers (and/or optional SNR layers).

M Frames

M frames in the present invention are "Multiple Reference" frames. That is, they are formed by a weighted average of pixels using flowfield displacements from more than one previously decoded frames.

Unlike F frames, which propagate one to the next, starting with an I frame, M frames usually do not propagate one to another. This is conceptually the same as the way MPEG-2 P frames propagate, whereas B frames do not.

In the present invention, there are two main methods of computing M frames. These methods can be used as alternatives, or may be used together. There are other M and F frame methods, using flowfield inversion and the propagation of flowfields to new frame times, that will be discussed below.

The first M-frame flowfield compensation method is the subsequent-flowfield-delta mode. The first method of the present invention bears some similarity to "direct" mode in MPEG-4 part 2, where a subsequent P frame's motion vector at each macroblock is scaled by the frame distance, and then given a local delta. In the present invention, a decoded F frame motion vector flowfield is scaled by the frame distance, and then one or more optional delta flowfields are applied. Unlike direct mode, a separate delta flowfield may be used for the forward and backward direction, but like direct mode, a single delta can also be used (except that MPEG-4 part 2 uses macroblocks instead of delta flowfields). The resulting motion vector field is used to determine the forward and backward motion vectors. The result is then blended (see M-frame blending discussion below). Note that if the subsequent reference frame is an I frame, that this subsequent-flowfield-delta mode cannot be used. Note also that the delta flowfield may have the same resolution, or a different resolution, as the generating frames. If the resolution is different, it will usually be lower in order to save bits in the M frame flowfields. When the deltas are added to the frame-distance-scaled motion vectors of the subsequent F frame, the resolutions will all need to be scaled (usually up-scaled) to the level at which they are applied. Thus, if a delta flowfield has half the resolution of the subsequent F frame's flowfield, and they are both being applied to an image layer at twice the resolution of the subsequent F frame's flowfield, then the F frame's flowfield will be scaled up by two, and the current M frame delta flowfield(s) will be scaled up by a factor of four before summing the deltas to obtain the new flowfields for the forward and backward directions of the current M frame.

The second M-frame flowfield compensation method is the bi-directional flowfield mode. The second method of the present invention of flowfield-compensating M frames is to have two new flowfields, one for the previous reference frame (I or F), and one for the subsequent reference frame (I or F). This method can be used even when no F frames are present, such that the flowfield-compensated encoding would be composed entirely of I and M frames. If F frames are present, their pixels (and resolution-enhancing delta layers) are used as reference frames, but the flowfield of the F frame is not otherwise used in the bidirectional flowfield mode.

It is also often beneficial to use a reduced flowfield resolution for the bi-directional flowfield mode of M frames, compared to the resolution of F frames, since M frames using bidirectional-flowfield mode require twice as many flowfields per frame compared to F frames.

The two M frame flowfield modes can each be tested to see which is more efficient (i.e., requires the least number of bits). The subsequent-flowfield-delta mode can also be tested without any delta, which can be effective in the case of very smooth motion or almost no motion. In such a case, the M frame's bi-directional flowfield is obtained simply by scaling the subsequent F frame's flowfield by the frame-distance to the previous and subsequent reference frames, without adding any delta to the flowfield. This zero-delta use of the subsequent-flowfield-direct mode will be effective in enough cases of scenes which are sufficiently statistically likely that zero-delta mode will often be most efficient (although usually not in cases of complex motion).

Which of these M frame flowfield modes is chosen must be signaled to the decoder (usually in an M frame header).

FIG. 8 shows an F and/or M frame encoder which may be constructed with the tools from FIG. 1. In this example, a full resolution image is encoding using arbitrary downsizing and upsizing optimal filters to yield a layer 1 resolution which is ⅔ of the full resolution, and a base layer resolution which is ⅜ of the full resolution. In particular, a full resolution F frame 800 is downsized 802 to a search frame 803. Similarly, a full resolution reference frame (I or F) 804, either an original image or a decoded image, is downsized 806 (e.g., ¼ to ⅛ size) to a reference frame 805. An 8×8 motion vector search is then performed around each 4×4 region of the search frame 803 against the reference frame 805 to generate a set of coarse motion vectors 808. The resulting coarse motion vectors are then scaled up and used as the center of a narrowed fine search for each 4×4 pixel region at full resolution; that is, the full resolution current frame 800 is compared to the reference frame 804 for fine search matches, to generate a set of fine motion vectors 810, resulting in one motion vector for each 4×4 region of the full resolution F frame 800. That motion vector flowfield output optionally may be noise reduced and smoothed 812, and optionally downsized 814 (e.g., to ⅛ or 1/16 size), and then coded 816 (e.g., using quantized DWT 9/7 bi-orthogonal subband wavelets). The coded flowfield bits may then be output AA as well as decoded 818 for subsequent use.

The decoded flowfield 818 may then optionally be noise reduced and smoothed 820; however, the noise reduction and smoothing filters of a stand-alone decoder must match the encoder side of the process for good results. The decoded flowfield 818 may then be resized (e.g., to ⅜ and ⅔ resolution) and motion vector scaled 822 to create a base flowfield 823, an enhancement layer 1 flowfield 824, and full resolution enhancement layer 2 flowfield 825, with confidence values for each. The decoded and rescaled flowfields 823, 824, 825 may then be used to displace and sharp/soft filter various previous outputs 826, 827, 828 of corresponding resolution to generate a set of intermediate outputs B, C Mod, C, C S, D, D Mod, D S.

In a next stage, the full resolution sharp/soft filtered original image AAA (from FIG. 6) is processed in a manner very similar to that shown in FIG. 7 (like reference numbers are used to represent like steps). However, notable differences are that the intermediate output B 830, representing a displaced F frame or a blend of displaced M frames for a base layer previously decoded for motion compensation, is subtracted 832 from the output of the sharp/soft filter 708 prior to coding through the codec 710, so that a flowfield compensated base difference is the object of encoding. After that coded flowfield is decoded 712, the intermediate output B is added back 834; the result is saved 836 for use as a next frame reference.

In a next stage, the difference between the upsized decoded base layer and the layer 1 original is processed in a manner very similar to that shown in FIG. 7 (like reference numbers are used to represent like steps), but with several notable differences. A previously generated intermediate output C, representing a displaced F frame or a blend of displaced M frames for the enhancement layer 1 previously decoded for motion compensation, is in-place modulated 840 by C Mod, and then sharp/soft in-place filtered 842 by C S. The result is subtracted 846 from the input to the codec 726 before coding, and then added 848 to the output of the decode step 730. The output of the add step 848 may be further modulated 850 by C Mod, and the result saved 852 for use as a next frame reference.

In a next stage, the decoded enhancement layer 1 is processed in a manner very similar to that shown in FIG. 7 (like reference numbers are used to represent like steps), but with several notable differences. The step of sharp/soft in-place filtering 722 from the example in FIG. 7 is omitted in the example of FIG. 8, since sharp/soft filtering is an optional step at 722 in order to reduce noise in resolution-enhancing layers in soft regions of the image having large motion vectors or low confidence; however, if desired, such filtering 722 may be used. A previously generated intermediate output D, representing a displaced F frame or a blend of displaced M frames for the enhancement layer 2 previously decoded for motion compensation, is in-place modulated 860 by D Mod. The step of sharp/soft in-place filtering 746 from the example in FIG. 7 is omitted in the example of FIG. 8, since sharp/soft filtering is an optional step at 746 in order to reduce noise in resolution-enhancing layers in soft regions of the image having large motion vectors or low confidence; however, if desired, such filtering 722 may be used. The result is subtracted 862 from the input to the codec 750 before coding, and then added 864 to the output of the decode step 754. The output of the add step 864 may be further modulated 868 by D Mod, and the result saved 868 for use as a next frame reference.

Note that if the process above is applied to an M frame, multiple reference frames may be used, in conjunction with weighted proportions of displaced pixels, with new motion vector flowfields or with scaled nearby flowfields (or a combination of both).

Note that FIG. 8 uses the data created in FIG. 6 for encoding-only processing of in-place sharp/soft filtering of any and all layers, as well as encoding-only modulation of resolution-enhancing layers above the base layer. The base layer is the lowest level of flowfield motion compensation. The base layer is the lowest decodable resolution layer which can create a viewable moving image.

Figure 9A:
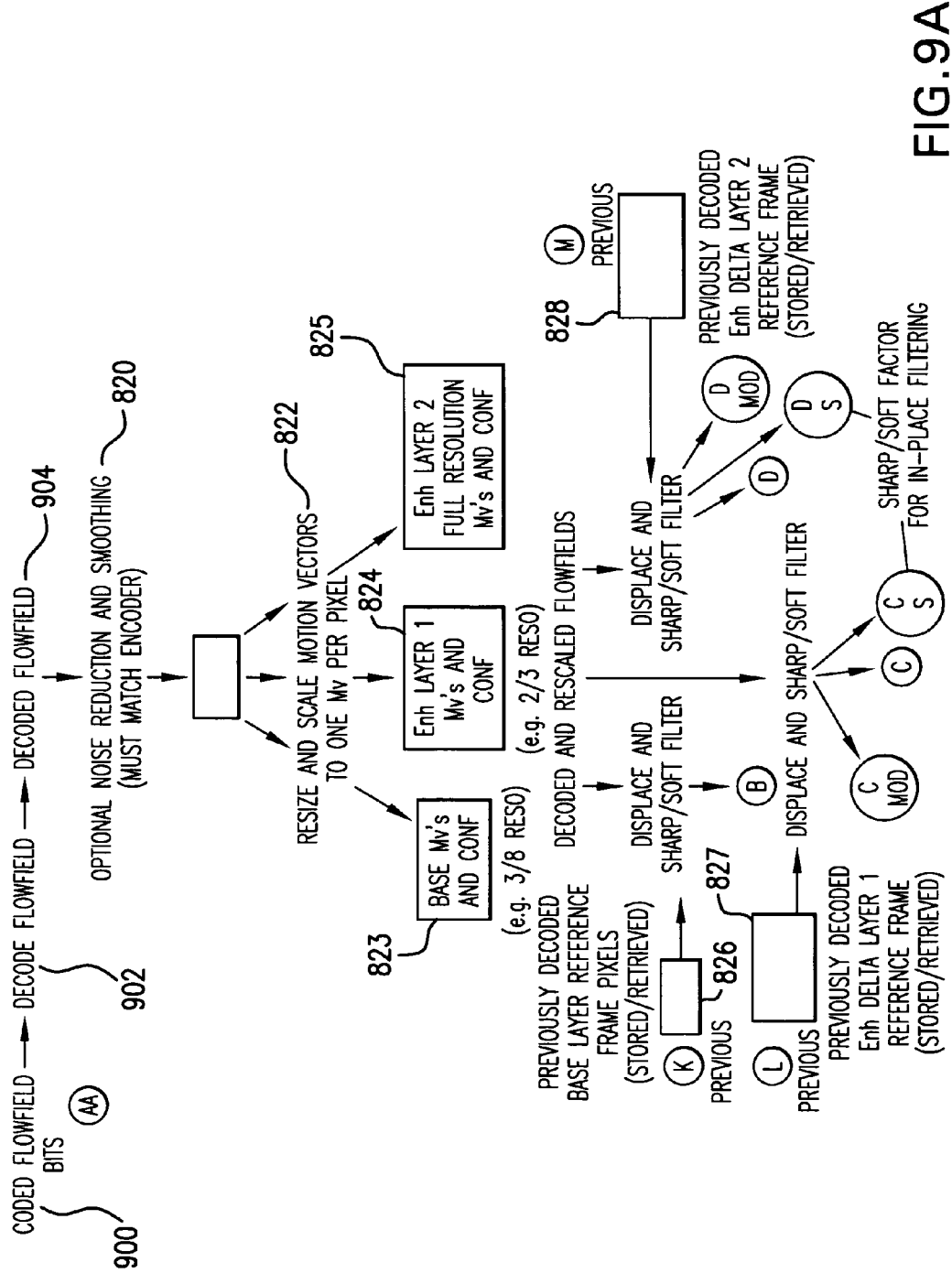
FIG. 9 is a block diagram showing an F (forward predicted) flowfield motion compensated frame decoder.
Figure 9B:
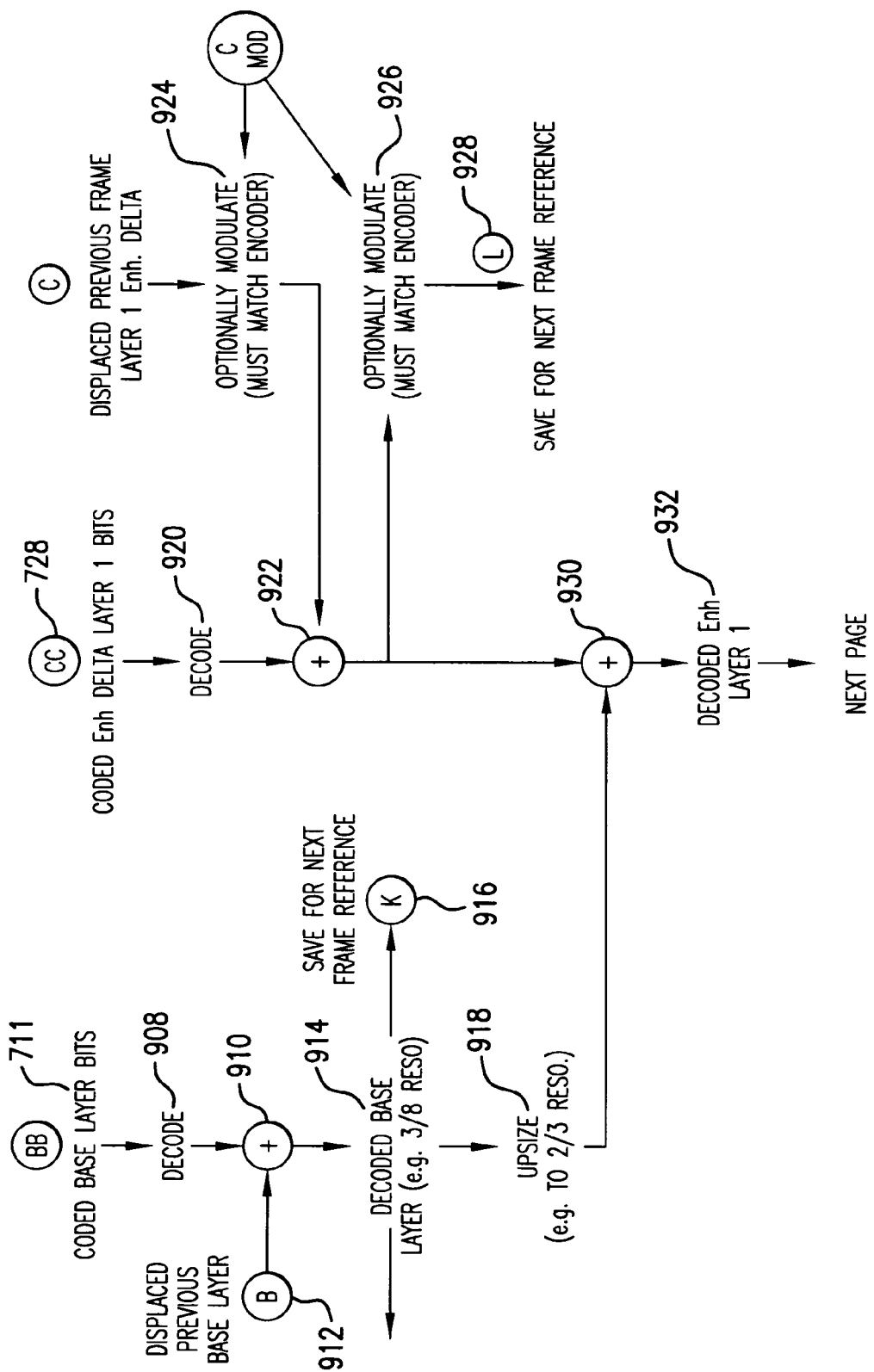
Figure 9C:
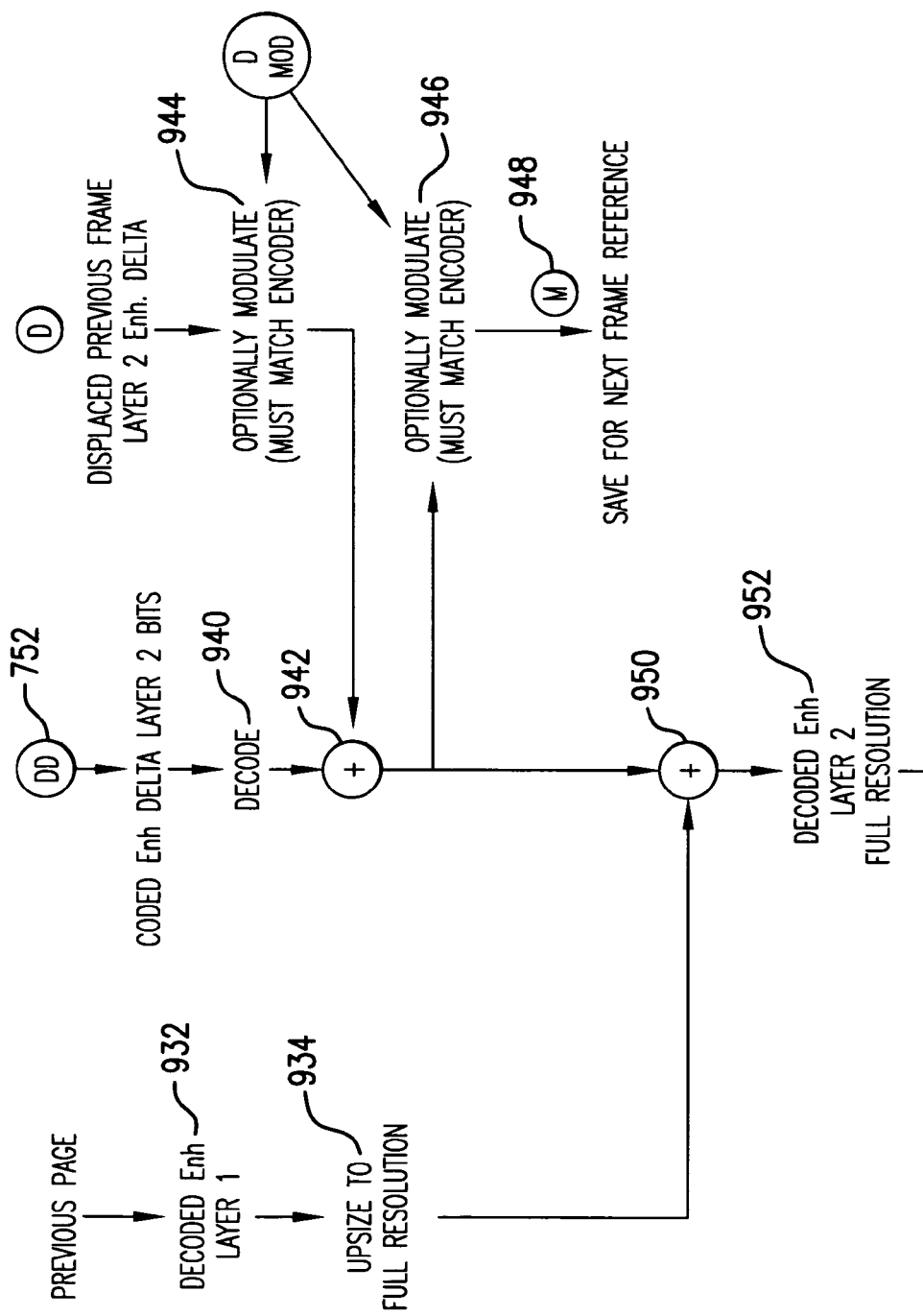

FIG. 9 shows a stand-alone F-Frame decoder which may be constructed with the tools from FIG. 1. Coded flowfield bits AA (from FIG. 8) 900 are decoded 902, resulting in a decoded flowfield 904. Processing proceeds in a manner similar to that shown in FIG. 8 (like reference numbers are used to represent like steps), but becomes somewhat simplified after generation of the set of intermediate outputs B, C Mod, C, C S, D, D Mod, D S. The coded base layer bits BB 711 (from FIG. 8) are decoded 908 and added 910 to the displaced previous base layer B 912, resulting in a decoded base layer 914 that may be output as well as saved 916 for used as a next reference frame. The decoded base layer 914 is then upsized 918 (e.g., to ⅔ resolution).

The coded enhancement layer 1 bits CC (from FIG. 8) 728 are decoded 920, and added 922 to the intermediate output C, representing a displaced previous frame enhancement layer 1, which optionally may be modulated 924 by C Mod. The output of the adding step 922 may be further modulated 926 by C Mod and the result saved 928 for use as a next frame reference. The output of the adding step 922 is also added 930 to the upsized decoded base layer 918 to generate a decoded enhancement layer 1 932.

The decoded enhancement layer 1 932 is then upsized 934 to full resolution. The coded enhancement layer 2 bits DD (from FIG. 8) 752 are decoded 940, and added 942 to the intermediate output D, representing a displaced previous frame enhancement layer 2, which optionally may be modulated 944 by D Mod. The output of the adding step 942 may be further modulated 946 by D Mod and the result saved 948 for use as a next frame reference. The output of the adding step 942 is also added 950 to the upsized decoded enhancement layer 1 934 to generate a decoded enhancement layer 2 952.

As above, the base layer is the lowest level of flowfield motion compensation. The base layer is the lowest decodable resolution layer which can create a viewable moving image.

Multiple Reference Frames for F and M Frame Flowfield Motion Compensation

As described in U.S. Pat. No. 6,816,552 entitled "Interpolation of Video Compression Frames", by the present inventor, multiple previous and/or subsequent frames can be referenced by P and B frame types. This concept is extended in the present invention such that pixel regions within M or F frames, or entire M or F frames, can reference multiple previous and/or subsequent frames. A given M or F frame, or region within the M or F frame, must be identified to the decoder with information as to which frames such frame or region will reference. Also, any specific blending rules must be known by the decoder, whether signaled or statically assigned. Such blending functions can also be signaled by an independently coded channel, or can be sent via the confidence channel(s). When an F frame has multiple reference frames, a coded flowfield (and optional confidence) will be needed for each reference frame, together with knowledge of which reference frame to use. F frames can also reference previously decoded M frames, although the distinction becomes vague between multiple-reference F frames and M frames in this case. Although each reference frame used by F or M frames must have been previously decoded, the decoding order can be highly scrambled with respect to the display order, such that referenced frames can be both forward and backward in time with respect to display order. Also, it is necessary for the decoder to know how long to retain frames, such as by having a reference count which is decremented at each reference, such that the frame may be discarded after the reference count reaches zero.

It will be most common for multi-reference F frames to reference two or three previous F or I frames. Although there is no reason to prevent F or M frames from referencing frames which occur prior to the pervious I frame (prior in either decoding or display order), it will usually be the case that each I frame will start a new independently-decodable sequence in both display order and decoding order, such that no frames reference across I frame boundaries (in this most common case).

It will also be most common for M frames to reference frames both previous and subsequent in display order, usually the closest I and/or F frames. In the case where one or more M frames reference a subsequent I frame, that I frame must be decoded prior to decoding such M frames. This does not prevent each I frame from starting a new independently-decodable sequence, but such a sequence would skip any such previous M frames which might follow that I frame in the decoding sequence (but not in the display sequence).

M-Frame Blending

As described in U.S. Pat. No. 6,816,552 entitled "Interpolation of Video Compression Frames", by the present inventor, various pixel weights of previous and subsequent reference frame pixels can be blended in various useful proportions.

As described in U.S. Pat. No. 6,442,203 entitled "System and Method for Motion Compensation and Frame Rate Conversion", by the present inventor, the confidence value can also be beneficial utilized for weighting previous and subsequent frame displaced pixels during frame rate conversion or noise reduction processing. This patent also describes the concept of using an in-place proportional blend of nearby frames when overall confidence is low with respect to displacing pixels from all nearby reference frames.

These concepts are extended in the present invention for use with M frames (and multiple-reference F frames) such that various useful weightings based upon frame distance as well as confidence can be used with each flowfield when blending each displaced pixel from previous and subsequent reference frames. Thus, it is usually beneficial to use a higher proportional weight for pixels in regions having higher confidence with respect to one reference frame (either previous or subsequent) versus another reference frame. In the case of low confidence, a blend of pixels based on frame distance, but in the current time location, can also be used, which is the equivalent of forcing a zero motion vector for pixels in the M frame in the case of low confidence. Also, in the case where the confidence is nearly the same for pixel displacements for both previous and subsequent reference frames, the frame distance weighting can be used (usually with non-zero motion vectors). Unlike "System and Method for Motion Compensation and Frame Rate Conversion", however, long motion vectors, and/or low confidence, are used in the present invention to select softer displacement filters. Also unlike "System and Method for Motion Compensation and Frame Rate Conversion", the goal of the present invention is to minimize coded bits for the M frame, and not the correct appearance of the flowfield-displaced blended pixel image. Thus, various incorrectly matched regions may appear in the flowfield-displaced blend, which will then be corrected via the quantized pixel delta, such that these incorrect regions are never directly visible in the final decoded M frame pixels. As long as the overall bit rate is reduced from any given choice of M frame flowfield displacement method, the M frame is serving its purpose, even if the appearance of the flowfield-displaced frame itself is noticeably incorrect if it were to be viewed (which it never is in the current invention during flowfield motion compensation).

As with single-reference F frames, an optional smoothing noise-reduction filter can be applied to the decoded flowfields, as well optionally applied to the flowfields prior to compression coding them.

Note that the present invention usually yields locally smoothly varying motion vector flowfields and locally smoothly varying confidence values. If an M frame favors one reference frame in one region, and a different reference frame in another region, the transition between will usually vary smoothly. It is also possible for an M frame to favor only previous or only subsequent reference frames, in the case where there is an adjacent shot cut (i.e., a scene change). Also, as another example, a pan to the right will reveal new scene portions at the right edge in subsequent frames, such that a right edge of an M or F frame is only likely to match subsequent reference frames, and the left edge is only likely to match previous reference frames (since some of the left edge would disappear in each new reference frame).

F Frame Blending

Unlike M frames, which typically blend references to more than one frame, the most common use of F frames is a single reference frame (usually the previous I or F frame). When using a single reference frame, there is no pixel blending of multiple frames when creating the flowfield-displaced image.

However, in the case where an F frame references more than one previous (or subsequent, if using reordering) I, F, or M frame, then blending can be applied. As with M frames, a variety of blending methods, involving frame distance and confidence, can be usefully applied. It may also be useful to signal the blending function in an independent channel, or via the confidence channel.

Extrapolated Flowfields for F and M Frames

When multiple flowfields are used for a given frame, it will usually be best to use a reduced resolution and/or higher quantization in order to reduce bits required for these multiple flowfields versus a single flowfield. Each flowfield requires coded bits, and the detail and accuracy of the coded flowfield is a function of both the quantization and resolution of the coded flowfield.

Another useful method when more than one frame is referenced by M and F frames is to extrapolate one or more flowfields for application to additional frames. The extrapolation would usually be done by scaling the motion vectors with respect to the time distances between frames. Thus, for example, if an F frame referenced a frame which was three frames previous, then a doubling of the motion vector length could be reasonably applied to a frame six frames previous. Similarly, as another example, a single flowfield pointing to the nearest previous reference frame could be extrapolated in the opposite direction to the nearest subsequent frame. An example of this would be an M frame referencing an immediately previous F frame, then scaling the vectors by minus two to point to reference an F frame which is two frames forward (skipping an intervening M frame in this example).

A separate confidence and/or blend proportion can then be used to indicate the usefulness of any such extrapolated displaced pixels. As long as a significant portion of any frame contains useful displaced matching pixels, as displaced by the flowfield from another nearby frame, a bit rate reduction and coding efficiency improvement will result. This is true even if a substantial portion of such other frame does not match usefully using such extrapolated motion vectors, as long as there are other regions of the frames which do provide a useful match.

In addition, or as an alternative, all or portions of frames may use a method similar to subsequent-flowfield-delta mode. However, any flowfield from any retained nearby frame can be applied, such that the source of the flowfield need not just be the subsequent reference frame spanning the current frame (to a previous reference frame). Also, as with subsequent-flowfield-delta mode, a delta can be applied to all or part of any frame, or may be quantized to favor various regions of the frame (saving bits in other regions). Even if the entire frame is not effective for motion compensation after displacement, the confidence and/or blend portion can signal which regions of the frame to blend, and how much to blend within each region. As long as the result improves overall bitrate efficiency, it is not necessary to have a good match everywhere.

Also, as with subsequent-flowfield-delta mode, the one or more extrapolated flowfields used for M and/or F frames may belong to nearby previously-decoded frames (either prior or subsequent in display order), and need not belong to the current M or F frame.

Double-Delta Flowfield Coding

In addition to sending coded flowfields and applying them in various ways, as describe above, it will also be sometimes useful to send flowfield deltas. These deltas are changes in the flowfield as it propagates from one frame to the next. In U.S. Pat. No. 6,442,203 entitled "System and Method for Motion Compensation and Frame Rate Conversion", by the present inventor, pixels (but not motion vectors, as in the present invention) were displaced and moved according to flowfields from one frame to another for frame rate conversion, usually with a blend from a number of referenced frames. For noise reduction, pixels were displaced to the current frame time FROM matching locations in nearby frames. However, for frame rate conversion, multiple independent flowfields were associated with each frame to be used at a new frame time, and pixels were moved TO new matching locations, rather than being displaced FROM matching locations, which generally results in "holes" (no pixel information) in the flowfield. Holes in the flowfield will yield holes in the resulting image. When displacing FROM matching locations, no holes will exist in the resulting displaced image, but there may be holes in the image which is referenced, as there will be pixel regions which are not referenced. Such unreferenced non-matching pixel regions (from other reference frames) do not degrade the effectives of the present invention for improving motion compensation bitrate efficiency for the current frame using flowfields. However, this difference in operation distinguishes the present invention when extrapolating motion vectors for use in a new frame time. This can be understood as the motion vector moving by its length with equivalent frame distance. Thus, for example, when referencing a neighboring frame, the pixels to which a six-pixel-long horizontal motion vector applies would be displaced by those same six pixels in the next frame if the motion is constant. Taking this into account would require moving the motion vector field TO new locations. However, since this would open up holes, and since the present invention does not require matching everywhere in each frame (only sufficient matching to reduce the bitrate), we can utilize motion vectors in their current location, without displacing them, even though we apply them at a different frame time. As long as the motion vector flowfield is reasonably smooth, this will often work well. In the case where it does not work well, only coding efficiency is effected, since the displaced image is not viewed in motion compensation. Note that the present invention can also propagate "FROM"; see the discussion below describing inversion of the flowfield direction.

This issue is not new in the context of macroblocks, since MPEG-4 part 2 uses "direct" mode, which is only dense on the subsequent P frame, and may have holes both in the previous reference (I or P) frame, as well as in intervening B frames. However, the approximate assumption that the motion vector can be used at the current B frame macroblock location without displacement, plus the utilization of a delta, allows direct mode to be useful. However, direct mode is only one choice for B frame macroblocks in MPEG-4 part 2, since forward, backward, and bi-directional (with two vectors) modes are also available choices for B frame macroblock motion compensation.

Thus, we can make the assumption that motion will often be the same at a given pixel location between different frames, even though motion will actually be displacing the flowfield. We can then keep the flowfield in place for a subsequent frame. The resulting flowfield can be applied to nearby frames, as described above, including applying F frame flowfields to intervening M frames in subsequent-flowfield-delta mode. In subsequent-flowfield-delta, an optional delta is available, although this delta is discarded after its use in the case of M frames. However, using subsequent-flowfield-delta mode to propagate one F frame's flowfield to the next F frame, the delta would be applied to the flowfield, and then retained for subsequent F frames, which could have further deltas. In this mode, a double-delta (a delta to motion vectors, which are themselves pixel location deltas) is being applied to move the flowfield from one F frame to the next.

Flowfield deltas may also be regionally applied, since some portions of a flowfield may be effective without any modifications (as when the motion remains smooth and constant in those areas).

Such a flowfield delta can be applied anywhere in the present invention when flowfields are being adapted for other frames (for both M and F frame types). Whether it is useful to retain the flowfields after adding the delta flowfield, or to code a new flowfield, will depend on the relative resulting bitrate efficiency. Whether a flowfield is coded directly, or whether a delta is added, and/or whether the resulting delta'd flowfield is retained for further use, must be signaled to the decoder.

Flowfield deltas may optionally have a different resolution than the flowfield(s) to which they are being applied. For example, it might be most efficient in some cases to use a lower resolution for the delta flowfield than is being used by the flowfield to which the delta is being applied. Since variable resizing is an available tool, along with motion vector length scaling, when applying flowfields at various resolution layers, it is simple to scale differing resolution flowfields and deltas to a common resolution and a corresponding common motion vector length scale before summing the delta onto the flowfield.

Inverting or Interpolating the Flowfields onto the Referenced Frame (e.g., the F Frame Reference) or onto Other Frame Times (e.g., M Frame Times)

In U.S. Pat. No. 6,442,203 entitled "System and Method for Motion Compensation and Frame Rate Conversion", by the present inventor, flowfields were used to project pixels to new times for frame rate conversion. When projecting motion vectors to a new time, there will be portions of the frame at the new time which have more than one reference, and other portions which have holes lacking a reference. In the U.S. Pat. No. 6,442,203, pixels were cast along motion vectors from neighboring frames, and then weighted using a cone filter which weighted the amount of each projected pixel by the distance from the new pixel location in the new frame time. At the end of this process, a list of all projected pixels, and their weights, was then processed and normalized using these weights to yield a new pixel for each location at the new frame time. Further, the U.S. Pat. No. 6,442,203 initialized each pixel to the weighted average of the nearest previous and subsequent frames in case there is a hole in the reference field of motion vectors such that no radius reaches far enough to touch a given pixel.

Figure 10:
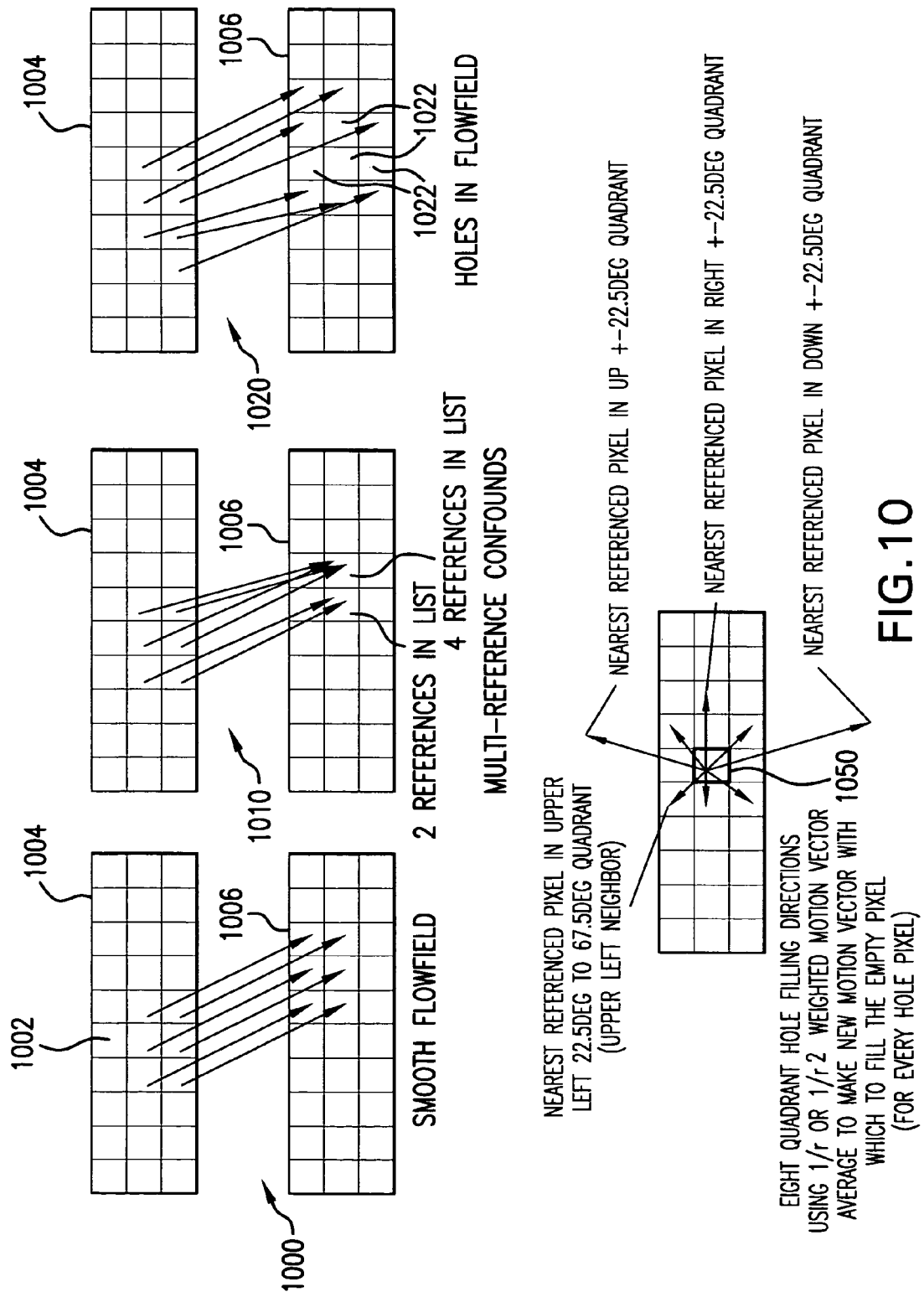
FIG. 10 is a diagram showing pixel grids to illustrate flowfield inversion, wherein forward flowfields are reversed to point backward, or backward flowfields are reversed to point forward.

FIG. 10 is a diagram showing pixel grids to illustrate another aspect of the present invention, flowfield inversion, wherein forward flowfields are reversed to point backward, or backward flowfields are reversed to point forward. Three cases are shown. In case 1000, uniform motion translates pixels 1002 uniformly to fully and uniformly fill the inverted motion vector flowfield; thus, a one for one relationship exists between the pixels 1002 of a source image 1004 and a target image 1006. In case 1010, converging motion involves pixels containing multiple motion vectors, such that multiple source pixels may point to the same target pixel, which creates ambiguity. These confounds cannot be uniquely inverted. The third case 1020 is diverging motion no motion vectors are projected to some target pixels, leaving "holes" or empty pixels 1022 within the inverted flowfield. One aspect of the present invention uses nearby flowfield motion vectors to "fill" such holes.

The method of the present invention is as follows. At the optionally reduced resolution of the flowfield, the motion vectors are cast onto the new frame time by placing them in a list within the pixel on which they fall. A perfectly smooth flowfield with absolutely uniform motion (such as a very smooth camera pan) will cast each flowfield pixel onto one unique pixel in the frame at the new reference time (except at the frame edge). However, no real frame-to-frame motion yields such uniform mapping. As with U.S. Pat. No. 6,442, 203, holes and multiple references will be common. In the present invention, the list of motion vectors that fall on each pixel, together with their associated confidence, is accumulated by casting all motion vectors to the new time. If there is more than one motion vector falling onto a given pixel, the final list is weighted by the confidence of each (or blended with an optional amount of equal weighting in addition to confidence weighting). The list need not extend to very large size, since more than a few motion vectors referencing a single pixel is an anomalous motion pathological case. Thus, a fixed set of motion vector buckets for each pixel is sufficient. For example, a maximum list length of five or ten pixel references can be allocated, and further references discarded. In this way, every pixel location that receives at least one cast motion vector will contain a motion vector after all pixels from the casting frame have been moved along their motion vectors.

After the multiply-referenced pixel locations have been weighted and/or averaged to yield a single representative inverse motion vector, a single motion vector value will be available to all reference pixels. All unreferenced pixels, however, are holes in the flowfield at the new or inverted-reference frame time. The present invention fills these holes using a method similar to the U.S. Pat. No. 6,442,203, using a radial distance weight and the confidence (or combined weighted confidence in the case of multiply-referenced pixels). However, the present invention differs from the U.S. Pat. No. 6,442,203 in that the radial distance and confidence weights are applied to motion vectors, and not to pixel values.

The inversion of a flowfield in the present invention is similar to the U.S. Pat. No. 6,442,203 in that holes and multiple references will exist when going backward along a flowfield. However, the present invention differs from the U.S. Pat. No. 6,442,203 in that pixels are not projected. Instead, the present invention projects the flowfield itself (and thus the motion vectors) into the inverse reference frame time, or onto a new frame time. Further, the present invention also differs from the U.S. Pat. No. 6,442,203 in that holes are not allowed in the flowfield.

Further, the present invention also differs from the U.S. Pat. No. 6,442,203 in that the present invention seeks influence from each direction when filling the holes in the motion vector flowfield. For example, in FIG. 10, with respect to a hole 1050, using eight partitions of a 360 degree circle (45 degrees each), the nearest referenced (non hole) motion vector in that direction is used to make a new motion vector. A radial function, such as the inverse radius ($1/r$), may be applied to weight the neighboring (non hole) motion vectors (and their confidences). However, when using this method, a steeper radial function, such as the inverse square of the radius ($1/r^2$), will better weight the neighboring (non hole) motion vectors (and their confidences), such that closer motion vectors have much higher weighting influence. After the radial weighting function, the sum of the radial function weights and confidences is used as a divisor to re-normalize the radially-weighted and confidence-weighted motion vectors.

A smooth motion vector (and confidence) interpolation throughout the holes will result. The confidence can be optionally reduced in hole regions, since interpolated confidence is less sure than actual matching confidence. The larger the hole, and thus the further the distance to nearby non-hole motion vector pixels, the more that the confidence can usefully be reduced. Small holes, such as a single pixel hole in the motion vector flowfield, might retain nearly their full confidence, whereas interpolated motion vectors in the center of large holes might have a greatly reduced confidence.

The resulting projected and/or inverted motion vector flowfield, with one motion vector and confidence for each target pixel, usually at a reduced resolution, can then be resized and applied for any and all layers. It can be applied for single-reference F frames as well as for multi-reference F and M frames. It can also be applied for I frames, if useful, since decoded flowfields from F frames which reference the I frame can be inverted to point both forward and backward from the I frame (although I frames are usually coded to stand alone). The more likely use of such I frame flowfields is as applied to adjacent and nearby M frames which intervene previous and subsequent F frames.

Use of Inverted and/or Projected and/or Interpolated Motion Vector Flowfields

As described above in the present invention, M frames can use the flowfields from previous and subsequent frames by weighting the motion vectors for each pixel by the frame distance. However, this is known to be somewhat inaccurate since the motion vectors being used from the referenced frames have not been displaced to represent the current M frame time in which they are being used. Further, the flowfield in a previous F frame, which points backward in time to an even earlier frame, cannot be inverted and projected forward to the M frame without yielding holes and multiple references (requiring processes described above). Thus, one use of the projection of motion vector flowfields to new frame times is to invert a previous F frames' flowfield and project it forward onto an M frame. The M frame can then use this new flowfield to reference the previous F frame. The subsequent F frame's flowfield can similarly be projected (although it need not be inverted) back to the time of a previous M frame allowing reference to that subsequent F frame. Further, when an F frame references a previous I frame, the F frame can be inverted onto that I frame and then used to project the I frame's pixels forward in time onto any intervening M frames (between the I and subsequent F frame). This method can be used with M frames between two F frames as well, allowing the subsequent F frame, which points to the previous F frame, to be inverted onto the previous F frame and then projected forward onto each intervening M frame.

Note that the motion vector lengths must be scaled by frame distances when applying these flowfield motion vector projection methods.

In addition to the use with M frames, F frames can use projected motion vector flowfields together with deltas to improve efficiency. For example, in a configuration of frames types I0 M M F1 M M F2 M M F3 . . . it may be useful to have a high resolution flowfield between F3 and the I frame, and then project that flowfield onto frames F2 and F1, and then optionally add lower resolution delta flowfields at F2 and F1. In smooth motion cases, or low motion cases, the delta flowfields at F1 and F2 may be omitted. Also, using quantization when coding the delta flowfields for F1 and F2, it may be possible to use the full flowfield resolution of the F3 to I flowfield and yet still be efficient. This delta quantization may be the same as the quantization used to code the F3 to I flowfield, or may be coarser. In the case where the F2 and F1 delta flowfields have lower resolution, the quantization may usefully be coarser, the same, or finer than the F3 to I flowfield quantization.

Delta Correction to Inverted Flowfields and the Limitations of Flowfields and their Inversions Inverted flowfields are inherently less accurate than flowfields obtained by direct searching and matching. Consider the case where multiple motion vectors reference a single pixel during inversion. An example of this might be a pair of white disks in one frame, with one obscuring the other behind it. In the next frame the disk which is behind might move to the right and the one in front to the left, revealing two separate disks. Each of these two disks will match a single location in the previous reference frame. The average motion vector will point in between both disks when inverted, yielding inaccurate motion vectors for that portion of the inverted flowfield. In the opposite case, where two identical disks come together at a single location, one in front of the other, the single disk in the F frame has two valid locations in which to find a useful motion vector and match in the previous reference frame. Only noise levels will yield one location versus the other, since neither location has higher confidence than the other, and both locations yield a high confidence match.

Such cases, and other natural inherent confounds in motion matching flowfields between frames, will yield inaccuracies in both normal (i.e., forward) and inverted flowfields.

Some of the inaccuracies inherent in flowfield inversion can be corrected by having a delta flowfield added. The delta flowfield can usefully be at the same, higher, or lower resolution. The delta flowfield can also usefully use the same, finer, or coarser quantization.

Some other types of inaccuracies cannot be improved via delta corrections. The "two-disk to/from one-disk" confound cannot be improved between the two frames, but can potentially be resolved by examining additional previous and/or subsequent frames, such that the motion of two independent disks can be discerned, even though they merge as one disk in front of the other on a given frame. Thus, the use of both forward and inverse flowfield directions, as well as examining one or more previous and/or subsequent frames, can sometimes be helpful in resolving flowfield and motion ambiguities.

Use of Flowfield Inversion in Determining Confounds

When inverting flowfields, a confound is indicated when a region of pixels receives a sizeable list of motion vectors in each pixel of the region. If, for example, each pixel in a region averages two motion vector references, it is likely that two different independent regions have matched this given region. If these regions are very near each other, then the confusion is small, and mainly consists of size matching confusion. However, if the multiple motion vectors have significant differences (thus coming from separated locations), then the pixels in this region of the inverted frame, and in the separate locations of the referencing frame, are all likely to be confused.

The separate locations in the referencing frame can be referenced by adding the motion vector length (of each motion vector in the pixel's list) to the present pixel location (with resizing and motion vector scaling, if the resolutions differ, although the resolution of the inversion will usually be the same as the referencing frame).

Such confusion can be usefully signaled by decreasing the confidence (e.g., via a confidence-reducing scale factor) in both the inverted and normal (i.e., forward) flowfields for every such pixel involved. The resulting reduction in the confidence will help reduce the weight of such confused match regions (e.g., when they are applied using confidence-weighted blends).

Note that when there are two or three references in a pixel's list, if one has high confidence and the rest have low confidence, it will not be necessary to reduce the confidence of the one with high confidence. However, the ones with low confidence can usefully have their confidences reduced even further, since the pixel clearly matches somewhere else with high confidence.

Inversion from Decoded Flowfields

At the time of encoding, it will usually not be necessary to invert flowfields, nor otherwise interpolate them via different-time-projection. Flowfields between any two frames can be independently created in each direction at the time of encoding. Thus, flowfield inversion is primarily useful with respect to obtaining more information and use from decoded flowfields which have been compressed and sent to the stand-alone decoder.

The exception is the determination of confounds, which can be aided at the time of encoding by flowfield inversion.

Application of Inverted and New-Time-Projected Flowfields During Decoding for Frame Rate Conversion Using the same technique as flowfield inversion, it is possible to project any flowfield onto any new frame time (i.e., frame-rate conversion). The resulting flowfield can be used with a pixel delta in an M-type frame to correct that frame to an original frame. However, if no original frame existed at the new frame time, then the new-time flowfield becomes the sole means of projecting pixels onto the new time. This differs from the U.S. Pat. No. 6,442,203 in that it is the motion vector field (the flowfield) of the current invention that has been processed to remove holes, instead of the pixel field. Further, the decoded flowfield has been compressed in the present invention, as well as usually having a reduced resolution (which is scaled to each layer's resolution, as needed, via upsize and/or downsize filters). However, in a manner similar to the U.S. Pat. No. 6,442,203, the confidence associated with each pixel's motion vector in the flowfield can be used to weight the pixels in the new location if more than one frame is referenced.

For example, in an M-type flowfield configuration, a new time frame can be created using a scaled flowfield which has been projected from the following F frame to the current M frame time. The scaled flowfield can reference the previous reference (I or F) frame with a frame-distance motion vector scaling, as well as the subsequent F frame with an inverted frame-distance motion vector scaling (thus pointing forward and backward in time to the nearest reference frames). In this case, only one confidence is projected, so the pixel blend should be proportional to the inverse of the frame distance, or a blend of that and equal weighting (as with U.S. Pat. No. 6,816,552). However, if multiple flowfields are available, as with M frames using a forward and backward flowfield plus an F frame flowfield extending through the M frame, then the confidences from each flowfield can be used to weight the blend of pixels for the new frame time.

Decoded flowfields will usually create artifacts when used in this way to create new frames without delta corrections (since no original exists at the given frame time from which the delta's could be determined). Thus, it may be necessary to use the method of the U.S. Pat. No. 6,442,203 wherein each pixel in the new time is initialized to a proportional blend of adjacent reference frames (previous I or F, and subsequent F, which may not be adjacent, unlike the U.S. Pat. No. 6,442,203). When the confidence is low, or when the motion vector divergence is high, or when regions of the image can be detected as being incorrect, then the proportional blend, without motion vector displacement, can be utilized. This is equivalent to additional weighting terms using zero motion vectors to nearby frames. A continuous weighting between the proportional blend and the flowfield-projected pixels can be driven by the confidence. If multiple confidences are used with multiple flowfields, then the highest confidence can select the amount of the proportional blend (which will be small when there is high confidence, and large when there is low confidence).

One way to augment confidence in weighting the proportional blend is to attempt to detect incorrect flowfield prediction in regions of the image. One way to do this is to examine the same region of pixels in previous and subsequent reference frames. If the flowfield-projected image has colors or brightness outside of some scale factor times the pixel range in the same region of the nearby reference frames, then the area may be incorrectly projected by the flowfield. For example, if the region contains only grey values between 0.4 and 0.6 in the nearby reference frames, but the current projected frame has values as low as 0.1 or as high as 0.8, then the region can be given a low confidence and thus a high amount of the simple in-place proportional blend.

Another approach to decode-time frame rate conversion is to precondition the flowfields so that new frames will appear reasonable. This will likely require a manual process of modifying the flowfields until they yield reasonable intermediate frames during frame-rate conversion as part of decoding. However, automated processes using the tools of the present invention, such as the use of inversion to detect flowfield confounds, can also often be utilized effectively in creating flowfields suitable for frame-rate conversion as part of decoding.

During the creation of new frames via decode-time frame rate conversion, a strong modulation can be used by the confidence and motion vector length to modulate resolution-enhancing delta layers. Only the base layer need be unmodulated, although sharp/soft filtering can be driven by confidence and motion vector length (in base layer resolution). Resolution-enhancing delta layers can be modulated as well as being processed via sharp/soft filtering.

For the base layer, the in-place proportional blend (equivalent to zero motion vectors) of nearby reference frames can also be sharp/soft filtered by the confidence and motion vector length. Given that the in-place proportional blend will not be given much weight when flowfield confidence is high, the in-place proportional blend will then primarily be referenced in a somewhat softened form. Conceptually, the in-place proportional blend is the result of zero motion vectors referencing nearby reference frames (thus referencing the same location in those nearby frames).

Stereoscopic Flowfields for Motion Compensation of 3-D Moving Image Pairs

It is also possible to apply the flowfield motion compensation of the present invention to stereoscopic 3-D moving image pairs for F frames and M frames. There can be independent flowfield channels for each eye. However, this would not take advantage of coherence within the motion between the two eyes. Another configuration is to have flowfield(s) for one eye, and a delta to the flowfield(s) of the other eye.

Figure 11:
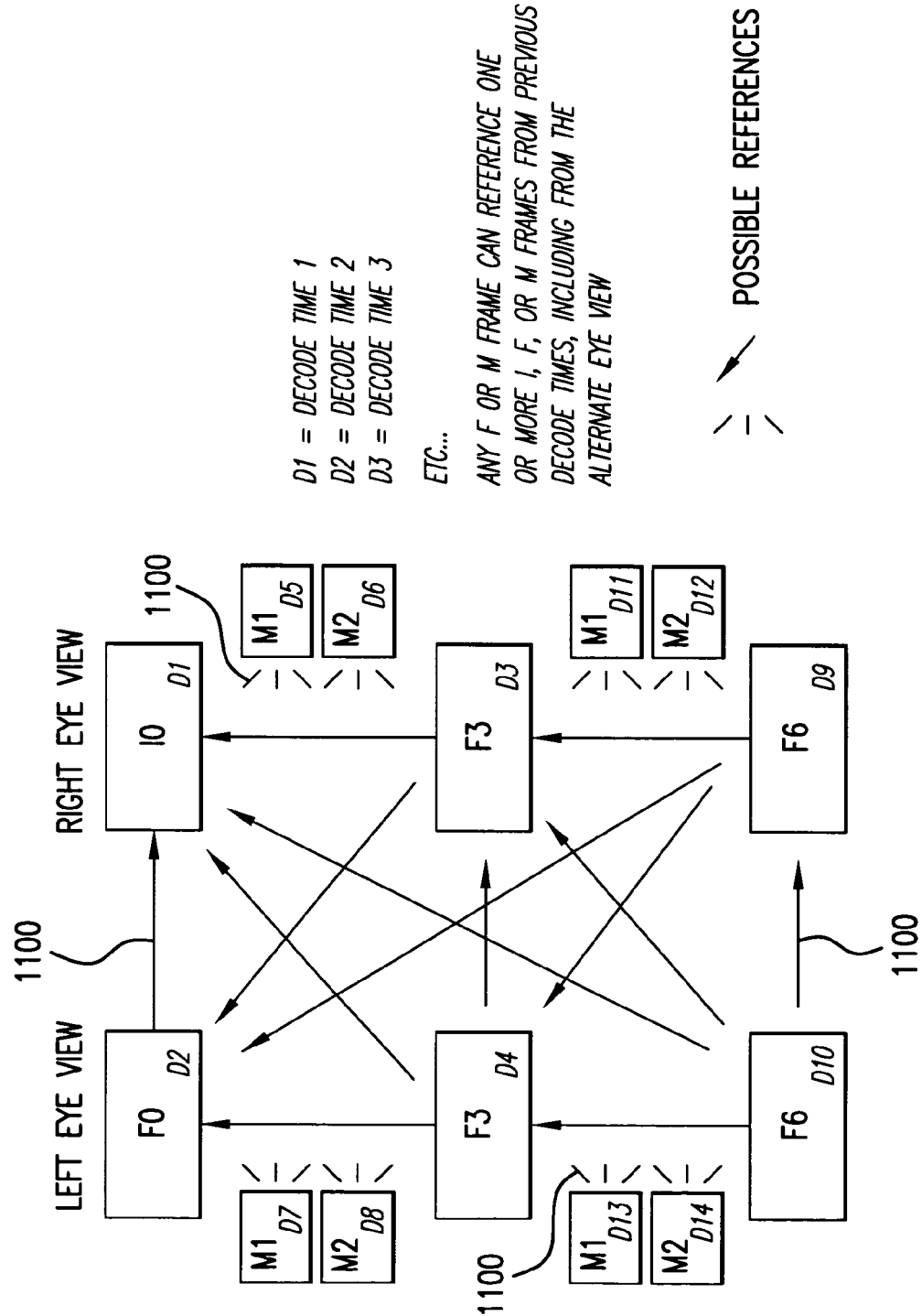
FIG. 11 is a block diagram showing possible alternate-eye-view references showing an example relationship of I (Intra), F (forward flowfield predicted), and M (multiple-frame-referenced flowfield predicted) frame types for use in 3-D stereoscopic moving image compression.

FIG. 11 is a block diagram showing possible alternate-eye-view references showing an example relationship of I (Intra), F (forward flowfield predicted), and M (multiple-frame-referenced flowfield predicted) frame types for use in 3-D stereoscopic moving image compression. Each arrow and line 100 represents some of the more useful possible flowfield references. M frames are also shown as referencing any of the useful F or I frames which occur previously or subsequently. The key concept is that frames corresponding to each eye may usefully reference previously decoded frames from either eye. The relative decode times are shown for each frame as D1, D2, D3, ... etc. Eye frames I0 and F0 are, respectively, the right eye and left eye view for frame 0. Similarly, eye frame F3 at time D3 is the right eye view of frame 3, eye frame F3 at time D4 is the left eye view at frame 3, eye frame F6 at time D9 is the right eye view of frame 6, and eye frame F6 at time D10 is the left eye view of frame 6.

Figure 12:
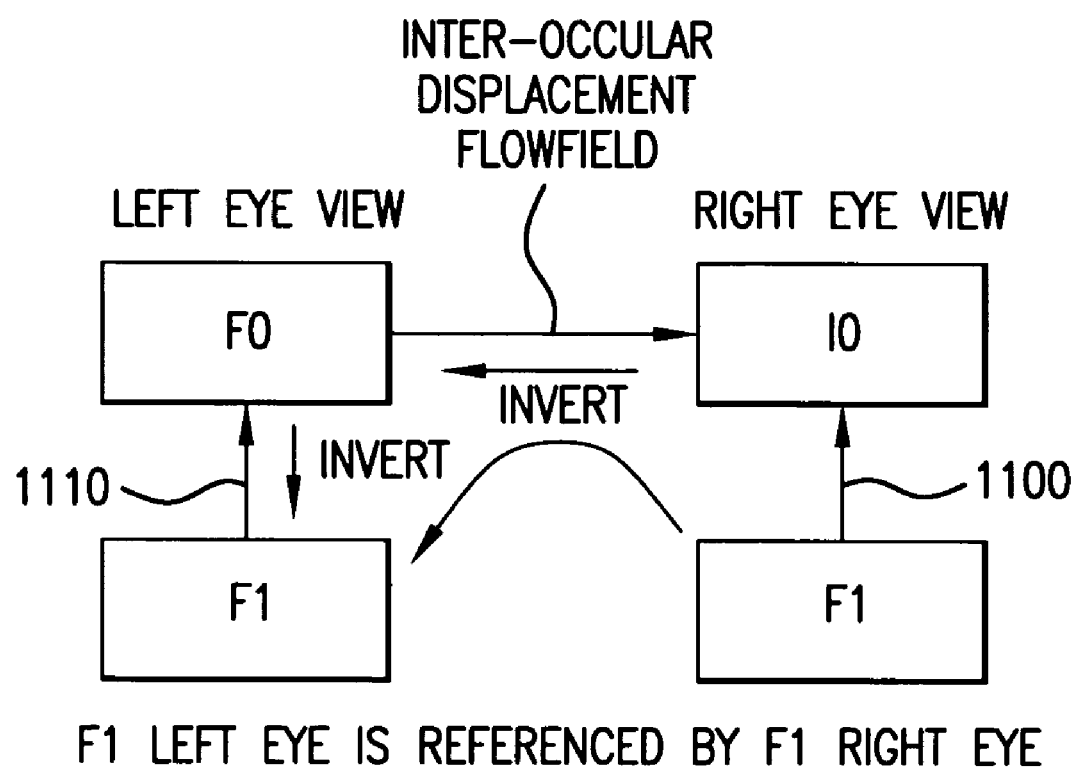
FIG. 12 is a block diagram showing an example of how a right-eye F frame can reference the left-eye F frame having the same frame time, using flowfield inversion and traversal across multiple frames (the previous frame time for both eyes in this example).

FIG. 12 is a block diagram showing an example of how a right-eye I frame can reference a left-eye F frame having the same frame time, using flowfield inversion and traversal across multiple frames (the previous frame time for both eyes in this example). The reference from left eye frame F1 to left eye frame F0 is inverted, as well as the reference from left eye frame F0 to right eye frame I0. Right eye view F1 can reference right eye frame I0 without inversion, but it can further indirectly reference left eye frame F0 by summing the motion vectors from right eye F1 to I0 with the inverted displacement vectors from left eye frame F0 to right eye Frame I0. Further, left eye view F1 can be referenced by further summing the inverted motion vectors from left eye F1 to left eye F0.

Figure 13:
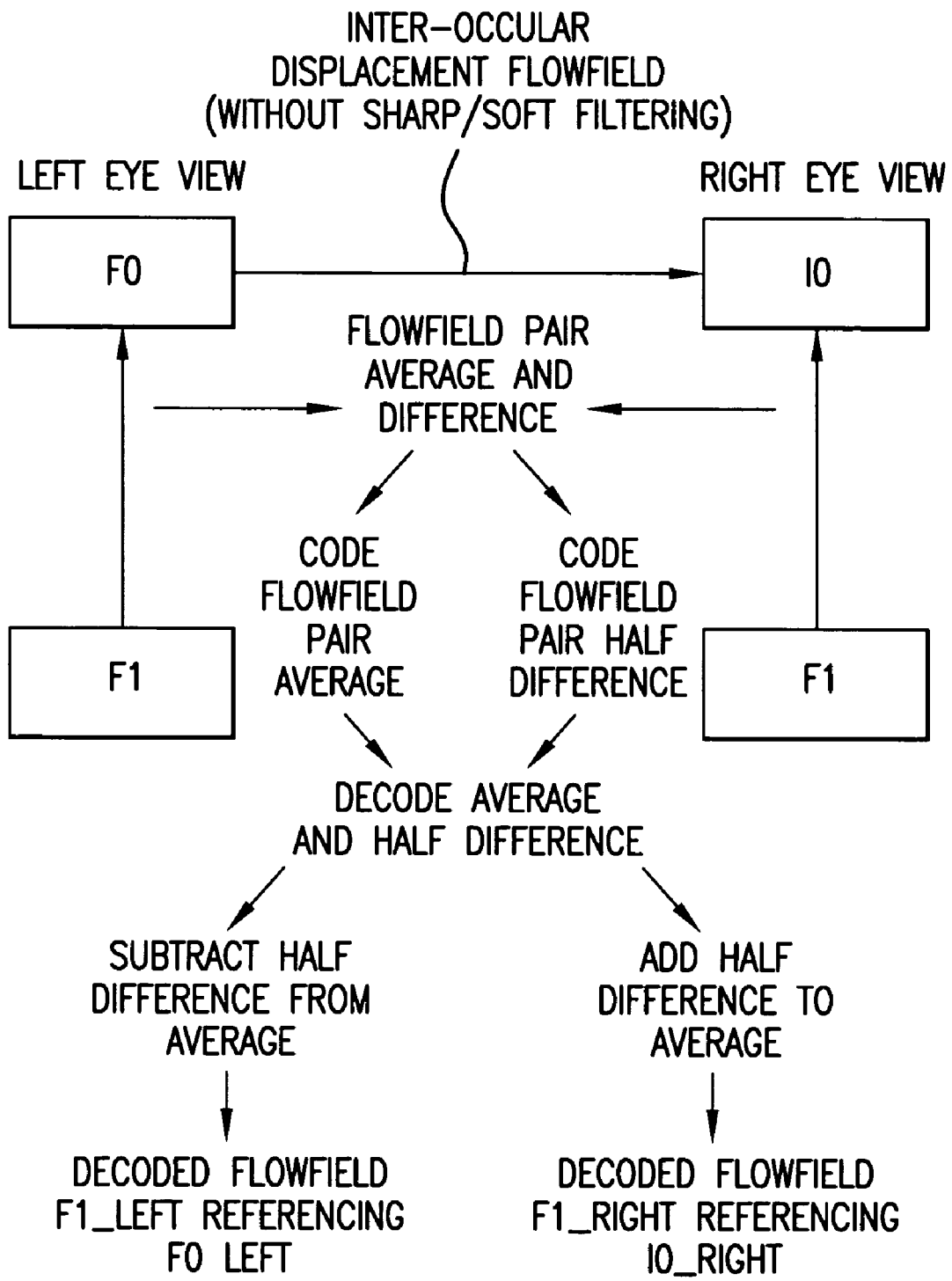
FIG. 13 is a block diagram showing the use of a flowfield average between the left-eye-view and the right-eye-view, combined with the left-to-right-eye interoccular displacement, which is added half for the right eye view and subtracted half for the left eye view.

An optimal configuration, however, is to use the average motion vectors from both eyes (by averaging the flowfield motion vectors and confidences of both eyes), and a separate delta for each eye. Since the average is half way between, a delta would then be added for one eye, and subtracted for the other eye, as shown in FIG. 13 (described in detail below). The same approach may be used with an average confidence and a delta confidence. Thus, this configuration would use an average flowfield for both eyes and a delta flowfield which is added for one eye and subtracted for the other eye. The average flowfield may usefully have a resolution which is the same, higher, or lower than the delta-for-each-eye flowfield. Note that the delta does not embody the interoccular displacement. Rather, the delta embodies the difference in displacement motion between the eyes across frame times.

The delta flowfield will often be zero, since the motion of both eyes will usually be the same for most portions of most frames. The exception to common motion is the case of close-up objects, which will have somewhat different motion as viewed from each eye, and which will then have non-zero deltas from the average to each eye. However, given that the goal of motion-compensation is bitrate reduction, it may sometimes be effective to code the average motion, without any delta for the motion of each eye view (or with a zero coded delta), in the case where the result is still effective bit rate reduction (e.g., when most of the area, but not all of the area, is moving the same for both eye views). Also, the motion vector deltas for each eye view are likely to be similar from one frame to the next for each location, so that these deltas can be predicted from previous frame deltas via double-delta coding. Similarly, the average motion vector flowfield of both eye views is likely to be similar from one frame to the next, also potentially benefiting from double-delta coding. Whether the flowfield motion vectors in the dual-eye-view average or the delta-to-each eye are double-delta from the previous F frame, or other nearby previously decoded frames, or coded independently, can be signaled for each frame in the header.

FIG. 13 is a block diagram showing the use of a flowfield average between the left-eye-view and the right-eye-view, combined with the left-to-right-eye interoccular displacement, which is added half for the right eye view and subtracted half for the left eye view. Efficiency is improved by adding and subtracting half of the displacement vectors to the average motion vector flowfield instead of coding independent separate motion vector flowfields for each of the left and right eye. This is primarily due to the eye-pair displacement typically changing much less than the motion between frames. Note that the displacement flowfield between eyes represents the displacement between views, whereas the motion vector flowfield between frame times represents motion in time.

Figure 14:
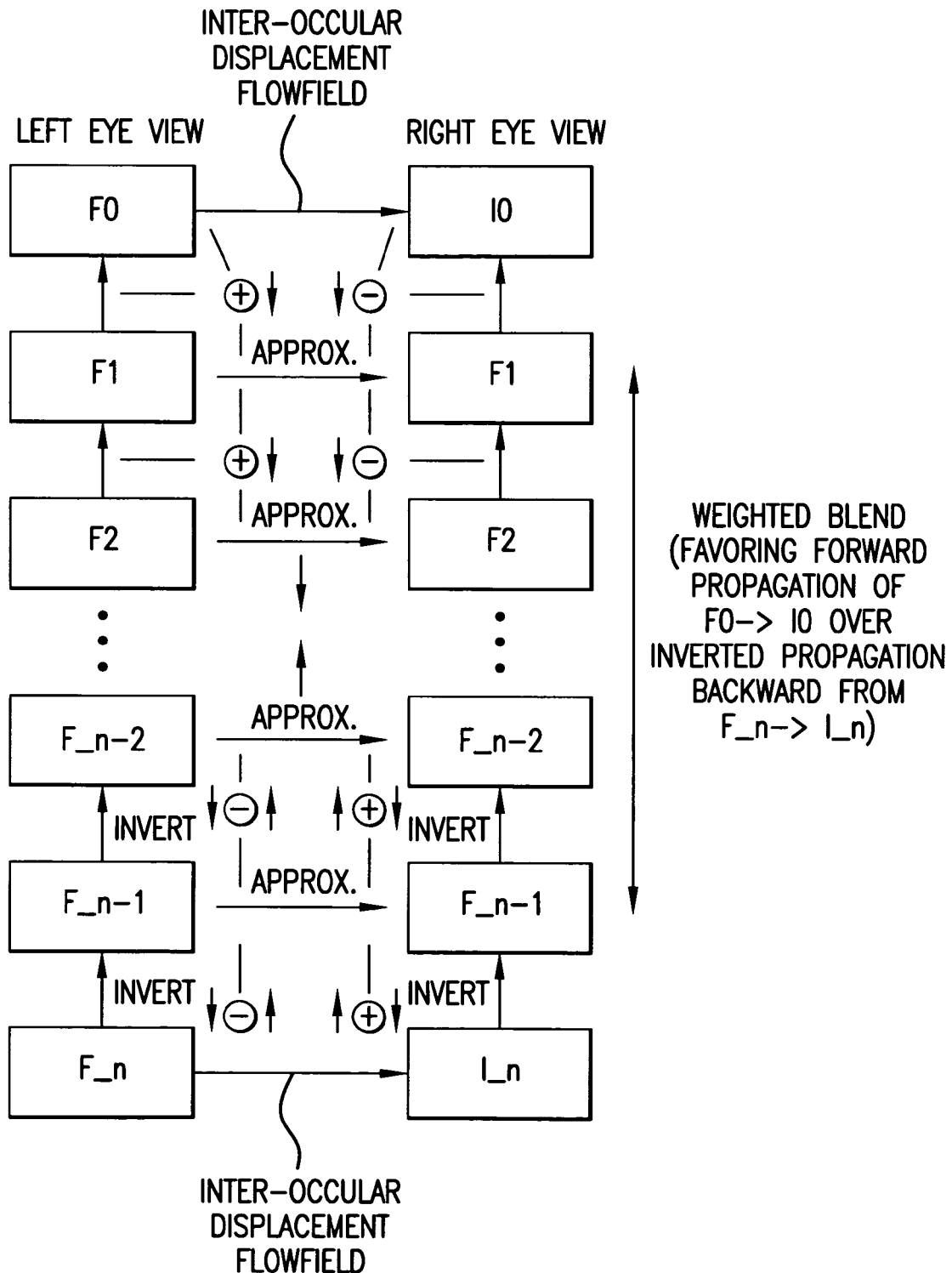
FIG. 14 is a block diagram showing the propagation of interoccular displacement using the F (forward) flowfields and their inversions for each eye. Note that the initial interoccular displacement begins at a right-eye I frame, displacing to the left-eye F frame, and that a subsequent right-eye I frame and its corresponding displacement to the left-eye F frame is propagated backward using flowfield inversion.

FIG. 14 is a block diagram showing the propagation of interoccular displacement using the F (forward) flowfields and their inversions for each eye. Note that the initial interoccular displacement begins at a right-eye I frame, displacing to the left-eye F frame, and that a subsequent right-eye I frame and its corresponding displacement to the left-eye F frame is propagated backward using flowfield inversion. The displacement between left eye F0 and right eye I0 is coded. Then, the motion vectors from the left eye are added, and the motion vectors from the right eye are subtracted, for each frame, to approximately update the displacement flowfield between eye views. Using inversion, the displacement flowfield between a future interoccular displacement flowfield between left eye Fn and right eye In can be similarly propagated backward in time.

Alternate-Eye-View Prediction for Intra Frames

Given that the left-eye and right-eye views will always be similar in correct stereoscopic 3-D, one eye can be predicted from the other using flowfield motion compensation to achieve improved compression coded bit efficiency. The first eye view would be coded as an intra frame, but the second eye view would be coded as an F frame via flowfield motion compensation. The resulting F frame for the second eye view would then be the reference frame for subsequent F and M frames of the second eye view.

Then, using the average-of-both-eyes and delta-from-the-average flowfields, each eye can be independently motion compensated for subsequent frames.

Note that F frames which are displaced from the same frame of the alternate eye view should not use the sharpening/softening feature of flowfield displacement. The lengths of the motion vectors in this case do not represent motion, but rather interoccular viewing differences. Thus, F frames which are displaced from the alternate eye view of the I frame should use a fully-sharp displacement filter when the confidence is high, even if the motion vector is long. A low confidence, however, can be used to select a variable softness filter (lower confidence selecting softer filter gradations than higher confidence, which becomes gradually sharper).

Note that the F-frame prediction from the alternate-eye-view I-frame represents the interoccular displacement for each point. As such, depth and other useful scene parameters can be inferred.

Maintaining the Interoccular Displacement Flowfield Using Double-Delta Coding It will sometimes be useful to maintain the interoccular displacement between alternate eye views for every frame. The interoccular displacement can be updated by a single delta, in the manner of the double delta flowfield method described above. As before, the delta to the interoccular displacement flowfield can usefully have higher, the same, or lower resolution than the interoccular displacement flowfield itself. However, optimum efficiency suggests that the delta be no higher resolution than the interoccular displacement flowfield (thus the same or lower resolution).

Using this double-delta method, the interoccular displacement between alternate eye views can be directly updated on each F frame, and/or on each M frame.

It may also be beneficial to consider the average and difference flowfields between frames, in addition to the interoccular displacement flowfield. This will be described below.

Alternate-Eye-View Prediction for F and M Frames

In some cases, such as long-range vistas, left and right eye views may be more similar than one frame to the next. Thus, it is also useful to allow both M and F frame types to reference previously decoded frames from the alternate eye view, as well as previously decoded frames from the same eye view, as shown in FIG. 11. Remember that previously decoded frames (from either eye view) may have a rearranged order with respect to displayed frame times (such as M frames referencing subsequent F frames in display time which must be decoded prior to referencing them). Note also that such reordering need not be the same for each eye view compared to the other eye, since coding efficiency might be highest when the coding order and reference order differs between the two eye views.

As with other M frames and multi-frame-reference F frames, the confidence of each flowfield can be used to weight the resulting blend. This applies to M and F frames which reference frames from both the same eye view as well as the alternate eye view. The flowfield confidence can be used in regionally weighting the blend independently of which eye view's frames are referenced. Conceptually, good matching, and therefore high confidence, is useful for regionally weighting multiple-reference-frame motion compensation no matter what frames are being referenced. Of course, the header for each M frame or multi-reference F frame must indicate which frames to reference, as well as any overall weightings to use (if any) in addition to confidence-driven regional weighting.

As with F frames which are predicted from I frames, any M frame or multiple-reference-frame F frames which reference the alternate eye view of the same frame time should not use softening as a function of motion vector length. However, M frames or multiple-reference-frame F frames which reference other frame times, from either eye, can usefully use softer filters when displacing with longer motion vectors. Low confidence can be used to select softer filters with any frame reference, including the alternate eye view of the same frame time. Confidence with M frames or multi-reference-frame F frames can be used for weighting between the referenced frames as well as being used to control sharp/soft filtering.

As always, high confidence and short motion vectors to any referenced frames should select sharp displacement filters (unless manually indicated that a given region is out-of-focus, or otherwise determined to be out-of-focus).

Maintaining Inter-Ocular Displacement

It is possible to maintain knowledge of interoccular displacement by projecting forward in time the left and right ends of the inter-eye F-frame displacement flowfield (without using a separate delta for the interoccular displacement). Thus, for a sequence left eye F0_left, F1_-left, F2_left, and right eye I0_right, F1_right, F2_right, the starting interoccular distance flowfield is contained in F0_left, which references I0_right. Compare FIG. 13 (showing only 2 of the 3 frames of this example). At frame time F1, the F1_right to I0_right flowfield is subtracted from the right end of the F0_left to I0_right displacement flowfield, and the F1_left to F0_left flowfield is added to the left end of the F0_left flowfield. In this way, an implicit F1_left to F1_right interoccular displacement flowfield is approximated. Similarly at the F2 frame time, the F2_right to F1_right flowfield is subtracted from the right end of the F1 interoccular difference flowfield, and the F2_left to F1_left flowfield is added to the left end of the F1 interoccular flowfield to yield an approximation of the F2 interoccular flowfield. A delta correction flowfield can also optionally be added to correct the interoccular displacement flowfield (similar to double delta mode).

Similarly with M frames, an approximation of the interoccular flowfield can be determined for each M frame by flowfield-interpolating the previous and subsequent interoccular displacement flowfields.

Knowledge of the interoccular displacement distance at each frame can have many uses. If the depth of field of the lens is known (usually via the F-stop), as well as the lens focus point, knowledge of interoccular displacement distance can be used to determine which portions of the image are in-focus and which are out-of-focus, and by how much. As described above in the present invention, knowledge of focus can be useful in weighting modulation of enhancement layer deltas, as well as in selecting sharp versus soft filters during displacement and in-place filtering.

Further, knowledge of inter-ocular displacement distance for the regions within a frame can be used, together with the effective inter-ocular displacement of the two camera lens views, together with the two-eye common aim point, to approximately determine the depth of every region of the image. A detailed specification and/or measurement of lens characteristics can further improve depth accuracy. In this way, a depth map can be automatically created and maintained by the codec for every frame. Depth maps are useful in many applications. For example, there exist display technologies that can modify the depth at which a portion of the image has its apparent focus. For such display technologies, the depth map can be used to allow not only the correct 3-D impression due to crossing the eyes to register an object in depth, but also focusing at the concurrent location as well.

Depth maps are also useful for compositing of images, since a foreground or mid-ground image can be placed correctly in front of, and/or behind, objects in the scene as appropriate. Depth maps can also be useful for helping to determine how far objects are from the 3-D Stereoscopic camera, in order to analyze the relationship of objects within a scene being viewed. Another use of depth is to add fog, haze, darkening, reduce contrast, or add other depth cues with distance. Objects at a greater distances can have their colors artificially desaturated (via a reduction in U and V modulation, for example) as a function of depth distance. Objects at certain middle distances can be brightened as if there were lighting illumination added to that middle distance. There are numerous other useful way to utilize depth information to help with interpretation or re-interpretations of 3-D stereoscopic scenes (or even to help with useful single-view non-stereoscopic presentations of the 3-D stereoscopic image stream).

Also, given that there is a flowfield present as well as an inter-ocular displacement map, objects which are moving differently from their surroundings can be automatically highlighted. For example, one or more objects can be indicated by increasing color saturation, brightness, and/or contrast, and/or changing color of the region containing the object, or of the object itself, if there is sufficient resolution in the motion flowfield and the inter-ocular displacement flowfield. For example, during decoding, a switch can be used to activate and deactivate highlighting of all objects moving with respect to their surroundings in a depth distance range between 4 meters and 10 meters from the 3-D Stereoscopic camera.

Application of Inverted Flowfields to Stereoscopic 3-D

As described above, it is possible to use a double-delta flowfield update to independently maintain the F0_left to I0_right displacement flowfield for each subsequent frame. However, it is also possible to usefully use the various other flowfields which are available to approximate the alternate-eye-displacement flowfield, as well as to reference across multiple frames and between alternate eyes for improved compression efficiency.

In the 3D Stereoscopic case, the ability to invert the flowfields allows one or more frame references to various alternate eye frames having nearby times. For example, consider a right eye sequence of I0_right F1_right F2_right, and a left eye sequence of F0_left, F1_left, F2_left. F0_left is F-frame flowfield predicted (without motion vector length sharpness/ soft filtering) from I0_right (compare FIG. 12). In this example, F1_right may therefore reference pixels in F1_left by traversing its flowfield motion vectors back to I0_right, across to F0_left using the inversion of the interoccular displacement flowfield, and then using an inverted flowfield from F0_left to F1_left. The pixel deltas at all resolution layers can be added and subtracted as appropriate to traverse all of these frames to create a combined pixel delta to add to the concatenated-flowfield displaced frame, together with a final correcting pixel delta. Alternatively, the frame can be displaced by the concatenated-flowfield displaced frame and used as a source for motion compensation and a new corresponding pixel delta (without reference to any pixel deltas associated with intervening traversed frames).

In an additional example, F2_left can reference F2_right directly via a flowfield approximated between F2_left and F2_right. F2_left can also reference F2_right via a flowfield created by traversing to F1_left, F1_right, and then inverted to F2_left. In this example, the pixel delta between F2_left and F1_left can be added, although the pixel deltas between F1_left and F1_right may not exist (although the pixel delta does exist between I0_right and F0_left), and the pixel deltas between F1_right and F2_right may not be useful since the flowfield is being inversely traversed. The pixel deltas created during motion compensation and pixel delta correction between F1_right and F2_right were intended only for references from F2_right pointing back to F1_right. On the inverted flowfield, these deltas are unlikely to be efficient in most cases, although in any cases when they are found to be efficient (such as low or uniform motion) they can be utilized (since these pixel deltas are inherently available). A header can signal whether or not to use pixel deltas when traversing flowfields.

Both F and M frames can reference a variety of nearby previously-decoded frames using a combination of normal and inverted flowfields.

Maintaining Per-Frame Inter-Ocular Displacement

It is possible to maintain per-frame knowledge of interoccular displacement by projecting forward in time the left and right ends of the inter-eye F-frame displacement flowfield. Thus, for a sequence right eye I0_right, F1_right, F2_right, and left eye F0_left, F1_left, F2_left, the starting interoccular distance flowfield is contained in F0_left which references I0_right (compare FIG. 14). At frame time F1, the F1_right to I0_right flowfield is subtracted from the right end of the F0_left to I0_right interoccular displacement flowfield, and the F1_left to F0_left flowfield is added to the left end of the F0_left to I0_right interoccular displacement flowfield. The F0_left-to-I0$_{13}$ right interoccular displacement flowfield points from the left eye position to the right eye position of frame 0.

The F1 frame update is accomplished simply by adding the F1_left flowfield (which points to F0 left) and subtracting the F1_right flowfield (which points to I0_right). In this way, an implicit F1_left to F1_right interoccular displacement flowfield is approximated. This approximate flowfield can be optionally augmented with a delta correction flowfield for interoccular displacement (a type of double delta).

Similarly, at the F2 frame time, the F2_left flowfield (which points to F1_left) is added and the F2_right flowfield (which points to F1_right) is subtracted to the F1-time interocular displacement flowfield approximation. This yields the F2-time inter-ocular displacement flowfield approximation. This approximate flowfield can also be optionally augmented with a delta correction flowfield for interoccular displacement (a type of double delta).

In addition to updating the interoccular displacement flowfield when moving forward in time (e.g., F1 to F2 to F3 etc.), it is also possible to propagate backwards from the next I frame (e.g., right eye view, shown as "In" in FIG. 14) and its corresponding left-to-right-eye-view interoccular displacement flowfield. When propagating backward, the flowfields must be inverted. Using the inverted flowfields, a second interoccular distance approximation is obtained. A weighted average can be applied to the backward-from-the-next-intra and the forward-from-the-previous-intra approximations of the interoccular flowfield. The weighting should be set to provide greater weight to the nearer intra frame. Inverted flowfields are inherently less reliable, so a higher weighting should usually be given to the forward-from-the-previous-intra approximation. Thus, the weighting should usually be unequal, favoring the forward-from-the-previous-intra approximation. For example, twice the reciprocal of the frame distance could be used to weight the forward-from-the-previous intra approximation, and one times the reciprocal of the frame distance could be used to weight the backward-from-the-next-intra frame, normalized by the sum of these weighted reciprocals (e.g., divided by (2/d1+1/d2) where d1 is the time (or number of frame) distance to the previous intra frame, and d2 is the time (or number of frame) distance to the next intra frame). This approximate flowfield can also be optionally augmented with a delta correction flowfield for interoccular displacement (a type of double delta).

Note that the next intra frame may not have a flowfield to an F frame which precedes it, since that F frame will point to a previous frame, and not to the I frame which is subsequent. M frames, however, may have flowfields which point to the I frame which can be scaled and inverted. Also, the F frame's flowfield can also be inverted and used to point to the I frame, even though its reference is a previous F frame (and not the subsequent I frame).

Delta flowfields can optionally be used to correct any inverted flowfields. Such delta flowfields can be at the same, higher, or lower resolution than the inverted flowfields.

In addition to, or as an alternative to, the favoring of normal (i.e., forward) flowfields over inverted flowfields, the confidence at each pixel in the flowfield can be used for the relative weighting. Thus, if the inverted flowfield has high confidence compared to the normal (i.e., forward) flowfield at a given pixel, then the inverted flowfield should have more weight at that pixel.

Resolution of the Interoccular Displacement Flowfield

The interoccular distance displacement flowfield does not represent the flow of pixels over time, but rather the displacement of pixels between one eye view relative to the other eye view. Because of this, both the interoccular displacement flowfield, as well as its propagation into subsequent frames, as described, can benefit from an increased flowfield resolution. Thus, it is usually beneficial to increase the resolution of F frame flowfields (which usually have reduced resolution) up to a higher resolution for the interoccular displacement flowfield and its propagation over subsequent frames. An additional way to accomplish this is to use a higher resolution delta correction flowfield to add to a scaled-up lower resolution interoccular-displacement flowfield.

Inventive aspects of the present invention include the embodiments and concepts described above and in the drawings, and include the following:

- Use of flowfields for motion compensation for compression.
- Interpolation up to per-pixel motion vector flowfields by using variable-size-ratio or fixed-size-ratio upsize-filtering of motion vectors and confidences to yield one motion vector and confidence per pixel. Optionally, upsize-filtering to various intermediate resolution-enhancing delta layers, and correspondingly resizing the motion vector lengths to correspond to that layer's resolution.
- Interpolation up to per-pixel motion vector flowfields by upsize-filtering macroblock motion vectors, as used in existing macroblock motion compensated codecs.
- Use of horizontal length to control horizontal pixel filter sharpness/softness, and similarly the use of vertical length to control vertical pixel filter sharpness/softness. Large motion vectors will not preserve small details, and are therefore more appropriate for use with soft pixel filters. Small motion vectors indicate small motion blur, and therefore should select sharp displacement filters. Optionally, softening in regions of low confidence, and considering the shutter angle (i.e., frame open percentage), if it is known or can be estimated when determining filter factors. Pixel displacement filters using the per-pixel flowfield vectors may have several levels of sharpness, ranging from a fully-sharp windowed-sinc, down to a soft Gaussian-like filter extending over several pixels.
- Use of diagonal motion vectors to select diagonal softening. Also, extension to any angle of motion vector to control softening along the direction of the motion blur, and to retain sharpness perpendicular to the direction of motion. One optional method of doing this is to use an affine transformation to rotate a region of the image, apply an on-axis (e.g., horizontal) blur, and then re-rotate back and then displace.
- Use of local motion vector divergence to control filter sharpness/softness. A uniform vector field (all vectors pointing in approximately the same direction) should select sharper filters than a divergent field where each neighboring motion vector differs from the current pixel. Optionally, confidence should be reduced in areas of high divergence.
- Additional control of pixel filter sharpness/softness based upon analysis of the scene. For example, out-of-focus portions of an image can benefit from softer pixel filters during motion compensation.
- Use of encoding-only sharpness/softness filtering, based upon flowfields to one or more nearby frames, for use with existing codecs such as MPEG-2, MPEG-4_part2, MPEG-4_part10_avc, JPEG-2000, SMPTE-VC1, etc.; for use on intra frames, P frames, B frames, F frames and/or M frames; and for use with layered codecs, such as a hybrid of optimal filter resolution-enhancing delta layers and DWT 9/7 bi-orthogonal subbands.
- In layered resolution hierarchies, high frequency resolution-increasing layers can have pixel deltas amplitude-modulated by the length and/or divergence of motion vectors. High motion, and/or a divergent vector field, indicate a lack of inherent image sharpness, such that high frequency details can be reduced. Short motion vectors within uniform vector fields (little motion) should retain full high frequency amplitude.
- Compression of the motion vector field via image down-filtering during encoding, and up-filtering during decoding.
- Layering the motion vector field down-filtering and up-filtering.
- Coding the motion vector resolution layers via quantization.
- Optionally performing layered transformation coding on motion vector layers or layer deltas, such as DWT 9/7 bi-orthogonal subband wavelet transformation with quantization, or DWT 5/3 bi-orthogonal subband wavelet transformation without quantization.
- Coding a flowfield using quantized transform codecs (e.g., using quantized DWT 9/7 bi-orthogonal subband wavelets), with the motion vectors and confidence values being treated as if they were pixel values. Optionally, scaling the flowfield values to be normalized to the maximum search range for motion vector matches, or using a non-linear scaling of the motion vectors, such as square root with retained sign (since short vectors need higher precision, but longer vectors do not). Non-linear scaling may be independent for horizontal and vertical, or may be based upon radius, or longest of horizontal and vertical, or other useful criteria.
- Use of several bi-orthogonal wavelet subband layers (such as DWT 9/7) on both pixel deltas and motion-vector deltas when using arbitrary resolution layer relationships.
- Use of sub-pixel resolution for the motion vectors and corresponding displacement filters.
- Use of "F" type flowfield-forward-predicted frames (starting with periodic intra "I" frames).
- Use of F forward-predicted flowfield motion compensation, applied via upsize-filtering and motion vector scaling at one or more resolution layers. Optionally, beginning with an Intra frame, and referencing one F frame to the next for a region of frames until the next Intra frame.
- Using different upsizing amounts of the flowfield corresponding to various resolution layers, as well as scaling the motion vectors for application at each such resolution layer. Optionally, deselecting motion compensation at one or more layers, or referencing more than one other Intra, F, or M frame (a multi-reference F frame).
- Use of M multiple-reference flowfield motion compensation, applied via upsize-filtering and motion vector scaling at one or more resolution layers, further including using nearby decoded flowfields with scaling for use at the M frame time, adding an optional delta flowfield at the same, higher, or lower resolution, alternately, or in addition, using new flowfields to nearby reference frames, and optionally deselecting motion compensation at one or more layers.

Regional quantization of arbitrary resolution layers (low_low_intra scaled to appropriate resolution for encoding and decoding regional quantization scaling).

Use of a video compression toolset based upon variable upsize, variable downsize, variable displacement, and variable flowfield displacement.

Building a flowfield by one or more hierarchical layers of block match, and then interpolating per-pixel using an up-filter. Optionally, using a biasing function to favor short motion vectors, and/or warping the blocks in various ways to find the best match, and/or varying a DC by small amounts for each color primary, or for all three color primaries, in order to minimize the SAD of the best match.

Use of floating point for motion vectors, and optional use of floating point for confidence values.

Noise reduction of the flowfield prior to encoding-only use, as well as prior to quantized transform compression coding of the flowfield, and/or subsequent to decoding the flowfield.

Comparison of correlation with autocorrelation to find best match, optionally combined with minimum SAD as a best match criterion.

Retention of multiple candidate best match motion vectors (having similar confidences) for use in comparison with neighbors for optimizing flowfield smoothness and/or compression efficiency.

Use of absolute confidence (such as SAD higher than some value being known to represent a poor match) values to indicate high to low match quality and therefore high to low confidence, solely based upon the value of the confidence, and optionally using the knowledge of a poor overall match to determine that there has been a scene cut, and thus that an intra frame should be used.

Use of confidence values relative to an accumulated average and best confidence (such as the average SAD and minimum SAD) in order to make a noise-floor-independent determination of match quality.

Use of the comparison of correlation and autocorrelation at locations of statistically minimum autocorrelation to determine the local regional noise floor using the statistically minimum autocorrelation that occurs, and/or to determine the fixed pattern noise floor in the case of zero motion vectors by comparing correlation between frames against autocorrelation at places where the statistically minimum autocorrelation occurs.

Iterated flowfield refinement (using multiple passes) and smoothing.

Use of human assisted guidance of flowfield candidate alternatives.

Use of confidence within a region to guide a corresponding quantization for that region during motion compensated delta correction at a base layer (or the one layer of a non-layered codec), and optionally at resolution-enhancing layers above the base layer. This aspect is applicable to block motion compensation as well as flowfield motion compensation.

Use of flowfields to displace pixels for use in noise reduction of an original image prior to compression coding, wherein weighted blends and difference limits of flowfield-displaced pixels are set in relationship to the image's noise floor. Displacement match confidence can also optionally be used in the weighting.

Motion-compensated noise reduction wherein pixel weights from nearby frames are set in relationship to the pixels' brightness, whether independently for R, G, and b, or using Y for luminance, but applying also to U and V based upon luminance. Similarly for pixel difference limits (whether a smooth difference-limiting function, or a hard difference-limit clip) being set in relationship to a pixels' brightness. Displacement match confidence can also optionally be used in the weighting.

Programmed Embodiments

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform particular functions. Thus, the invention may be implemented in one or more computer programs executing on one or more programmable computer systems each comprising at least one processor, at least one data storage system (which may include volatile and nonvolatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. Accordingly, other embodiments are within the scope of the following claims.

The invention claimed is:

1. A computer to improve coding efficiency of video compression of motion compensated moving image frames, the computer comprising:
 a processor, and
 a memory, the memory having software code stored therein, the software code when executed by the processor, causes the computer to:
 reduce the current frame to at least one lower resolution frame using a downsize filter;
 match pixels of the current frame to pixels of at least one of a previous or subsequent frame to generate a flowfield for the current frame, the flowfield comprising a per-pixel field of motion vectors describing the relative motion of the pixels of the current frame with respect to the pixels of at least one of a previous or subsequent frame and the flowfield being generated by interpolating up motion vectors for the at least one lower resolution frame's flowfield using upsize-filtering to yield one motion vector per pixel;

apply the motion vectors of the flowfield for the current frame to modify the current frame by at least one of (1) modulation of at least one resolution-enhancing layer derived from the current frame, (2) sharp/soft filtering for at least one of the current frame, a base layer derived from the current frame, or at least one resolution-enhancing layer derived from the current frame, and (3) displacement of pixels of the current frame; and output the modified current frame.

2. The computer of claim 1, wherein the matching of pixels by the computer includes hierarchically matching using blocks or warped block-like regions within the frames to create one or more reduced resolution flowfields.

3. The computer of claim 1, wherein the application of the motion vectors by the computer includes applying at least one of the horizontal length or the vertical length of each flowfield motion vector as a sharp/soft filtering amount for a corresponding pixel direction.

4. The computer of claim 1, wherein the application of the motion vectors by the computer includes applying a selected angular component of each motion vector to control softening along the direction of the motion vector, while retaining sharpness perpendicular to the direction of such motion vector.

5. The computer of claim 1, wherein the application of the motion vectors by the computer includes determining an amount of local motion vector divergence with respect to each motion vector, and controlling at least one of the modulation and the sharp/soft filtering based on such divergence.

6. The computer of claim 1, wherein the software code, when executed, further causes the computer to generate at least one forward flowfield-predicted frame from the current frame.

7. The computer of claim 1, wherein the software code, when executed, further causes the computer to generate at least one multiply-predicted frame type from the current frame and at least one other moving image frame.

8. The computer of claim 1, wherein the software code, when executed, further causes the computer to code at least one flowfield using a quantized transform codec.

9. The computer of claim 1, wherein the software code, when executed, further causes the computer to determine the motion vectors with sub-pixel resolution.

10. The computer of claim 1, wherein the software code, when executed, further causes the computer to apply noise reduction to each flowfield.

11. The computer of claim 1, wherein matching by the computer includes block matching by at least one algorithm selected from the group comprising: the sum of absolute difference (SAD), the sum of squared difference (SSD), the median of absolute difference, and comparison of correlation with autocorrelation.

12. The computer of claim 1, wherein the software code, when executed, further causes the computer to determine a confidence value for each flowfield motion vector, the confidence value representing the probable accuracy of the corresponding motion vector.

13. The computer of claim 12, wherein the software code, when executed further causes the computer to soften pixels of at least one of the current frame, a base layer derived from the current frame, or at least one resolution-enhancing layer derived from the current frame, in regions of pixels having low confidence values, for use in prediction of pixel values of a frame different from the current frame.

14. The computer of claim 12, wherein the software code, when executed further causes the computer to use confidence values from a region of the current frame to determine a corresponding quantization for such region during motion compensated delta correction of a selected layer.

15. The computer of claim 12, wherein the software code, when executed further causes the computer to set at least one of a modulation amount and a sharp/soft filtering amount in proportion to the corresponding confidence value and the length of the corresponding motion vector.

16. A computer to improve coding efficiency of video compression of motion compensated moving image frames, the computer comprising
a processor, and
a memory, the memory having software code stored therein, the software code when executed by the processor causes the computer to:
(a) reduce a current frame to at least one lower resolution frame using a downsize filter;
(b) match pixels of the current frame to pixels of at least one of a previous or subsequent frame to generate a flowfield for the current frame, the flowfield comprising a per-pixel field of motion vectors describing the relative motion of the pixels of the current frame with respect to the pixels of at least one of a previous or subsequent frame and the flowfield being generated by interpolating up motion vectors for the at least one lower resolution frame's flowfield using upsize-filtering to yield one motion vector per pixel;
(c) displace pixels from the current frame to one or more previous or subsequent frames based on values of the flowfield corresponding to such pixels;
(d) weight the displaced pixels for efficient noise reduction based on the values of the flowfield corresponding to such pixels; and
(e) output the displaced and weighted pixels.

17. A computer to improve coding efficiency of video compression of motion compensated moving image frames, the computer comprising
a processor, and
a memory, the memory having software code stored therein, the software code when executed by the processor causes the computer to:
(a) match pixels of the current frame to pixels of at least one of a previous or subsequent frame to generate a flowfield for the current frame, the flowfield comprising a per-pixel field of motion vectors describing the relative motion of the pixels of the current frame with respect to the pixels of at least one of a previous or subsequent frame;
(b) compression code the flowfield;
(c) output the compression coded flowfield to a decoding system;
(d) decompress the compression coded flowfield;
(e) apply the decompressed flowfield as reference values pointing to one or more nearby reference frames to propagate pixels from the reference frames via per-pixel displacement to a current time corresponding to the current frame;
(f) subtract the displaced propagated pixels from at least one of a base layer or at least one resolution enhancing delta layer corresponding to the current frame to generate a modified current frame; and (g) apply quantized compression coding to the pixels of the modified current frame.

18. The computer of claim 17, wherein the software code, when executed, further causes the computer to weight one or more pixel values of the modified current frame based on the brightness of pixels propagated from at least one reference frame.

19. A computer to improve coding efficiency of video compression of motion compensated moving image frames, the computer comprising a processor, and a memory, the memory having software code stored therein;

a variable upsize filter with parameters for horizontal and vertical increased resolution pixel counts and for sharpness/softness level;

a variable downsize filter with parameters for horizontal and vertical decreased resolution pixel counts and for sharpness/softness level;

a variable displacement filter for applying confidence values and independent horizontal and vertical displacements to an input frame;

a coarse block match component having search range values independently settable for horizontal and vertical matching;

a fine block match component having search range values independently settable for horizontal and vertical matching;

a quantized transform encoder/decoder; and a quantized transform stand-alone decoder for decoding the output of the quantized transform encoder/decoder.

20. A computer to improve coding efficiency of video compression of motion compensated moving image frames, the computer comprising a processor, and a memory, the memory having software code stored therein, the software code when executed by the processor causes the computer to:

(a) match pixels of the current frame to pixels of at least one of a previous or subsequent frame to generate a flowfield for the current frame, the flowfield comprising a per-pixel field of motion vectors describing the relative motion of the pixels of the current frame with respect to the pixels of at least one of a previous or subsequent frame;

(b) apply the motion vectors of the flowfield for the current frame to modify the current frame by modulation of at least one resolution-enhancing layer derived from the current frame; and (c) output the modified current frame.

21. A computer to improve coding efficiency of video compression of motion compensated moving image frames, the computer comprising a processor, and a memory, the memory having software code stored therein, the software code when executed by the processor causes the computer to:

(a) match pixels of the current frame to pixels of at least one of a previous or subsequent frame to generate a flowfield for the current frame, the flowfield comprising a per-pixel field of motion vectors describing the relative motion of the pixels of the current frame with respect to the pixels of at least one of a previous or subsequent frame;

(b) apply the motion vectors of the flowfield for the current frame to modify the current frame by sharp/soft filtering for at least one of the current frame, a base layer derived from the current frame, or at least one resolution-enhancing layer derived from the current frame; and (c) output the modified current frame.

22. A computer to improve coding efficiency of video compression of motion compensated moving image frames, the computer comprising a processor, and a memory, the memory having software code stored therein, the software code when executed by the processor causes the computer to:

(a) reduce a current frame to at least one lower resolution frame using a downsize filter;

(b) match pixels of the current frame to pixels of at least one of a previous or subsequent frame to generate a flowfield for the current frame, the flowfield comprising a per-pixel field of motion vectors describing the relative motion of the pixels of the current frame with respect to the pixels of at least one of a previous or subsequent frame, and the flowfield being generated by interpolating up motion vectors for the at least one lower resolution frame's flowfield using upsize-filtering to yield one motion vector per pixel;

(c) apply the motion vectors of the flowfield for the current frame to modify the current frame by displacement of pixels of the current frame; and (d) outputting the modified current frame.

* * * * *